(12) United States Patent
Kazama et al.

(10) Patent No.: US 12,467,190 B2
(45) Date of Patent: Nov. 11, 2025

(54) WASHING MACHINE

(71) Applicant: SAMSUNG ELECTRONICS CO., LTD., Suwon-si (KR)

(72) Inventors: Osamu Kazama, Kanagawa (JP); Hiroshi Katsumoto, Kanagawa (JP); Yasuyuki Sonoda, Kanagawa (JP)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 127 days.

(21) Appl. No.: 18/414,468

(22) Filed: Jan. 17, 2024

(65) Prior Publication Data

US 2024/0150951 A1    May 9, 2024

Related U.S. Application Data

(63) Continuation of application No. PCT/KR2022/010301, filed on Jul. 14, 2022.

(30) Foreign Application Priority Data

Jul. 30, 2021   (JP) ................ 2021-125963
Jul. 30, 2021   (JP) ................ 2021-126079
Jun. 20, 2022   (JP) ................ 2022-098821

(51) Int. Cl.
*D06F 37/30*   (2020.01)
*D06F 33/48*   (2020.01)
*D06F 105/46*  (2020.01)

(52) U.S. Cl.
CPC ............ *D06F 37/304* (2013.01); *D06F 33/48* (2020.02); *D06F 2105/46* (2020.02)

(58) Field of Classification Search
CPC ..................................................... D06F 37/304
See application file for complete search history.

(56) References Cited

U.S. PATENT DOCUMENTS 4,706,055 A    11/1987   Uetsuhara
10,246,809 B2  4/2019    Kim et al.
(Continued)

FOREIGN PATENT DOCUMENTS

CN    108570808 A    9/2018
JP       587267 A    4/1993
(Continued)

OTHER PUBLICATIONS

The extended European search report for EP Application No. 22849770.7 mailed on Aug. 13, 2024.
(Continued)

*Primary Examiner* — Jason Y Ko
(74) *Attorney, Agent, or Firm* — CANTOR COLBURN LLP

(57) ABSTRACT

A washing machine includes a controller. The controller perform switching processing, by moving a moving part in an axial direction so that the moving part is switched from a start state in which one of a rotor-side fixing part and a stator-side fixing part engages with the moving part to an end state in which a remaining one of the rotor-side fixing part and the stator-side fixing part engages with the moving part. The controller is further configured to perform an adjustment operation before the end state of the switching processing starts. In the adjustment operation, the controller is further configured to adjust an engagement position by changing a rotation phase of rotor so as to allow an engagement position of the moving part with respect to the remaining one of the rotor-side fixing part and the stator-side fixing part to become a target engagement position.

15 Claims, 44 Drawing Sheets

(56) References Cited

U.S. PATENT DOCUMENTS

| | | |
|---|---|---|
| 10,570,550 B2 | 2/2020 | Chupka |
| 10,745,845 B2 | 8/2020 | Yoneda et al. |
| 11,365,504 B2 | 6/2022 | Sonoda et al. |
| 2014/0069145 A1 | 3/2014 | Chupka et al. |
| 2020/0010998 A1 | 1/2020 | Jang et al. |
| 2020/0232143 A1 | 7/2020 | Sonoda et al. |
| 2021/0040672 A1 | 2/2021 | Hu et al. |

FOREIGN PATENT DOCUMENTS

| | | | |
|---|---|---|---|
| JP | 2000299973 A | 10/2000 | |
| JP | 2001113088 A | 4/2001 | |
| JP | 2001157791 A | 6/2001 | |
| JP | 2001190889 A | 7/2001 | |
| JP | 3669296 B2 | 7/2005 | |
| JP | 3669332 B2 | 7/2005 | |
| JP | 2006288088 A | 10/2006 | |
| JP | 2013078473 A | 5/2013 | |
| JP | 6366056 B2 | 8/2018 | |
| JP | 6733081 B2 | 7/2020 | |
| JP | 2020114288 A | 7/2020 | |
| JP | 2020124381 A | 8/2020 | |
| KR | 20160094135 A | 8/2016 | |
| KR | 20200089604 A | 7/2020 | |
| KR | 102398428 B1 | 5/2022 | |
| WO | 8600168 A1 | 1/1986 | |
| WO | 2018208003 A1 | 11/2018 | |

OTHER PUBLICATIONS

International Search Report mailed Oct. 21, 2022 for PCT/KR2022/101301.

(BEFORE ROTATION)

(AFTER ROTATION)

ROTATION → STOP

WASHING MACHINE

CROSS-REFERENCE TO RELATED APPLICATIONS

This application is a continuation application, under 35 U.S.C. § 111(a), of International Patent Application No. PCT/KR2022/010301, filed on Jul. 14, 2022, which claims priority to Japanese Patent Application No. 2021-126079, filed on Jul. 30, 2021, Japanese Patent Application No. 2021-125963, filed on Jul. 30, 2021, and Japanese Patent Application No. 2022-098821, filed on Jun. 20, 2022, the content of which in its entirety is herein incorporated by reference.

TECHNICAL FIELD

The disclosure relates to a washing machine.

BACKGROUND ART

Japanese Patent Application Publication No. 2020-124381 discloses a washing machine-dedicated driving unit. The driving unit includes a shaft, a motor for rotating the shaft, a clutch provided between the shaft and the motor, and a decelerator using a planetary gear system. The clutch has a moving part sliding in a rotation-axis direction, a pair of fixed parts disposed apart in the rotation-axis direction, and a driving part for switching a connection state of the decelerator by connecting the moving part to one of the fixed parts by sliding the moving part.

SUMMARY

A washing machine includes a rotatable tub and a driving unit configured to drive the rotatable tub. The driving unit includes a shaft, a motor including a stator and a rotor, a decelerator provided between the shaft and the rotor, a clutch configured to be switchable between a first mode in which rotation of the rotor is transmitted to the shaft via the decelerator, and a second mode in which rotation of the rotor is transmitted to the shaft without passing through the decelerator, and a controller. The clutch includes a rotor-side fixing part configured to be rotatable by interoperating with rotation of the rotor, a stator-side fixing part being fixed to the stator, and configured to face the rotor-side fixing part with a gap therebetween in an axial direction of the shaft, and a moving part configured to be movable between the rotor-side fixing part and the stator-side fixing part in the axial direction. The clutch may be further configured to switch to the first mode as the stator-side fixing part and the moving part engage with each other, and switch to the second mode as the rotor-side fixing part and the moving part engage with each other. The controller is further configured to perform switching processing, by moving the moving part in the axial direction, so as to switch the moving part from a start state in which one of the rotor-side fixing part and the stator-side fixing part engages with the moving part to an end state in which the other one of the rotor-side fixing part and the stator-side fixing part engages with the moving part. The controller is further configured to perform an adjustment operation, before the end state starts, of adjusting an engagement position by changing a rotation phase of the rotor so as to allow the engagement position of the moving part with respect to the other one of the rotor-side fixing part and the stator-side fixing part to become a target engagement position. By doing so, occurrence of an engagement error at the clutch may be suppressed.

DESCRIPTION OF DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
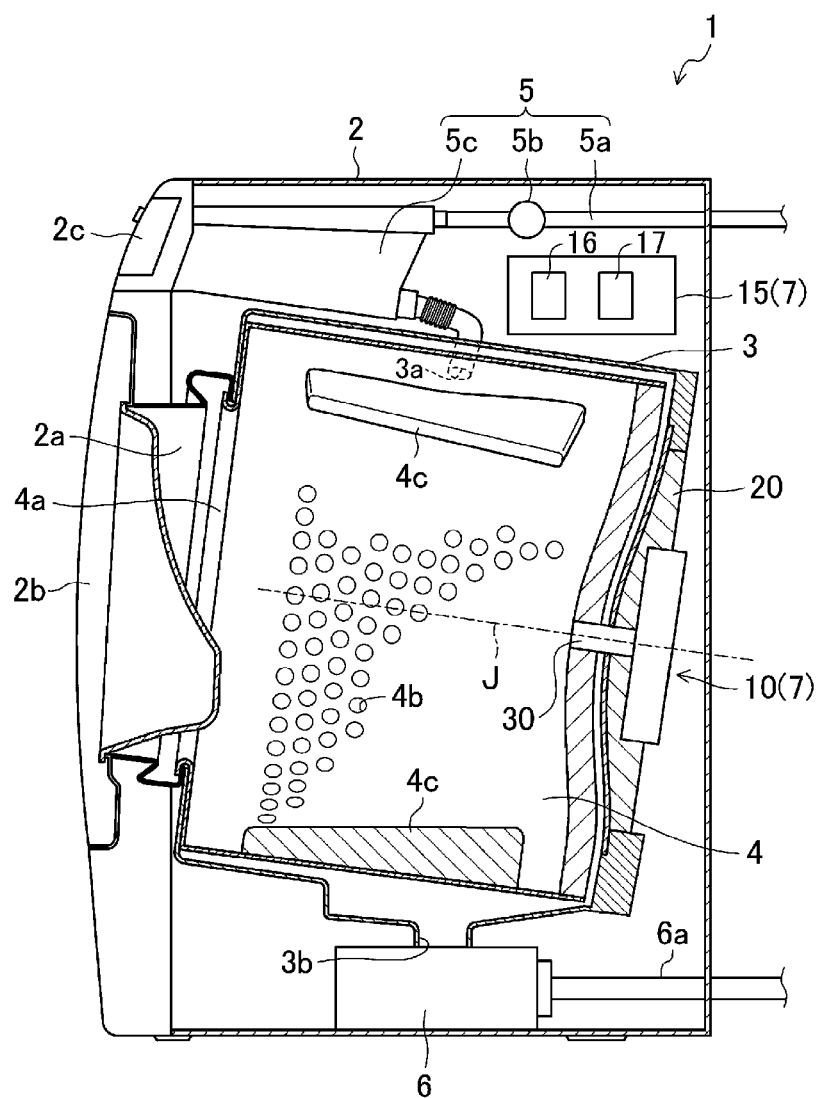
FIG. 1 is a schematic diagram of an embodiment of a configuration of a washing machine, according to the disclosure.

Although the terms used in the specification are selected, as much as possible, from general terms that are widely used at while taking into consideration the functions obtained in accordance with the disclosure, these terms may be replaced by other terms based on intentions of one of ordinary skill in the art, customs, emergence of new technologies, or the like. Also, in particular cases, the terms are discretionally selected by the applicant of the disclosure, and the meaning of those terms will be described in detail in the corresponding part of the detailed description. Therefore, the terms used in the disclosure are not merely designations of the terms, but the terms are defined based on the meaning of the terms and content throughout the disclosure. Throughout the specification, when a part "includes" or "comprises" an element, unless there is a particular description contrary thereto, the part may further include other elements, not excluding the other elements.

Hereinafter, embodiments will now be described more fully with reference to the accompanying drawings for one of ordinary skill in the art to be able to perform the disclosure without any difficulty. The disclosure may, however, be embodied in many different forms and should not be construed as being limited to the embodiments set forth herein. In addition, portions irrelevant to the description will be omitted in the drawings for a clear description of the disclosure, and like reference numerals will denote like elements throughout the specification. The following description is for illustrative purposes only and is not intended to limit the disclosure, applications thereof, or its purposes. Also, in the drawings, same or corresponding elements are denoted by the same reference numerals, and redundant descriptions thereof are not provided here.

FIG. 1 is a schematic diagram of an embodiment (Embodiment 1) of a configuration of a washing machine 1, according to the disclosure. In the embodiment, the washing machine 1 is a drum washing machine. Also, the washing machine 1 may be a fully-automated washing machine configured to automatically perform a series of washing processes including washing, rinse, dewatering, or the like. Referring to FIG. 1, the washing machine 1 may include a case 2, a fixed tub 3, a rotatable tub 4, a water supply device 5, a drain pump 6, a driving unit 10, and a controller 15. In the descriptions below, for convenience, a vertical direction may be used with reference to drawing corresponding thereto. Also, in the descriptions below, a direction in which a rotation-axis line extends is described as "axial direction", a perimeter direction around the rotation-axis line is described as "perimeter direction", and a direction being perpendicular to the rotation-axis line (diameter direction or radial direction) is described as "diameter direction".

The case 2 is a box-shape container including a panel, a frame, etc., and forms an exterior of the washing machine 1. A round inlet (hereinafter, also referred to as an inlet) 2a for putting in or taking out laundry is provided at the front of the case 2. A door 2b with a transparent window is installed at the inlet 2a. The inlet 2a is open or close by the door 2b. A manipulation part 2c with switches for user manipulation is provided at the upper part of the inlet 2a in the case 2.

The fixed tub 3 is installed in the case 2 so as to communicate with the inlet 2a. The fixed tub 3 is a cylindrical-shape container with a bottom which is capable of storing water, and its opening is connected to the inlet 2a. The fixed tub 3 is supported by a damper (not shown) installed in the case 2, such that the fixed tub 3 is stable while its center line (axial line) is upwardly slanted from a horizontal level. That is, the fixed tub 3 is provided in such a manner that its axial line follows in a direction crossing a vertical direction.

The rotatable tub 4 is a cylindrical-shape container of which diameter is slightly smaller than that of the fixed tub 3 and which is contained in the fixed tub 3 in such a manner that its center line (axial line) is aligned with the center line (axial line) of the fixed tub 3. In the illustrated embodiment, the rotatable tub 4 is rotatable while its center line (axial line) is upwardly slanted from a horizontal level. That is, the rotatable tub 4 is provided in such a manner that its axial line follows in a direction crossing a vertical direction. A round opening 4a that faces the round inlet 2a is formed at the front part of the rotatable tub 4. Laundry is put into the rotatable tub 4 via the round inlet 2a and the round opening 4a. A plurality of dewatering holes 4b (FIG. 1 shows only some of them) is defined in all side parts of the rotatable tub 4. Also, a lifter 4c for stirring is disposed (e.g., mounted) at a plurality of places in inner sides of the rotatable tub 4. The front part of the rotatable tub 4 is supported to be rotatable with respect to the round inlet 2a.

The water supply device 5 is disposed (e.g., mounted) at the top part of the fixed tub 3. The water supply device 5 includes a water supply pipe 5a, a water supply valve 5b, and a chemical feeder 5c. An upstream end of the water supply pipe 5a is exposed outside the washing machine 1 and is connected to a water supply source (not shown). A downstream end of the water supply pipe 5a is connected to a water supply hole 3a that is open in the top part of the fixed tub 3. The water supply valve 5b and the chemical feeder 5c are sequentially disposed (e.g., mounted) in the middle of the water supply pipe 5a. The chemical feeder 5c contains chemical such as a detergent, a fabric softener, or the like. The chemical is mixed with water supplied to the chemical feeder 5c and then is fed to the fixed tub 3.

A drain part 3b is provided at the lower part of the fixed tub 3. The drain part 3b is connected to the drain pump 6. The drain pump 6 discharges waste water stored in the fixed tub 3 to the outside of the washing machine 1 via a drain pipe 6a.

Figure 2:
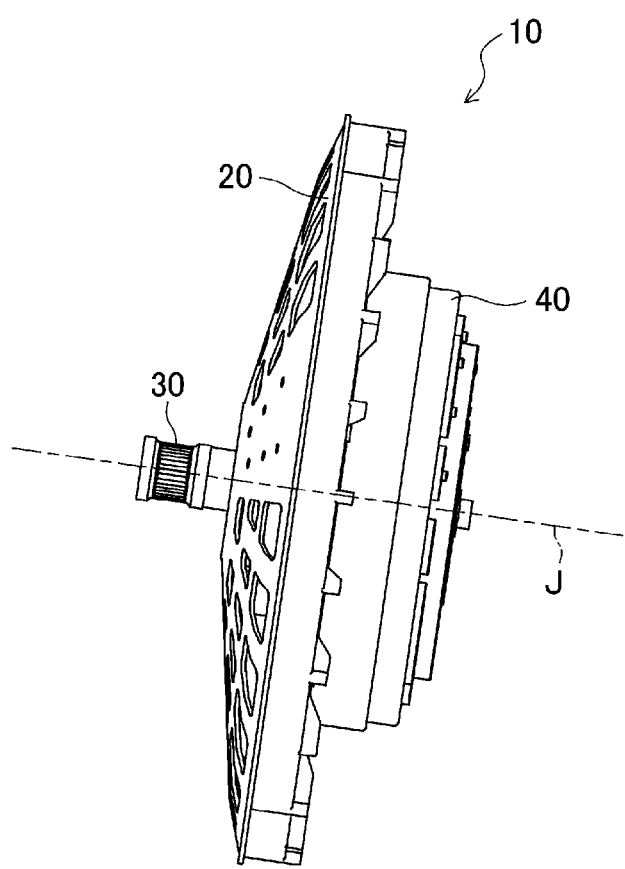
FIG. 2 is a schematic side view of an embodiment of a driving unit.

FIG. 2 is a schematic side view of an embodiment of the driving unit 10. Referring to FIGS. 1 and 2, the driving unit 10 is disposed (e.g., mounted) at the bottom of the fixed tub 3. The driving unit 10 may include a unit base 20, a shaft 30, a motor 40, or the like. The shaft 30 penetrates through the bottom of the fixed tub 3 and then protrudes into the fixed tub 3 A front end of the shaft 30 is fixed at a center of the bottom of the rotatable tub 4. That is, the bottom of the rotatable tub 4 is supported by the shaft 30. The driving unit directly drives the rotatable tub 4. Accordingly, the rotatable tub 4 rotates around a center of a rotation-axis line J, by driving of the motor 40. In the illustrated embodiment, the rotation-axis line J is aligned with the center line of the fixed tub 3, the center line of the rotatable tub 4, and the axial line of the shaft 30. Also, the rotation-axis line J is arranged to extend in a direction slanted with respect to a horizontal direction or in a roughly-horizontal direction. A configuration of the driving unit 10 will now be described in detail.

The controller 15 generally controls operations of the washing machine 1. In detail, the controller 15 controls the driving unit 10. In the illustrated embodiment, the driving unit and the controller 15 form a driving device 7. The controller 15 includes a processor (e.g., integrated circuit) 16 and a driving circuit 17. The processor 16 is connected to be enabled for communication with each part of the washing machine 1, and controls each part of the washing machine 1. In an embodiment, the processor 16 may include at least one central processing unit and a memory for storing a program and data for operating the central processing unit, for example. Power is suppled from a power source (not shown) to the driving circuit 17. Also, the driving circuit 17 is electrically connected to the driving unit 10, and supplies power to the driving unit 10. Accordingly, the driving unit 10 is driven, and then the rotatable tub 4 rotates. A configuration of the driving circuit 17 will now be described in detail.

Figure 3:
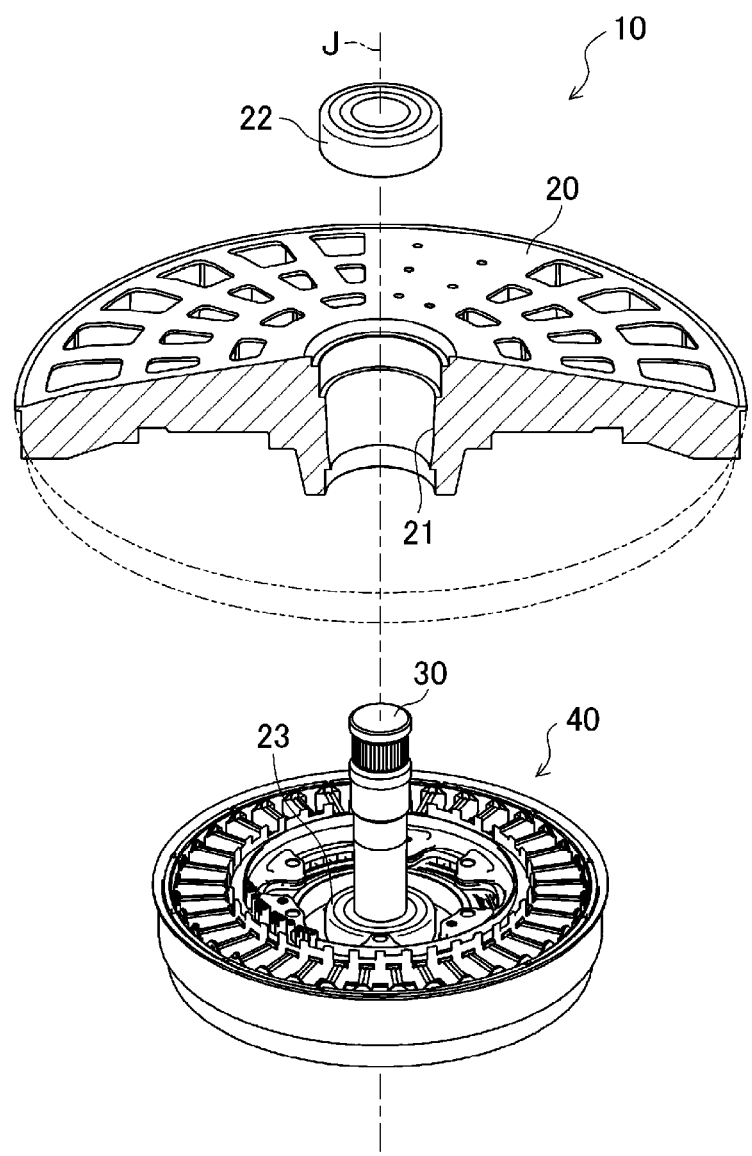
FIG. 3 is a schematic exploded perspective view of an embodiment of a driving unit.
Figure 4:
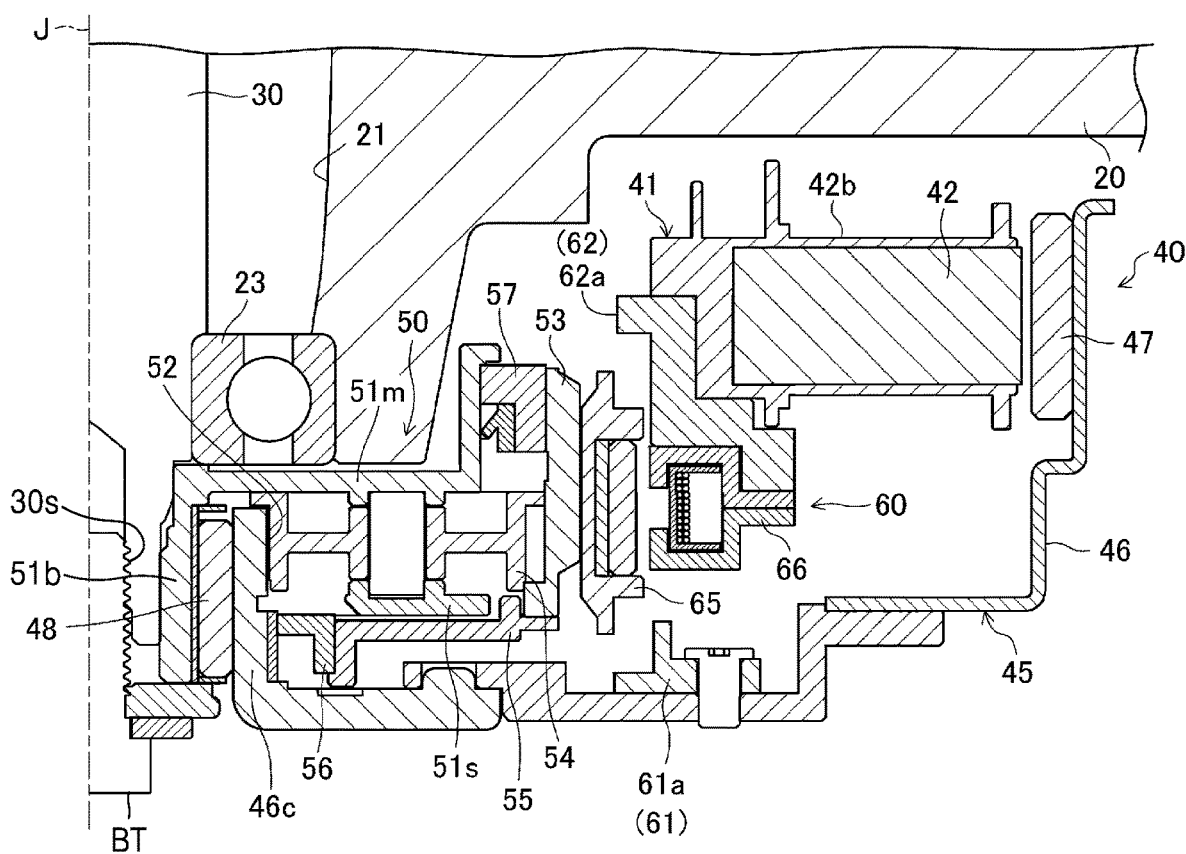
FIG. 4 is a schematic cross-sectional view of an embodiment of a driving unit.

The driving unit 10 will now be described with reference to FIGS. 3 to 11. FIG. 3 is a schematic exploded perspective view of an embodiment of the driving unit 10. FIG. 4 is a schematic cross-sectional view of an embodiment of the driving unit 10. Referring to FIGS. 3 and 4, the driving unit 10 may include the unit base 20, the shaft 30, the motor 40, a decelerator 50, and a clutch 60. In the illustrated embodiment, the motor 40, the decelerator 50, and the clutch 60 are roughly aligned in a vertical direction with respect to the rotation-axis line J.

As shown in FIG. 3, the unit base 20 may be a round plate-shape metal or resin member disposed (e.g., mounted) at the bottom of the fixed tub 3. A cylindrical-shape axis insertion hole 21 extending along the rotation-axis line J is formed in a center part of the unit base 20. A pair of ball bearings (a main bearing 22 and a sub bearing 23) are disposed (e.g., mounted) at opposite ends of the axis insertion hole 21. FIG. 3 shows a state in which the shaft 30 and the sub bearing 23 are installed at the motor 40. The motor is installed at the rear of the unit base 20.

The shaft 30 may be a circular-shape metal member of which diameter is smaller than that of the axis insertion hole 21. The shaft 30 is inserted into the axis insertion hole in such a manner that its front end protrudes from the axis insertion hole 21. The shaft is supported by the unit base 20 via the ball bearings 22 and 23. Accordingly, the shaft is rotatable with respect to the rotation-axis line J. As shown in FIG. 4, a base end of the shaft 30 protrudes from the sub bearing 23. A main frame 51m of a carrier 51 (refer to FIG. 7) of the decelerator 50 to be described below is fixed to the base end of the shaft 30. In detail, a screw thread 30s extending along the rotation-axis line J is formed in the base end of the shaft 30. A serration 30t (refer to FIG. 7) extending along the rotation-axis line J is formed on an outer circumferential surface of the base end of the shaft 30. Then, while the base end of the shaft 30 is inserted into an axis fixing part 51b (refer to FIG. 7) of the main frame 51m to be described below, a bolt BT is coupled to the screw thread 30s of the shaft 30 via a fixture.

Figure 5:
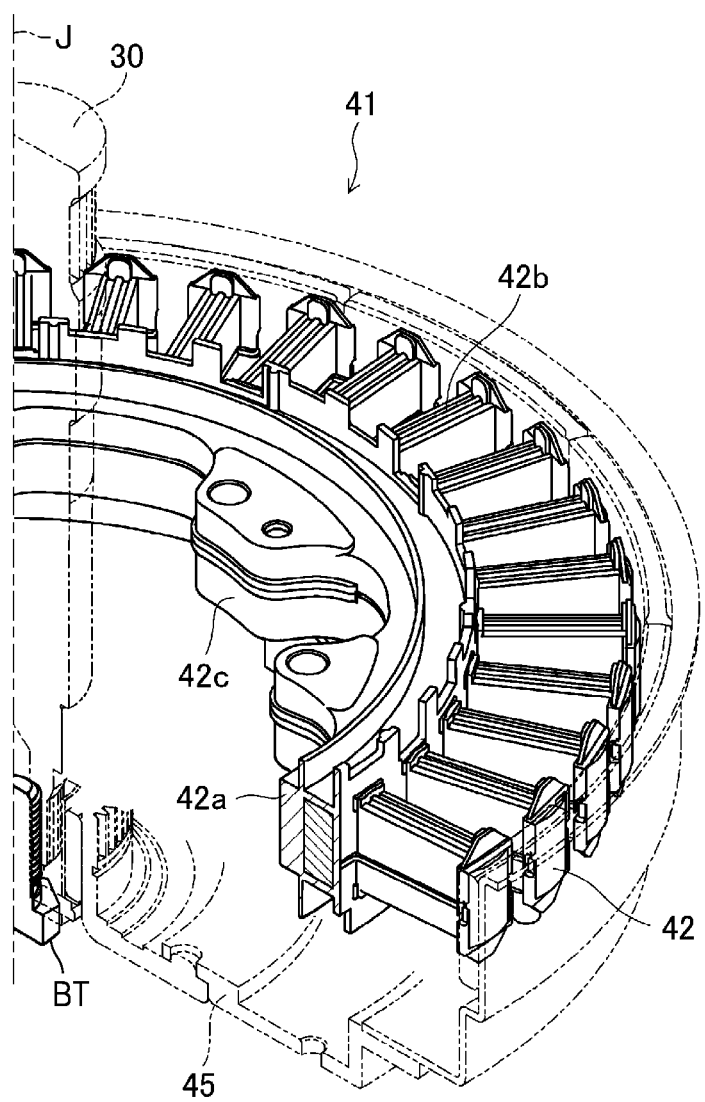
FIG. 5 is a schematic partial cutaway perspective view of an embodiment of a stator.
Figure 6:
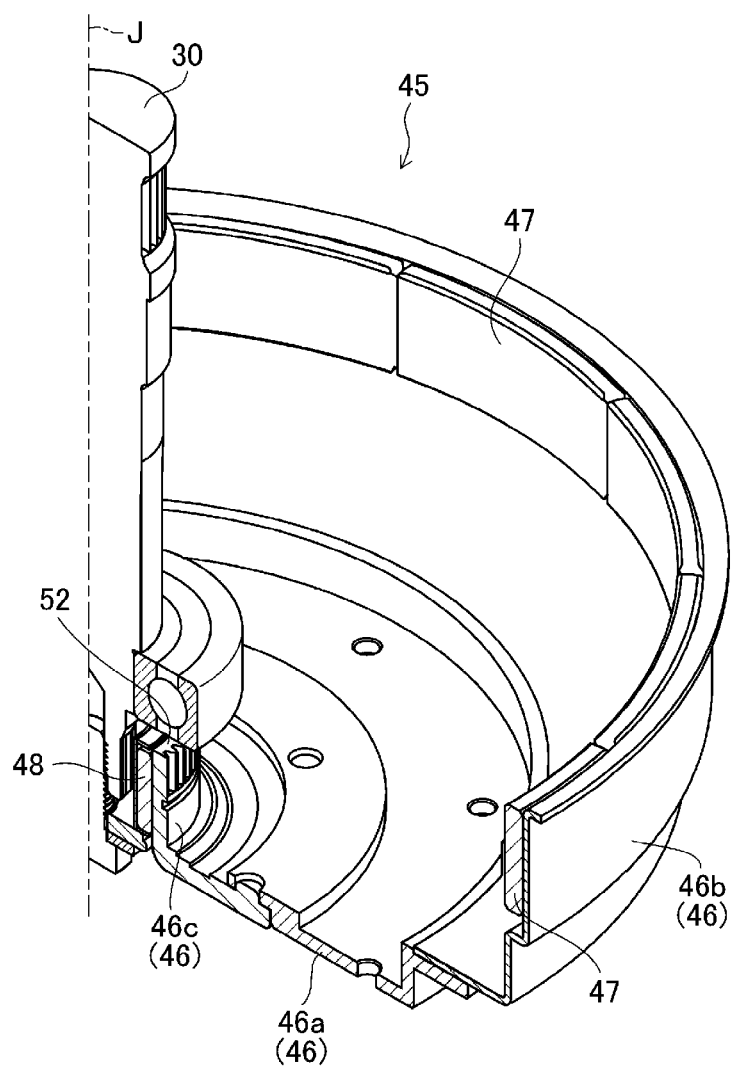
FIG. 6 is a schematic partial cutaway perspective view of an embodiment of a rotor.

FIG. 5 is a schematic partial cutaway perspective view of an embodiment of a stator. FIG. 6 is a schematic partial cutaway perspective view of an embodiment of a rotor. Referring to FIGS. 4 and 5, the motor 40 includes a stator 41 and a rotor 45. The rotor 45 faces the stator 41 by defining a preset gap therebetween. Also, the rotor 45 is rotatable with respect to the shaft 30. In the illustrated embodiment, the motor 40 is an outer rotor-type motor in which the rotor 45 is disposed in the outside of the diameter direction. Also, the motor 40 is a three-phase motor.

As illustrated in FIG. 5, the stator 41 includes an annular stator core (hereinafter, also referred to as a stator core) 42. A surface of the stator core 42 is coated with an insulating insulator. The stator core 42 includes an annular core portion 42a, a plurality of teeth portions 42b radially protruding from the core portion 42a toward the outside of the diameter direction, and a fixing flange portion 42c installed at an inner side of the core portion 42a. The stator 41 is fixed to the unit base 20 via the fixing flange portion 42c. A wire is wound in preset order on each of the plurality of teeth portions 42b, such that a plurality of motor coils are formed. A part of the stator core 42 is exposed out of apical surfaces of the plurality of teeth portions 42b. The exposed part of the stator core 42 faces in the diameter direction a magnet 47 of the rotor 45 to be described below, by defining a preset gap therebetween.

Figure 12:
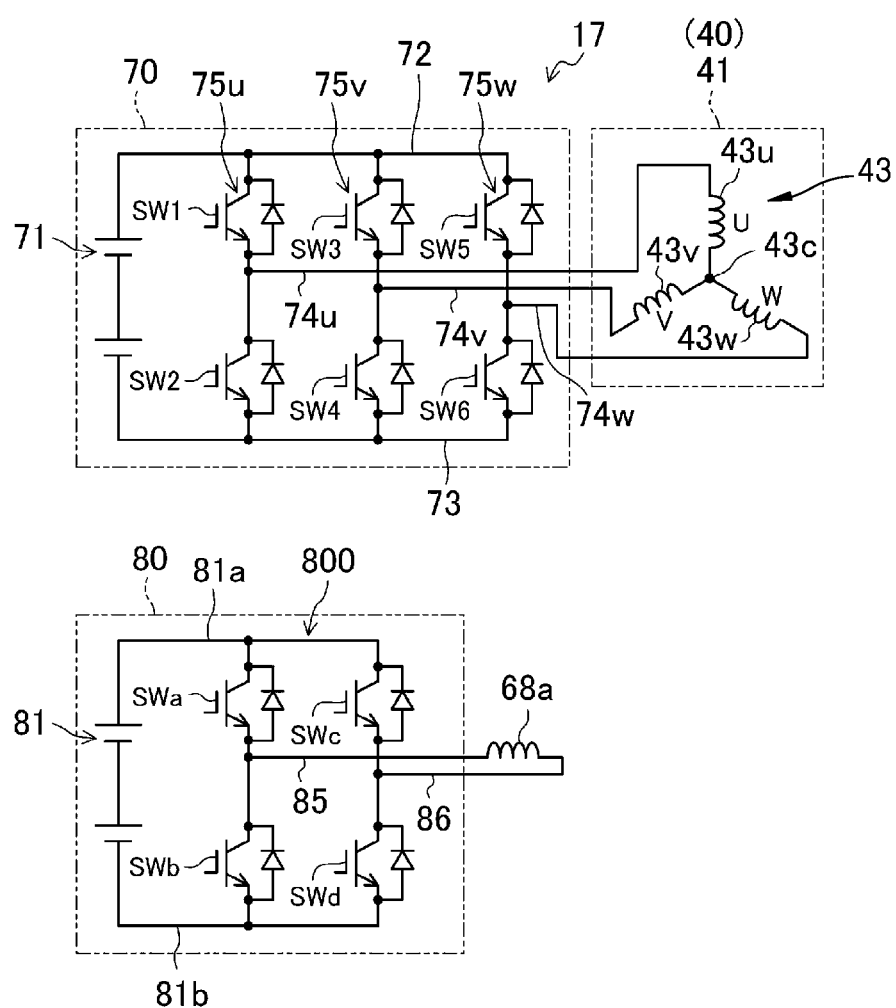
FIG. 12 is a circuit diagram illustrating an embodiment of a driving circuit.

In the illustrated embodiment, the plurality of motor coils includes three-phase motor coils. In detail, as shown in FIG. 12, the plurality of motor coils includes a U-phase motor coil 43u, a V-phase motor coil 43v, and a W-phase motor coil 43w. Hereinafter, the motor coils are collectively referred to as "motor coil 43" (refer to FIG. 12). Electrification to the motor coil 43 is controlled by the controller 15. When the motor coil 43 is electrified, the motor coil 43 generates a magnetic field for rotating the rotor 45. In detail, when alternating power is supplied to the motor coil 43, the magnetic field is generated between the motor coil 43 and the rotor 45. Due to action of the magnetic field, the rotor 45 rotates around the rotation-axis line J.

As illustrated in FIG. 6, the rotor 45 includes a rotor case 46 and the plurality of magnets 47. The rotor case 46 is a bottomed cylindrical-shape member of which center line is aligned with the rotation-axis line J. In the illustrated embodiment, the rotor case contains the stator 41. The rotor case 46 includes a disc-shape bottom wall (hereinafter, also referred to as a bottom wall) 46*a* including a center portion in which a round hole is defined, and a cylindrical-shape surrounding wall 46*b* surrounding the bottom wall 46*a*. Also, the bottom wall 46*a* may be formed with a plurality of members or may be a single member. The rotor case 46 is formed in such a manner that a bottom is relatively thin (relatively small thickness), and a height of the surrounding wall 46*b* is smaller than a radius of the bottom wall 46*a*. The round hole is formed in the center portion of the bottom wall 46*a*. The rotor case 46 has a cylindrical-shape axis supporting part (hereinafter, also referred to as an axis supporting part) 46*c* formed around the round hole of the bottom wall 46*a*. The axis supporting part 46*c* faces the surrounding wall 46*b* in the diameter direction.

Each of the plurality of magnets 47 is formed as a square permanent magnet that is bent with an arc shape. The plurality of magnets 47 is fixed on an inner surface of the surrounding wall 46*b* of the rotor case 46 so as to serially stand in the perimeter direction. The plurality of magnets 47 is arranged and magnetized to configure magnetic poles of the rotor 45 in such a manner that an S-pole and an N-pole alternate with each other. In an embodiment, four magnetic poles are formed at one magnet 47, for example.

A cylindrical-shape oil-impregnated sintered bearing (hereinafter, also referred to as an oil-impregnated sintered bearing) 48 is fixed at an inner side of the axis supporting part 46*c* in the diameter direction. The axis supporting part 46*c* is supported to be slidable with respect to the shaft 30 (more particularly, the main frame 51*m* fixed to the shaft 30) via the oil-impregnated sintered bearing 48. Accordingly, the rotor case 46 is rotatable with respect to the shaft 30.

Figure 7:
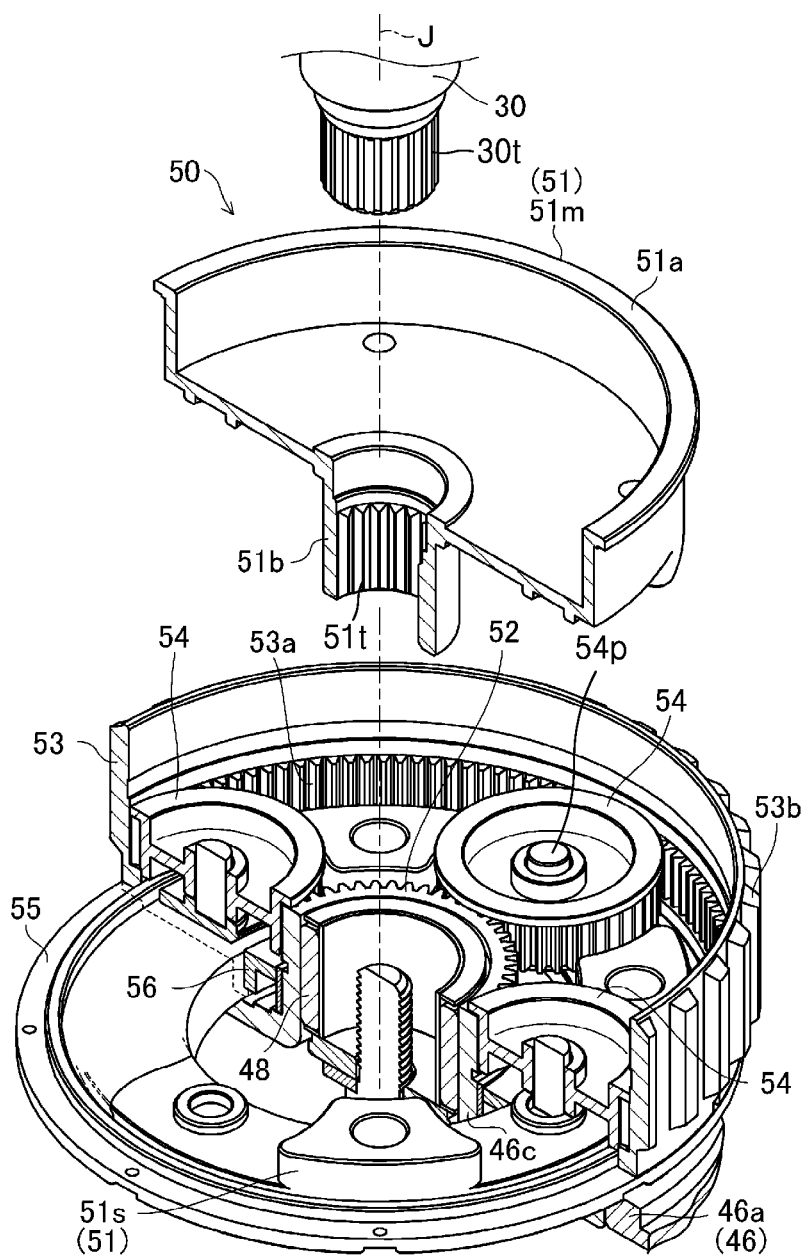
FIG. 7 is a schematic partial cutaway exploded perspective view of an embodiment of a decelerator.

FIG. 7 is a schematic partial cutaway exploded perspective view of an embodiment of a decelerator. Referring to FIG. 7, the decelerator 50 is provided between the shaft 30 and the rotor 45. The decelerator 50 is provided around the axis supporting part 46*c*. The decelerator 50 is contained in the rotor case 46. The decelerator 50 is a decelerator that uses a planetary gear system. The decelerator 50 includes a carrier 51, a sun gear 52, an internal gear 53, and a plurality (e.g., four in the illustrated embodiment) of planetary gears 54.

The carrier 51 is fixed to the shaft 30. In the illustrated embodiment, the carrier 51 includes the main frame 51*m* and a sub-frame 51*s*. The sub-frame 51*s* is an annular member including a plurality (e.g., four in the illustrated embodiment) of lower bearing recessed parts respectively corresponding to the plurality of planetary gears 54. The sub-frame 51*s* is disposed (e.g., mounted) on the rotor case 46 via an annular guide plate 55. A ring-shape first sliding member 56 is fixed at an inner side of the guide plate 55 in the diameter direction. The guide plate 55 is disposed (e.g., mounted) on the bottom wall 46*a* of the rotor case 46 while the guide plate 55 is rotatable by including the first sliding member 56 provided between the guide plate 55 and the axis supporting part 46*c*.

The main frame 51*m* may include a bottomed cylindrical-shape base part (hereinafter, also referred to as a base part) 51*a* including a thin bottom, and the cylindrical-shape axis fixing part 51*b* protruding from a center of the base part 51*a* in a rear direction of the base part 51*a*. A rear surface of the base part 51*a* faces the sub-frame 51*s*. A plurality (e.g., four in the illustrated embodiment) of upper bearing recessed parts that respectively face the plurality of lower bearing recessed parts formed at the sub-frame 51*s* is formed at the rear surface of the base part 51*a*. A serration 51*t* coupled to the base end of the shaft 30 is formed in an inner circumferential surface of the axis fixing part 51*b*. As the base end of the shaft 30 is inserted into the axis fixing part 51*b*, the main frame 51*m* is not-rotatablely fixed to the shaft 30. As shown in FIGS. 4 and 6, the axis supporting part 46*c* of the rotor 45 is supported via the oil-impregnated sintered bearing 48, around the axis fixing part 51*b*.

The sun gear 52 is rotatable with the rotor 45. In the illustrated embodiment, the sun gear 52 is formed at an outer circumferential surface of the axis supporting part 46*c*.

The internal gear 53 surrounds the sun gear 52. In the illustrated embodiment, the internal gear 53 is formed with a roughly cylindrical-shape member of which diameter is greater than that of the sun gear 52. A gear part 53*a* is disposed (e.g., mounted) at the lower part of an inner circumferential surface of the internal gear 53. Gearteeth are formed in all sides of the gear part 53*a*. Also, a plurality of inner slide guides 53*b* which are linear protrusions extending in a rotation-axis direction are equiangularly formed in an entirety of the perimeter of an outer circumferential surface of the internal gear 53. The internal gear 53 is provided with respect to the rotation-axis line J around the sun gear 52. The lower part of the internal gear 53 is provided on the guide plate 55. A ring-shape second sliding member (hereinafter, also referred to as a second sliding member) 57 (refer to FIG. 4) is fixed at an upper inner side of the internal gear 53. The carrier 51 (the main frame 51*m*) is supported to be rotatable with respect to the internal gear 53 via the second sliding member 57.

Each of the plurality of planetary gears 54 is supported to be rotatable on the carrier 51, and is provided between the sun gear 52 and the internal gear 53 so as to engage with both the sun gear 52 and the internal gear 53. In the illustrated embodiment, each of the plurality of planetary gears 54 is a gear member with a relatively small diameter. A pin hole penetrates through a center of the planetary gear 54. Opposite ends of a pin 54*p* inserted into the pin hole are supported by the upper bearing recessed part of the main frame 51*m* and the lower bearing recessed part of the sub-frame 51*s*. Gearteeth are formed in an entirety of the perimeter of an outer circumferential surface of the planetary gear 54. The gearteeth are engaged with both the sun gear 52 and the internal gear 53. With this configuration, when the sun gear 52 rotates with a preset speed while the internal gear 53 is fixed (not-rotatable), the plurality of planetary gears 54 rotates (revolves) while circling around (orbiting) the sun gear 52. Accordingly, the carrier 51 and the shaft 30 rotate with a reduced speed.

Figure 8:
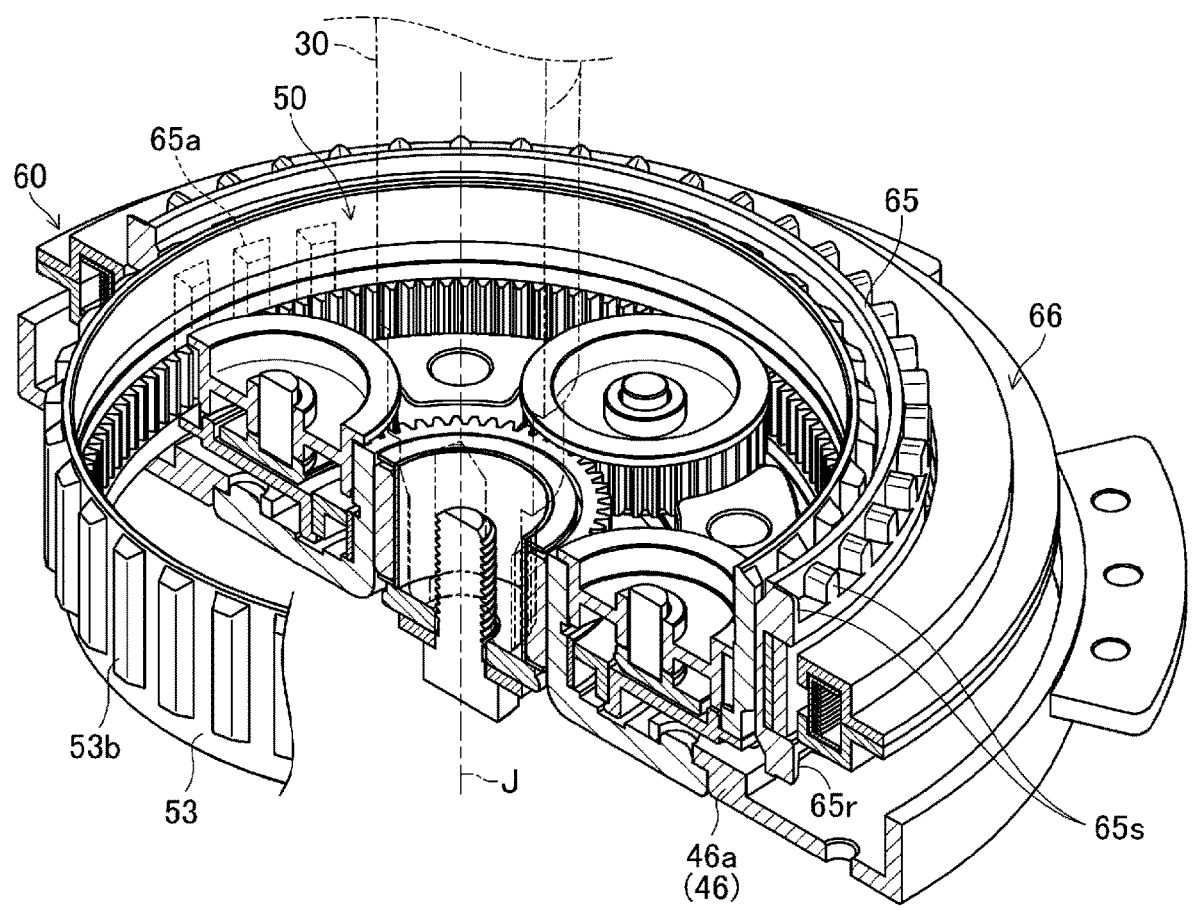
FIG. 8 is a schematic partial cutaway exploded perspective view of an embodiment of a decelerator and a clutch.
Figure 9:
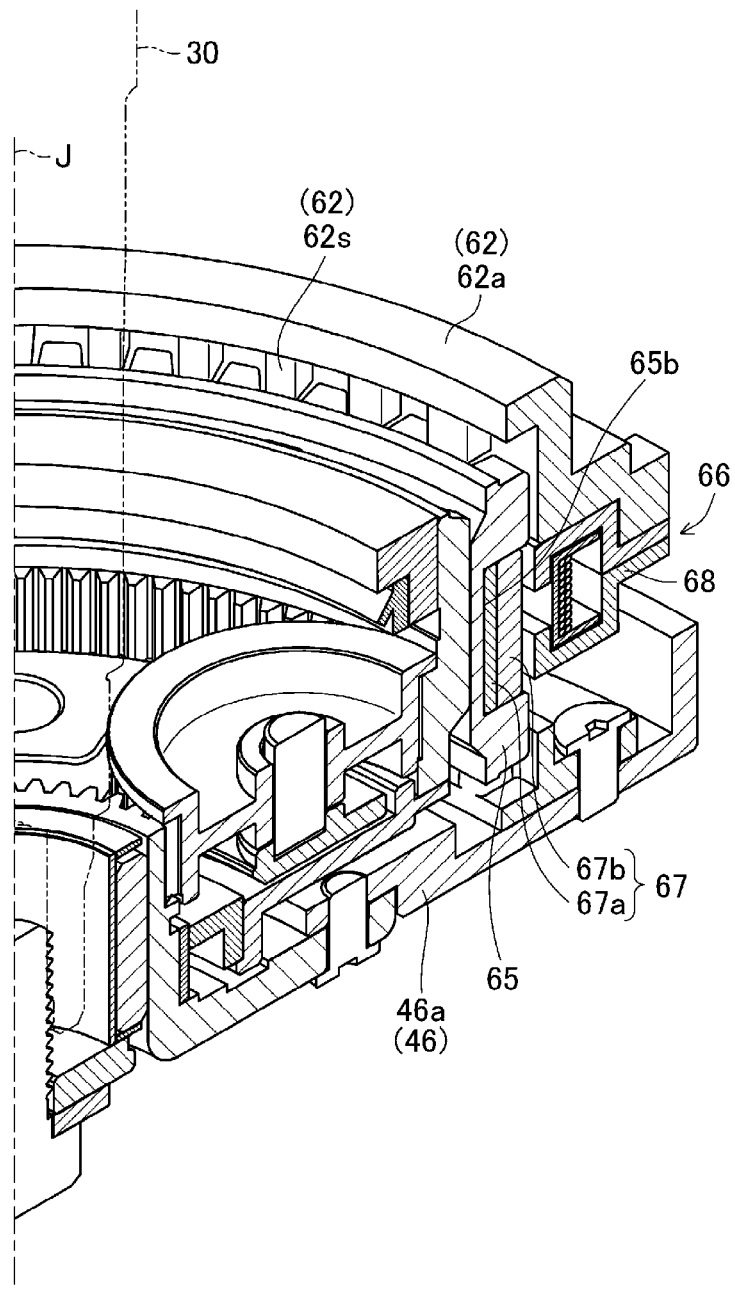
FIG. 9 is a schematic partial cutaway exploded perspective view of an embodiment of a decelerator and a clutch.
Figure 10:
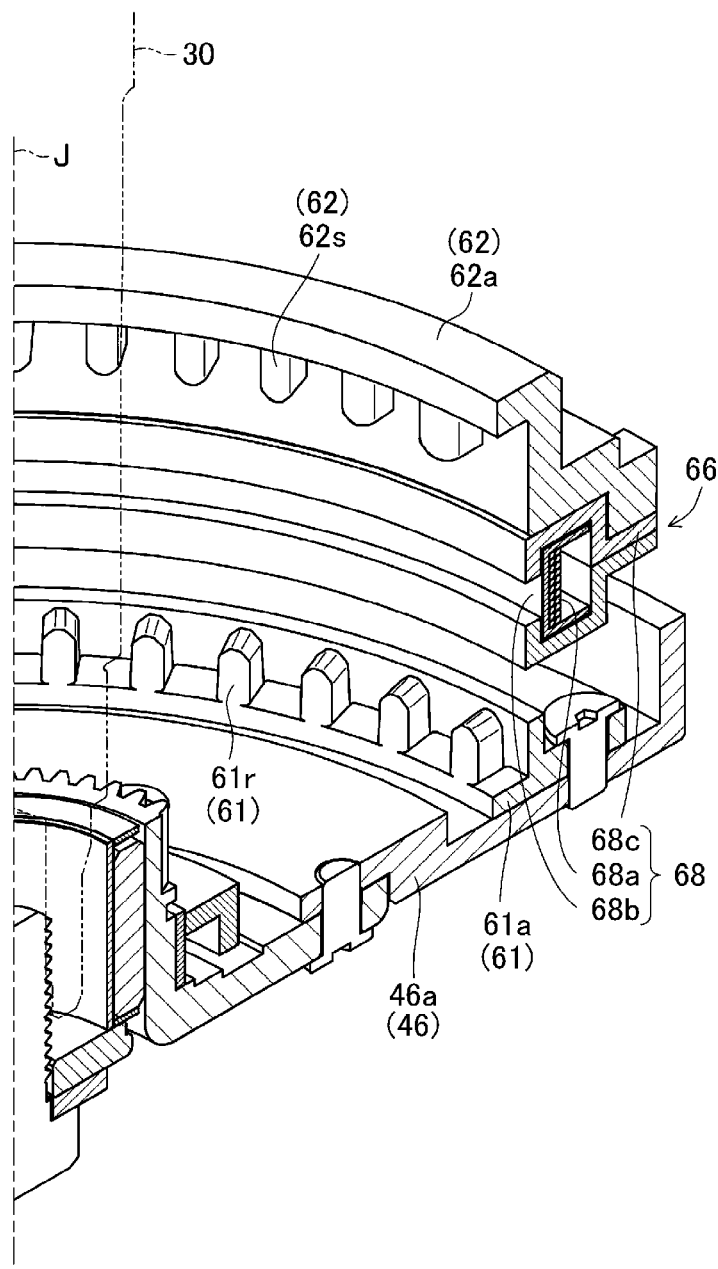
FIG. 10 is a schematic partial cutaway perspective view of an embodiment of a clutch.
Figure 11:
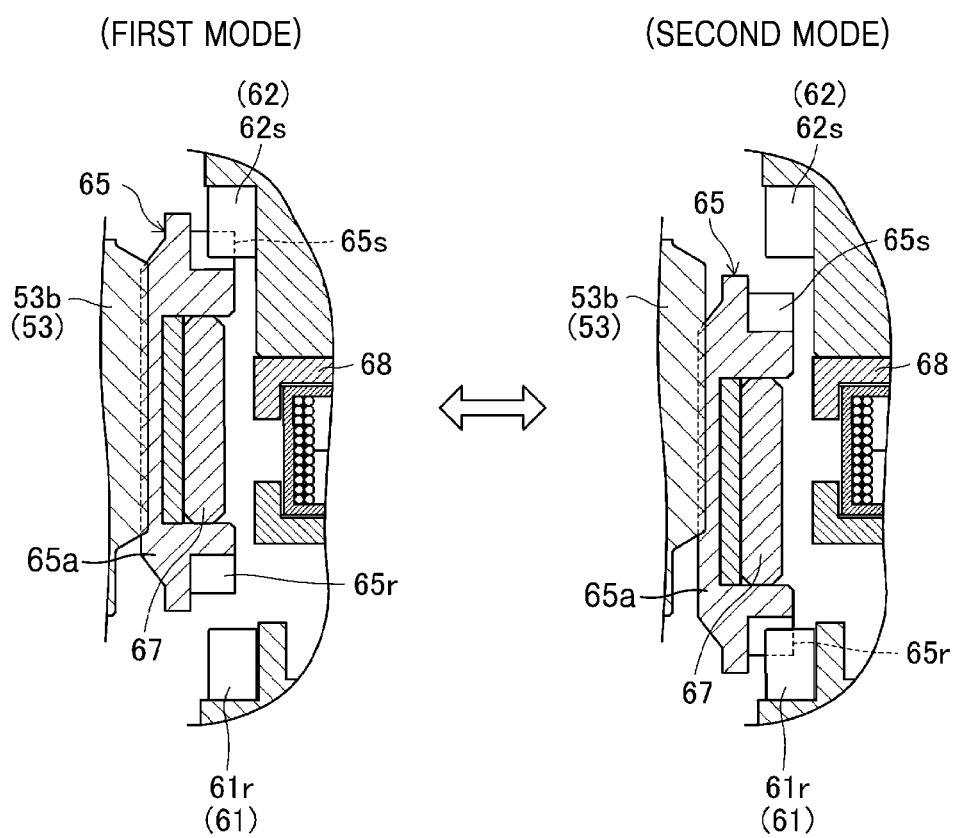
FIG. 11 is a schematic diagram for describing switching of a clutch.

FIGS. 8 and 9 are schematic partial cutaway perspective views of an embodiment of a decelerator and a clutch. FIG. 10 is a schematic partial cutaway perspective view of an embodiment of the clutch. FIG. 11 is a schematic diagram for describing switching of the clutch. Referring to FIGS. 8 to 11, the clutch 60 is contained in the rotor case 46 and is provided around the decelerator 50. The clutch 60 may be switched between a first mode and a second mode. In the first mode, rotation of the rotor 45 is transmitted to the shaft 30 via the decelerator 50. In the second mode, rotation of the rotor 45 is transmitted to the shaft 30 without passing through the decelerator 50. The clutch 60 includes a rotor-side fixing part 61, a stator-side fixing part 62, a moving part 65, and a driving part 66. The driving part 66 includes a mover 67 and a stator 68.

The rotor-side fixing part 61 is annularly formed around the shaft 30, and is rotatable by interoperating with rotation of the rotor 45. In the illustrated embodiment, the rotor-side fixing part 61 is fixed to the rotor 45. The rotor-side fixing part 61 may be provided at a part that rotates with the same speed as that of the rotor 45. In an embodiment, the rotor-side fixing part 61 may be unitary with the rotor case 46. In the illustrated embodiment, the rotor-side fixing part 61 includes a rotor-end base part 61*a* and a plurality of rotor-end fixed claws 61*r*, for example. The rotor-end base part 61*a* is annularly formed around the rotation-axis line J, and is disposed (e.g., mounted) on the bottom wall 46*a* of the rotor case 46. The plurality of rotor-end fixed claws 61*r* is annularly arrayed around the rotation-axis line J, and protrude in the axial direction from the rotor-end base part 61*a* toward the moving part 65 to be described below. As shown in FIG. 10, the plurality of rotor-end fixed claws 61*r* may include a plurality of protrusions that are equiangularly arrayed on an entirety of the perimeter. The plurality of protrusions upwardly protrudes.

The stator-side fixing part 62 is annularly formed around the shaft 30, and is fixed to the stator 41. The stator-side fixing part 62 faces the rotor-side fixing part 61 by defining a gap therebetween in an axial direction of the shaft 30. A length of the gap between the rotor-side fixing part 61 and the stator-side fixing part 62 in the axial direction is greater than a length of the moving part 65 in the axial direction.

In the illustrated embodiment, the stator-side fixing part 62 is directly fixed to the stator 41. The stator-side fixing part 62 may be indirectly fixed to the stator 41. In an embodiment, likewise to the stator 41, the stator-side fixing part 62 may be provided at a part that does not rotate, for example. In detail, the stator-side fixing part 62 may be unitary with the unit base 20 or the stator core 42. That is, a state of "fixed to the stator 41" includes not only a state of "directly fixed to the stator 41" but also a state of "indirectly fixed to the stator 41". An embodiment of the state of "indirectly fixed to the stator 41" may include a state of being provided at a part (e.g., the unit base 20) that does not rotate, likewise to the stator 41, a state of being unitary with a part that does not rotate, likewise to the stator 41, or the like.

In the illustrated embodiment, the stator-side fixing part 62 includes a stator-end base part 62*a* and a plurality of stator-end fixed claws 62*s*. The stator-end base part 62*a* is annularly formed around the rotation-axis line J, and is disposed (e.g., mounted) to the core portion 42*a* of the stator core 42. The plurality of stator-end fixed claws 62*s* is annularly arrayed around the rotation-axis line J, and protrude in the axial direction from the stator-end base part 62*a* toward the moving part 65 to be described below. As shown in FIG. 10, the plurality of stator-end fixed claws 62*s* may include a plurality of protrusions that are equiangularly arrayed on an entirety of the perimeter. The plurality of protrusions downwardly protrudes.

The moving part 65 is annularly formed around the shaft 30. The moving part 65 is movable in an axial direction between the rotor-side fixing part 61 and the stator-side fixing part 62. In the illustrated embodiment, the moving part 65 is installed on an outer side of the internal gear 53. The moving part 65 is rotatable with the internal gear 53. The moving part 65 is a cylindrical-shape member of which diameter is greater than that of the internal gear 53. Also, a plurality of outer slide guides 65*a* (refer to FIG. 8) which include linear protrusions extending in an axial direction is equiangularly formed in an entirety of the perimeter of an inner circumferential surface of the moving part 65. The outer slide guides 65*a* engage with the plurality of inner slide guides 53*b* (refer to FIG. 11) formed in the outer circumferential surface of the internal gear 53. The moving part 65 are provided around the internal gear 53 while the outer slide guides 65*a* respectively engage with the inner slide guides 53*b* of the internal gear 53. Accordingly, the moving part 65 is slidable in the axial direction.

The moving part 65 includes a plurality of rotor-end moving claws 65*r* (refer to FIG. 8), and a plurality of stator-end moving claws 65*s* (refer to FIG. 8). The plurality of rotor-end moving claws 65*r* is annularly arrayed around the rotation-axis line J, and protrudes toward the rotor-side fixing part 61 in the axial direction. Referring to FIG. 11, the plurality of rotor-end moving claws 65*r* may engage with the plurality of rotor-end fixed claws 61*r* of the rotor-side fixing part 61. In more detail, the plurality of rotor-end moving claws 65*r* may include a plurality of protrusions that are equiangularly arrayed on an entirety of the perimeter. The plurality of protrusions downwardly protrudes. The plurality of stator-end moving claws 65*s* is annularly arrayed around the rotation-axis line J, and protrude toward the stator-side fixing part 62 in the axial direction. Referring to FIG. 11, the plurality of stator-end moving claws 65*s* may engage with the plurality of stator-end fixed claws 62*s* of the stator-side fixing part 62. In detail, the plurality of stator-end moving claws 65*s* may include a plurality of protrusions that are equiangularly arrayed on an entirety of the perimeter. The plurality of protrusions upwardly protrudes.

The moving part 65 includes a mover containing part 65*b* (refer to FIG. 9).

The mover containing part 65*b* is open to the outside of the moving part 65 in the diameter direction. The mover containing part 65*b* contains the mover 67.

Also, the length of the gap between the rotor-side fixing part 61 and the stator-side fixing part 62 in the axial direction is greater than the length of the moving part 65 in the axial direction. Therefore, when the rotor-side fixing part 61 engages with (is connected with) the moving part 65, the stator-side fixing part 62 and the moving part 65 do not engage with each other, and the stator-side fixing part 62 and the moving part 65 face each other by defining a gap therebetween in the axial direction. When the stator-side fixing part 62 engages with (is connected with) the moving part 65, the rotor-side fixing part 61 and the moving part 65 do not engage with each other, and the rotor-side fixing part 61 and the moving part 65 face each other by defining a gap therebetween in the axial direction.

The driving part 66 drives the moving part 65. As shown in FIG. 9, the mover 67 of the driving part 66 includes a slider core 67*a* and a clutch magnet 67*b*, and is installed at the moving part 65. The slider core 67*a* is a cylindrical-shape metal member having a magnetic property, and is installed on an inner side of the mover containing part 65*b*. The clutch magnet 67*b* includes a permanent magnet. The clutch magnet 67*b* contacting a surface of the slider core 67*a* is installed on an entirety of the perimeter of the mover containing part 65*b*. In an embodiment, the clutch magnet 67*b* includes a plurality of magnetic members formed of a permanent magnet thin plate with an arc shape, for example. Each of the plurality of magnetic members includes a plurality of magnetic poles of which N-pole and S-pole alternate with each other in the axial direction. In an embodiment, when viewing the magnetic member in a transverse section direction, the magnetic member includes a center magnetic-pole part (e.g., an S-pole) at the center thereof, and end magnetic poles (e.g., N-poles) at opposite ends thereof in its axial direction, for example.

As illustrated in FIG. 10, the stator 68 of the driving part 66 includes a clutch coil 68*a*, a coil holder 68*b*, and holder supports 68*c*. The coil holder 68*b* is an insulating ring-shape member of which cross-section has a rough C-shape being open to the outside in the diameter direction. As a wire is wound around the coil holder 68b, the clutch coil 68a is formed. The holder supports 68c include a pair of upper and lower annular members into which the coil holder 68b is inserted. The holder supports 68c are fixed to the stator 41. Accordingly, the clutch coil 68a (the stator 68) faces the clutch magnet 67b (the mover 67) in the diameter direction by defining a slight gap therebetween. Electrification to the clutch coil 68a is controlled by the controller 15. When the clutch coil 68a is electrified, the clutch coil 68a generates a magnetic field for moving the clutch magnet 67b in the axial direction. In detail, due to electrification to the clutch coil 68a, a magnetic field is generated between the clutch coil 68a and the clutch magnet 67b. Accordingly, the moving part 65 moves in the axial direction.

As illustrated in FIG. 11, as the moving part 65 moves in the axial direction, the clutch 60 switches between a first mode and a second mode. In detail, the clutch 60 switches to the first mode as the stator-side fixing part 62 and the moving part 65 engage with each other, and the clutch 60 switches to the second mode as the rotor-side fixing part 61 and the moving part 65 engage with each other.

In the first mode, the internal gear 53 is supported to the stator 41 via the moving part 65. Accordingly, rotations of the rotor 45 and the sun gear 52 are transmitted to the shaft 30 and the carrier 51 via the decelerator 50. Accordingly, the driving unit 10 outputs high-torque rotatory power with low-speed rotations.

In the second mode, the internal gear 53 is supported to the rotor 45 via the moving part 65. Accordingly, rotations of the rotor 45 and the sun gear 52 are transmitted to the shaft 30 and the carrier 51 without passing through the decelerator 50. That is, as the rotor 45, the sun gear 52, and the internal gear 53 rotate as one body, the plurality of planetary gears 54 does not rotate (revolve). Thus, the shaft 30 and the carrier 51 also rotate as one body with them. Accordingly, the driving unit 10 outputs low-torque rotatory power with high-speed rotations.

FIG. 12 is a circuit diagram illustrating an embodiment of a driving circuit. FIG. 12 illustrates a configuration of the driving circuit 17 of Embodiment 1. Referring to FIG. 12, the driving circuit 17 includes a motor driving circuit 70 and a clutch driving circuit 80.

The motor driving circuit 70 drives the motor 40 by supplying power to the motor coil 43. The motor driving circuit 70 operates, in response to control by the processor 16. In the illustrated embodiment, the motor driving circuit 70 may include an inverter. In detail, the motor driving circuit 70 includes a first bus 72 and a second bus 73 connected to a direct-current power source 71, three output lines (a U-phase output line 74u, a V-phase output line 74v, and a W-phase output line 74w), and three arms (a U-phase arm 75u, a V-phase arm 75v, and a W-phase arm 75w). In an embodiment, the direct-current power source 71 may include a converter configured to convert an alternating current supplied from a commercial power source (not shown) into a direct current, for example.

The U-phase motor coil 43u, the V-phase motor coil 43v, and the W-phase motor coil 43w are star connected (Y connected). An access point of the U-phase motor coil 43u, the V-phase motor coil 43v, and the W-phase motor coil 43w is a neutral point 43c.

The U-phase output line 74u, the V-phase output line 74v, and the W-phase output line 74w are respectively connected to the U-phase motor coil 43u, the V-phase motor coil 43v, and the W-phase motor coil 43w. The U-phase output line 74u, the V-phase output line 74v, and the W-phase output line 74w are connected in parallel between the first bus 72 and the second bus 73. A center point of the U-phase arm 75u is connected to the U-phase output line 74u. A center point of the V-phase arm 75v is connected to the V-phase output line 74v. A center point of the W-phase arm 75w is connected to the W-phase output line 74w.

The U-phase arm 75u includes a first switching device SW1 and a second switching device SW2. The first switching device SW1 and the second switching device SW2 are connected in series between the first bus 72 and the second bus 73. The first switching device SW1 is connected between the first bus 72 and the U-phase output line 74u. The second switching device SW2 is connected between the U-phase output line 74u and the second bus 73. A free wheeling diode is connected to each of the first switching device SW1 and the second switching device SW2 in a back-to-back connection manner or an inverse parallel connection manner. An access point of the first switching device SW1 and the second switching device SW2 configures the center point of the U-phase arm 75u.

A configuration of each of the V-phase arm 75v and the W-phase arm 75w is equal to a configuration of the U-phase arm 75u. The V-phase arm 75v includes a third switching device SW3 and a fourth switching device SW4. The W-phase arm 75w includes a fifth switching device SW5 and a sixth switching device SW6.

The motor driving circuit 70 converts a direct current supplied from the direct-current power source 71 into an alternating current, and supplies the alternating current to the motor coil 43 (in the illustrated embodiment, the U-phase motor coil 43u, the V-phase motor coil 43v, and the W-phase motor coil 43w) in response to switching operations for switching ON or OFF of the first to sixth switching devices SW1 to SW6. Accordingly, the rotor 45 rotates. Also, a switching operation of the motor driving circuit is controlled by the processor 16. In an embodiment, the processor 16 controls the switching operation of the motor driving circuit 70 by pulse width modulation (PWM) control, so as to allow the rotor 45 to rotate at a preset speed, for example.

Also, a relation between "combination of ON and OFF of the first to sixth switching devices SW1 to SW6 of the motor driving circuit 70" and "motor current state flowing to the motor coil 43 (in which direction a motor current flows to which motor coil 43)" is uniquely determined. Also, a relation between "motor current state flowing to the motor coil 43" and "rotation phase of the rotor 45" is uniquely determined. Therefore, the rotation phase of the rotor 45 may be uniquely determined by determining a combination of ON and OFF of the first to sixth switching devices SW1 to SW6 of the motor driving circuit 70.

In the illustrated embodiment, the motor driving circuit 70 performs an operation (current control operation) of supplying power to the motor coil 43 so as to allow the motor current state flowing to the motor coil 43 to be a target state. The target state is set as a state in which the rotation phase of the rotor 45 becomes a target phase. Therefore, by switching the motor current state flowing to the motor coil 43 to the target state, the rotation phase of the rotor 45 may become the target phase. Also, the current control operation of the motor driving circuit 70 is controlled by the processor 16. In an embodiment, the processor 16 controls ON and OFF of the first to sixth switching devices SW1 to SW6 so as to allow a combination of ON and OFF of the first to sixth switching devices SW1 to SW6 of the motor driving circuit 70 to become a target combination, for example. The target combination is set as a combination (combination of ON and OFF of the first to sixth switching devices SW1 to SW6) when the rotation phase of the rotor 45 becomes the target phase.

The clutch driving circuit 80 drives the clutch 60 by supplying power to the clutch coil 68a. The clutch driving circuit 80 operates, in response to control by the processor 16. In the illustrated embodiment, the clutch driving circuit 80 does not use power supplied from the motor driving circuit 70, and supplies power to the clutch coil 68a. The clutch driving circuit 80 includes a first power line 81a and a second power line 81b which are connected to a direct-current power source 81, a first wiring 85, a second wiring 86, and a switching part 800. The first wiring 85 is connected to one end of the clutch coil 68a. The second wiring 86 is connected to the other end of the clutch coil 68a. Also, the direct-current power source 81 is a power source different from the direct-current power source 71. In an embodiment, the direct-current power source 81 may include a converter configured to convert an alternating current supplied from a commercial power source (not shown) into a direct current, for example.

The switching part 800 switches connection states of the first power line 81a and the second power line 81b with respect to the first wiring 85 and the second wiring 86. In the illustrated embodiment, the switching part 800 includes four switching devices SWa, SWb, SWc, and SWd. The switching device SWa is connected between the first power line 81a and the first wiring 85, and the switching device SWb is connected between the first wiring 85 and the second power line 81b. The switching device SWc is connected between the first power line 81a and the second wiring 86, and the switching device SWd is connected between the second wiring 86 and the second power line 81b. By switching the connection states of the first power line 81a and the second power line 81b with respect to the first wiring 85 and the second wiring 86, a direction of a clutch current flowing to the clutch coil 68a may be controlled.

Also, in the illustrated embodiment, when an absolute value of the clutch current flowing to the clutch coil 68a is equal to or greater than a threshold value, the moving part moves in the axial direction, due to a magnetic field generated in the clutch coil 68a. Also, when the direction of the clutch current flowing to the clutch coil 68a is changed, a movement direction (a direction of a movement in the axial direction) of the moving part is changed. In detail, when a clutch current flows from one end of the clutch coil 68a to the other end (e.g., from the left to the right in FIG. 12), the moving part 65 moves from one end in the axial direction to the other end (e.g., from the rotor-side fixing part 61 to the stator-side fixing part 62). Also, when a clutch current flows from the other end of the clutch coil 68a to the one end (e.g., from the right to the left in FIG. 12), the moving part moves from the other end in the axial direction to the one end (e.g., from the stator-side fixing part 62 to the rotor-side fixing part 61).

The clutch driving circuit 80 supplies power to the clutch coil 68a, so that a clutch current flowing to the clutch coil 68a flows in a target direction (a direction of a target), and an absolute value of the clutch current flowing to the clutch coil 68a becomes equal to or greater than a threshold value. The target direction is set as a direction of the clutch current when a movement direction in the axial direction becomes the direction of the target. The threshold value is set as the absolute value of the clutch current desired to generate a magnetic field for moving the moving part 65. Therefore, by allowing the direction of the clutch current to be the target direction, and allowing the absolute value of the clutch current to be equal to or greater than the threshold value, the moving part may move in the axial direction to the direction of the target.

An operation of the clutch driving circuit 80 is controlled by the processor 16. In an embodiment, when the processor 16 attempts to move the moving part 65 from one end in the axial direction to the other end (e.g., from the rotor-side fixing part 61 to the stator-side fixing part 62), the processor 16 turns the switching devices SWa and SWd to an ON state and turns the switching devices SWb and SWc to an OFF state in the clutch driving circuit 80, for example. Accordingly, the first power line 81a and the first wiring 85 are connected to each other, the second power line 81b and the second wiring 86 are connected to each other, and a clutch current flows from one end of the clutch coil 68a to the other end (e.g., from the left to the right in FIG. 12). As a result, the moving part 65 moves the moving part 65 from one end in the axial direction to the other end (e.g., from the rotor-side fixing part 61 to the stator-side fixing part 62).

In order to switch the clutch 60 between the first mode and the second mode, the controller 15 performs switching processing. In switching processing, the controller 15 moves the moving part 65 in the axial direction so as to switch the moving part 65 from a start state in which one of the rotor-side fixing part 61 and the stator-side fixing part 62 engages with the moving part 65 to an end state in which the other one of the rotor-side fixing part 61 and the stator-side fixing part 62 engages with the moving part 65.

Also, in switching processing, the controller 15 performs an adjustment operation before the end state starts. In the adjustment operation, the controller 15 adjusts an engagement position by changing the rotation phase of the rotor 45 so as to allow the engagement position of the moving part 65 with respect to the other one of the rotor-side fixing part 61 and the stator-side fixing part 62 to become a target engagement position. Hereinafter, an engagement position (rotation phase) of the moving part 65 with respect to the rotor-side fixing part 61 (or the stator-side fixing part 62) with which the moving part is attempted to be engaged is simply referred to as "engagement position". Also, the adjustment operation will be described in detail at a later time.

Also, a target engagement position of the moving part 65 with respect to the rotor-side fixing part 61 is a position where gaps between the plurality of rotor-end fixed claws 61r of the rotor-side fixing part 61 and the plurality of rotor-end moving claws 65r of the moving part 65 face in the axial direction. A target engagement position of the moving part 65 with respect to the stator-side fixing part 62 is a position where gaps between the plurality of stator-end fixed claws 62s of the stator-side fixing part 62 and the plurality of stator-end moving claws 65s of the moving part 65 face in the axial direction.

In the illustrated embodiment, in switching processing, the controller 15 performs a movement operation after the adjustment operation. In the movement operation, the controller 15 moves the moving part 65 in the axial direction. The movement operation will be described in detail at a later time.

When the rotor 45 rotates, the rotor-side fixing part 61 fixed to the rotor 45 rotates with the rotor 45. However, the stator-side fixing part 62 fixed to the stator 41 does not rotate even when the rotor 45 rotates. Therefore, when a rotation phase of the rotor 45 is changed, a rotation phase of the rotor-side fixing part 61 with respect to the stator-side fixing part 62 is changed, such that a relation of a rotation phase of "the moving part 65 that engages with one of the rotor-side fixing part 61 and the stator-side fixing part 62" with respect to "the other one of the rotor-side fixing part 61 and the stator-side fixing part 62" is changed. That is, an engagement position is changed. In this manner, a relation between the rotation phase of the rotor 45 and the engagement position is uniquely determined.

In the illustrated embodiment, in the adjustment operation, the controller 15 supplies power to the motor coil 43 so as to allow a rotation phase of the rotor 45 to be a target phase. The target phase of the rotor 45 is set as a rotation phase of the rotor 45 when an engagement position becomes a target engagement position. Therefore, by allowing the rotation phase of the rotor 45 to be the target phase, the engagement position may become the target engagement position.

In detail, in the illustrated embodiment, the rotor-side fixing part 61, the stator-side fixing part 62, and the moving part 65 are designed so that the engagement position becomes the target engagement position when the rotation phase of the rotor 45 becomes the target phase. The target phase of the rotor 45 is set as a rotation phase of the rotor 45 which is uniquely determined from a combination of ON and OFF of the switching devices SW1 to SW6 of the motor driving circuit 70. With this configuration, in the adjustment operation, a rotation phase of the rotor 45 may be adjusted to allow the engagement position to become the target engagement position, without detecting the rotation phase of the rotor 45.

Also, in the illustrated embodiment, the rotor-side fixing part 61, the stator-side fixing part 62, and the moving part 65 are designed so that the engagement position becomes the target engagement position while a rotation phase of the rotor-side fixing part 61 and a rotation phase of the stator-side fixing part 62 synchronize with each other when the rotation phase of the rotor 45 becomes the target phase.

In detail, in the illustrated embodiment, each of the plurality of rotor-end fixed claws 61r of the rotor-side fixing part 61, each of the plurality of stator-end fixed claws 62s of the stator-side fixing part 62, each of the plurality of rotor-end moving claws 65r of the moving part 65, and each of the plurality of stator-end moving claws 65s of the moving part 65 are equiangularly provided at integer-multiple intervals of 360 degrees (°) that is an electric angle.

In an embodiment, when the number of poles of the motor 40 is "P", and an angle (angle represented as a mechanical angle) of a gap between the rotor-end fixed claws 61r is "θm", Equation below is achieved, for example. A gap between the stator-end fixed claws 62s, a gap between the rotor-end moving claws 65r, and a gap between the stator-end moving claws 65s are each equal to the gap between the rotor-end fixed claws 61r.

$$\theta m = k \times 720/P$$

Here, "k" is an integer equal to or greater than 1.

Also, the plurality of rotor-end fixed claws 61r may include a plurality of first rotor-end fixed claws equiangularly provided by a gap θm, and a plurality of second rotor-end fixed claws equiangularly provided between the plurality of first rotor-end fixed claws. The aforementioned feature of the rotor-end fixed claws 61r is applied to the stator-end fixed claws 62s, the rotor-end moving claws 65r, and the stator-end moving claws 65s.

Also, in the illustrated embodiment, the number of the rotor-end moving claws 65r of the moving part 65 is equal to the number of the rotor-end fixed claws 61r of the rotor-side fixing part 61. The number of the stator-end moving claws 65s of the moving part 65 is equal to the number of the stator-end fixed claws 62s of the stator-side fixing part 62. The number of the stator-end fixed claws 62s of the stator-side fixing part 62 is equal to the number of the rotor-end fixed claws 61r of the rotor-side fixing part 61. That is, the number of each of the rotor-end fixed claws 61r, the stator-end fixed claws 62s, the rotor-end moving claws 65r, and the stator-end moving claws 65s is the same.

In detail, in the illustrated embodiment, k is "1", the number of poles (P) of the motor 40 is "48", the number of each of the rotor-end fixed claws 61r, the stator-end fixed claws 62s, the rotor-end moving claws 65r, and the stator-end moving claws 65s is "24", and each gap (θm) between the rotor-end fixed claws 61r, between the stator-end fixed claws 62s, between the rotor-end moving claws 65r, and between the stator-end moving claws 65s is "15°".

Figure 13:
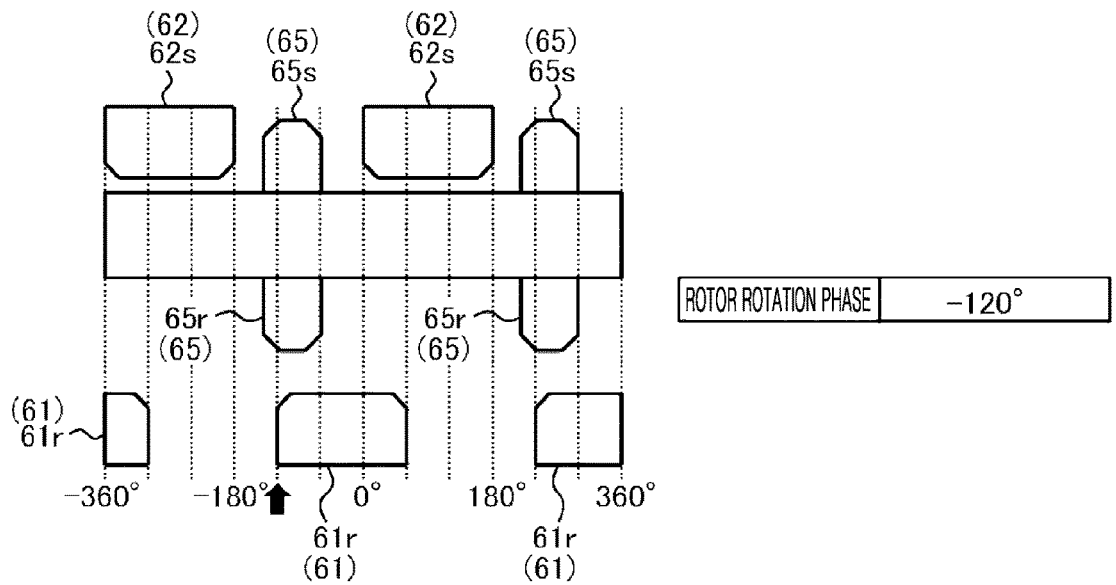
FIG. 13 is a schematic diagram for describing an embodiment of a first adjustment operation.
Figure 13:
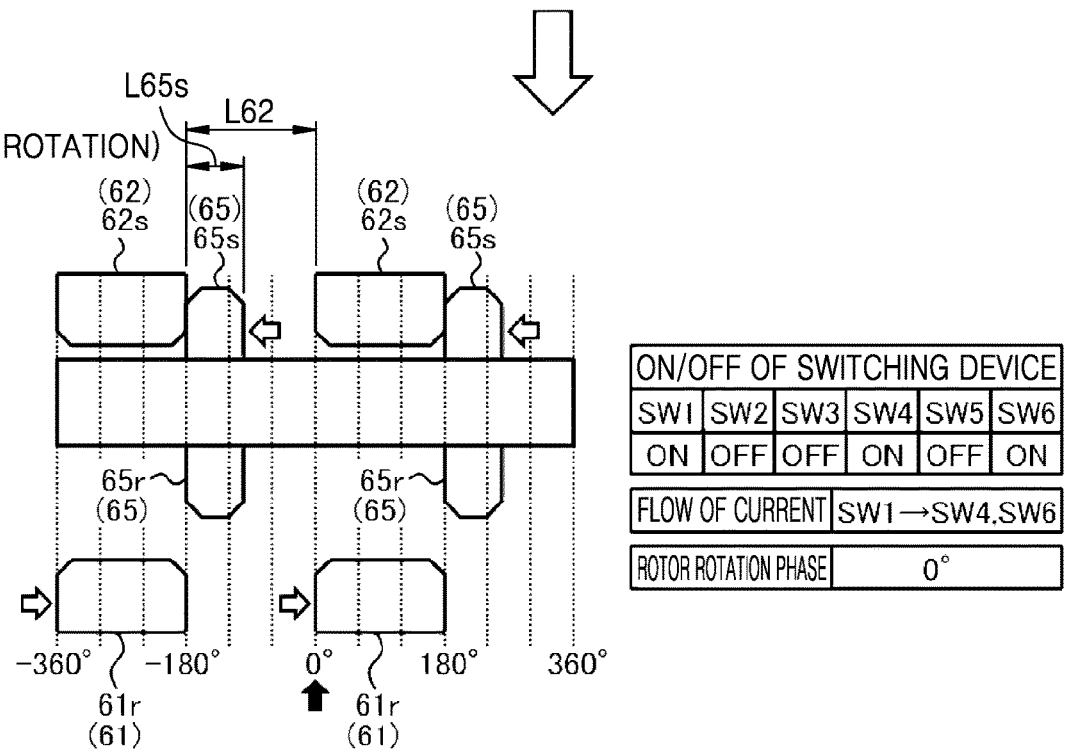
Figure 14:
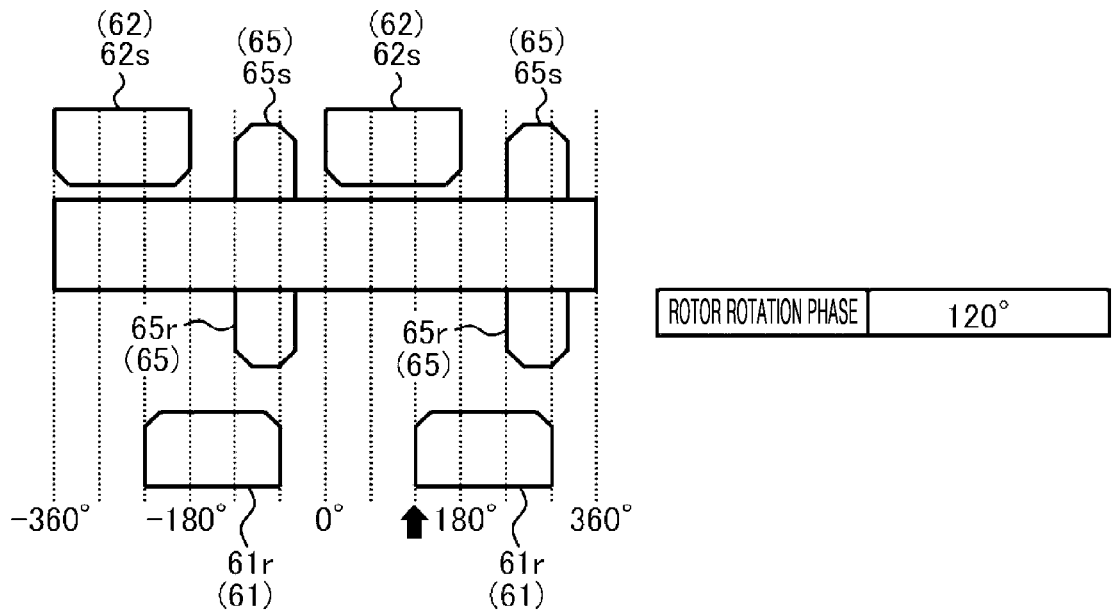
FIG. 14 is a schematic diagram for describing an embodiment of the first adjustment operation.
Figure 14:
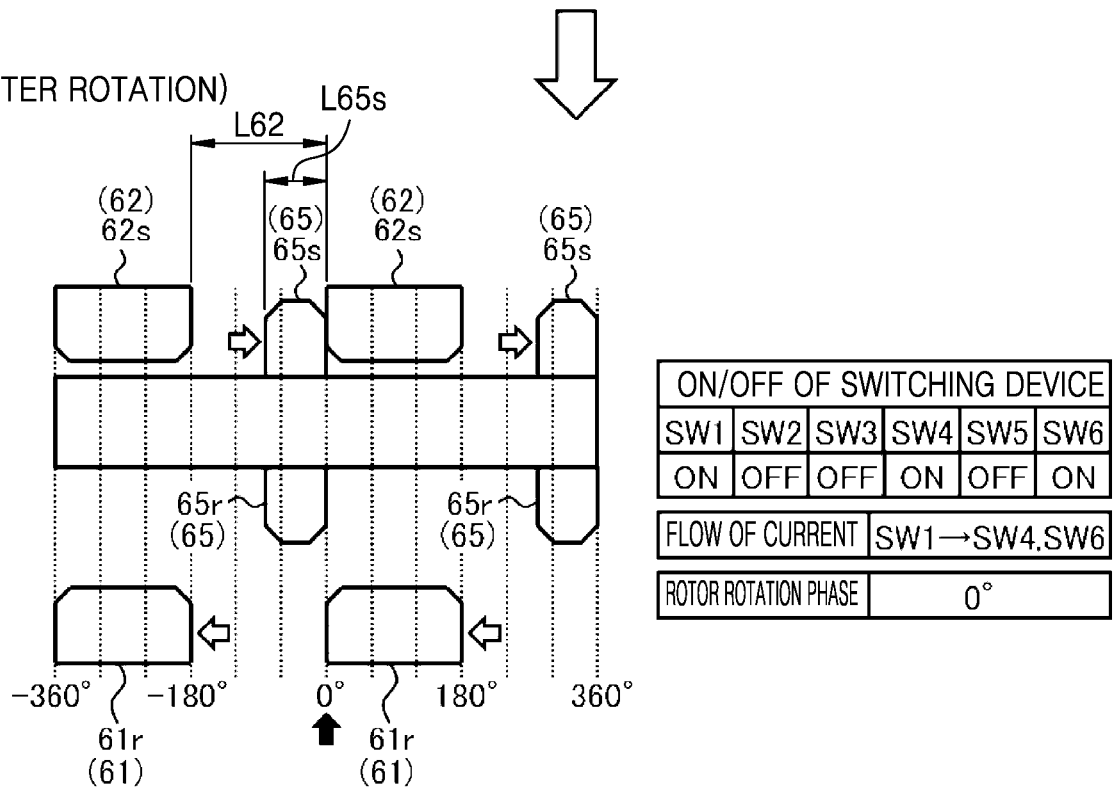

FIGS. 13 and 14 are schematic diagrams for describing an embodiment of the first adjustment operation. First, referring to FIG. 13, the first adjustment operation will now be described, which is an adjustment operation performed in switching processing for switching the moving part 65, by moving the moving part 65 in the axial direction, from a start state in which the stator-side fixing part 62 engages with the moving part 65 to an end state in which the rotor-side fixing part 61 engages with the moving part 65. Also, an angle used hereinafter is an electric angle. FIG. 13 illustrates an embodiment of a case in which a rotation phase of the rotor 45 is changed from "−120°" to "0°" that is a target phase.

When the stator-side fixing part 62 engages with the moving part 65, and the rotor rotates, the rotor-side fixing part 61 rotates with respect to the stator-side fixing part 62. As a result, a relation of a rotation phase between the rotor-side fixing part 61 and the moving part 65 that engages with the stator-side fixing part 62 is changed, and a relation (engagement position) of a rotation phase of the moving part 65 with respect to the rotor-side fixing part 61 is changed.

Also, when the stator-side fixing part 62 engages with the moving part 65, a rotatory power of the rotor 45 is transmitted to the moving part 65 via the sun gear 52, the planetary gears 54, and the internal gear 53. Due to this rotatory power, the moving part rotates, and the stator-end moving claw 65s of the moving part 65 contacts the stator-end fixed claw 62s of the stator-side fixing part 62. In the illustrated embodiment, the moving part 65 rotates in a direction being opposite to a rotation direction of the rotor 45.

As illustrated in FIG. 13, the controller 15 turns the first, fourth, and sixth switching devices SW1, SW4, and SW6 to an ON state and turns the second, third, and fifth switching devices SW2, SW3, and SW5 to an OFF state in the motor driving circuit 70. Accordingly, a motor current output from the first switching device SW1 is input to the neutral point 43c via the U-phase motor coil 43u. The motor current input to the neutral point 43c is divided into the V-phase motor coil 43v and the W-phase motor coil 43w and input to the fourth switching device SW4 and the sixth switching device SW6.

As the motor current flows to the motor coil 43 in the aforementioned manner, the rotor 45 rotates such that a rotation phase of the rotor 45 becomes "0°". Accordingly, rotation phases of the rotor 45 and the rotor-side fixing part 61 become a target phase (0° in the illustrated embodiment). An engagement position of the moving part 65 with respect to the rotor-side fixing part 61 becomes a target engagement position.

Also, due to a position of the rotor 45 before the motor current is applied (a rotation phase of the rotor 45 before rotation), the rotor 45 rotates in a forward direction (a right direction in the embodiment of FIG. 13) or a reverse direction (a left direction in the embodiment of FIG. 13), so that the rotation phase of the rotor 45 becomes a target phase. Also, as the rotor 45 rotates, the moving part 65 rotates in the reverse direction or the forward direction.

In an embodiment, as illustrated in FIG. 13, when the rotation phase of the rotor before rotation is "−120°", the rotor 45 rotates in the forward direction (the right direction in the embodiment of FIG. 13) so that the rotation phase of the rotor 45 becomes from "−120°" to "0°". As illustrated in FIG. 14, when the rotation phase of the rotor 45 before rotation is "120°", the rotor 45 rotates in the reverse direction (a left direction in the embodiment of FIG. 14) so that the rotation phase of the rotor 45 becomes from "120°" to "0°", for example.

In this manner, due to the rotation phase of the rotor 45 before rotation, a rotation direction of the rotor 45 is changed in the first adjustment operation. Also, in the illustrated embodiment, when a rotation phase of the rotor 45 is a target phase, a rotation phase of the rotor-side fixing part 61 and a rotation phase of the stator-side fixing part 62 synchronize with each other. Also, the number of the plurality of rotor-end fixed claws 61r and the number of the plurality of stator-end fixed claws 62s are the same. With this configuration, even when the rotor 45 rotates in any one of the forward direction and the reverse direction in the first adjustment operation, a rotation phase of the rotor 45 is set as a target phase, so that an engagement position of the moving part 65 with respect to the rotor-side fixing part 61 may set as a target engagement position.

Figure 15:
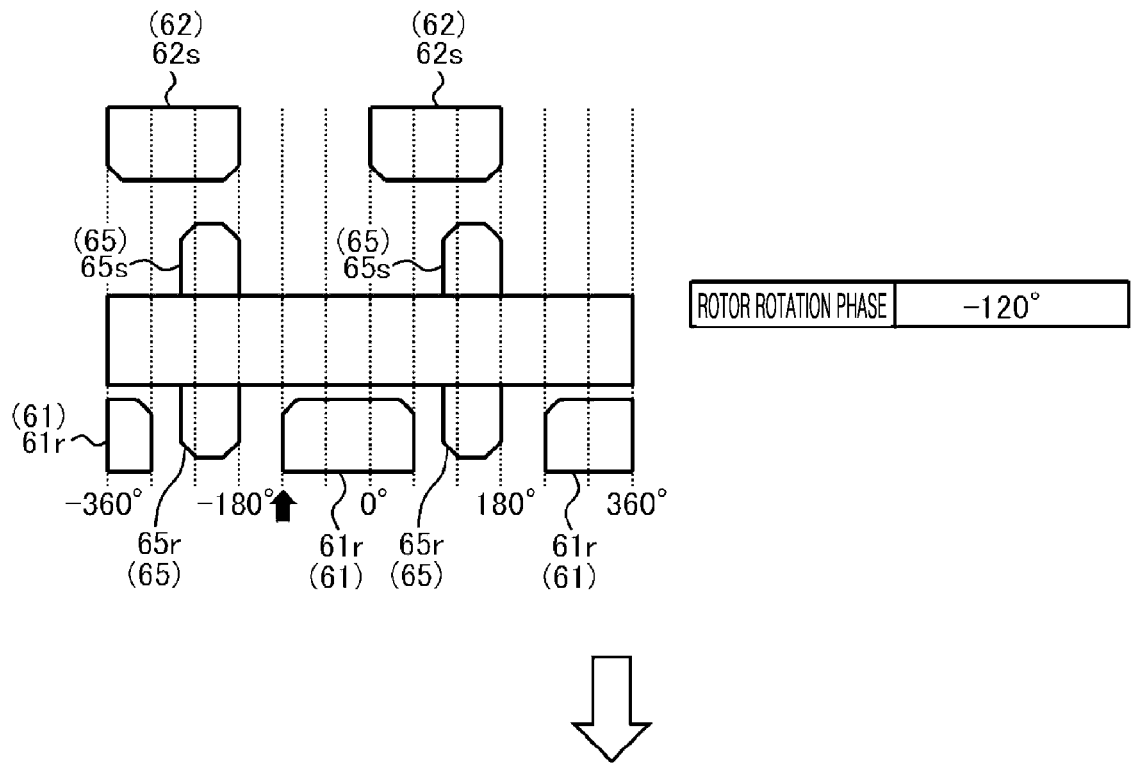
FIG. 15 is a schematic diagram for describing an embodiment of a second adjustment operation.
Figure 15:
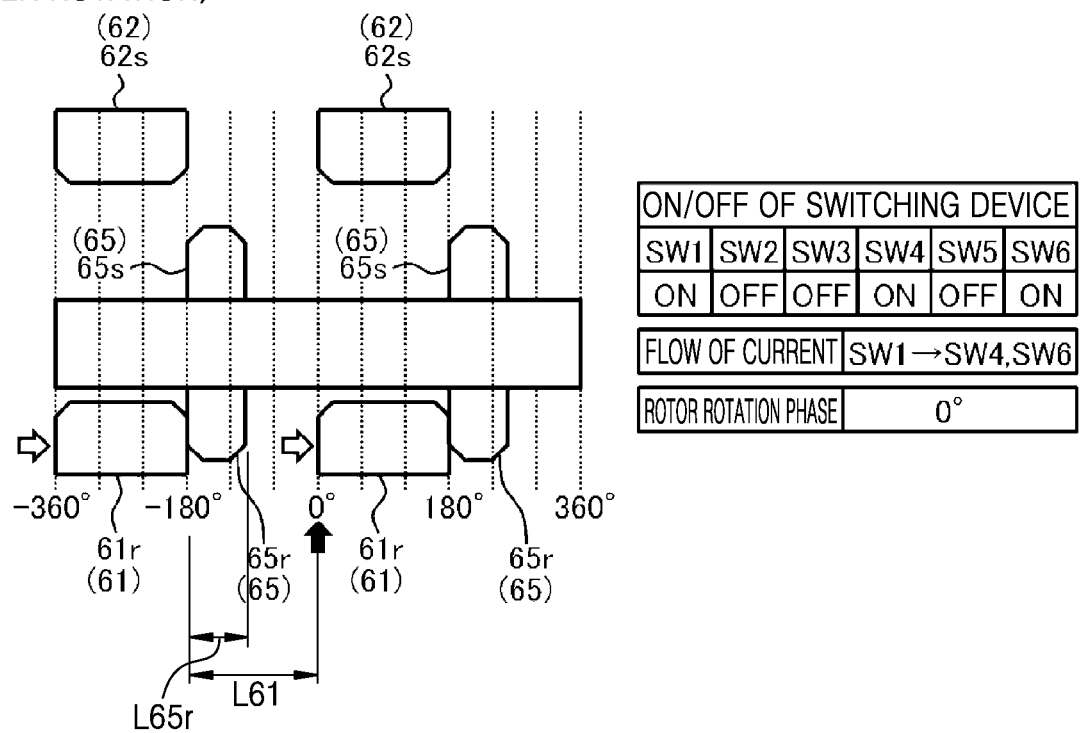
Figure 16:
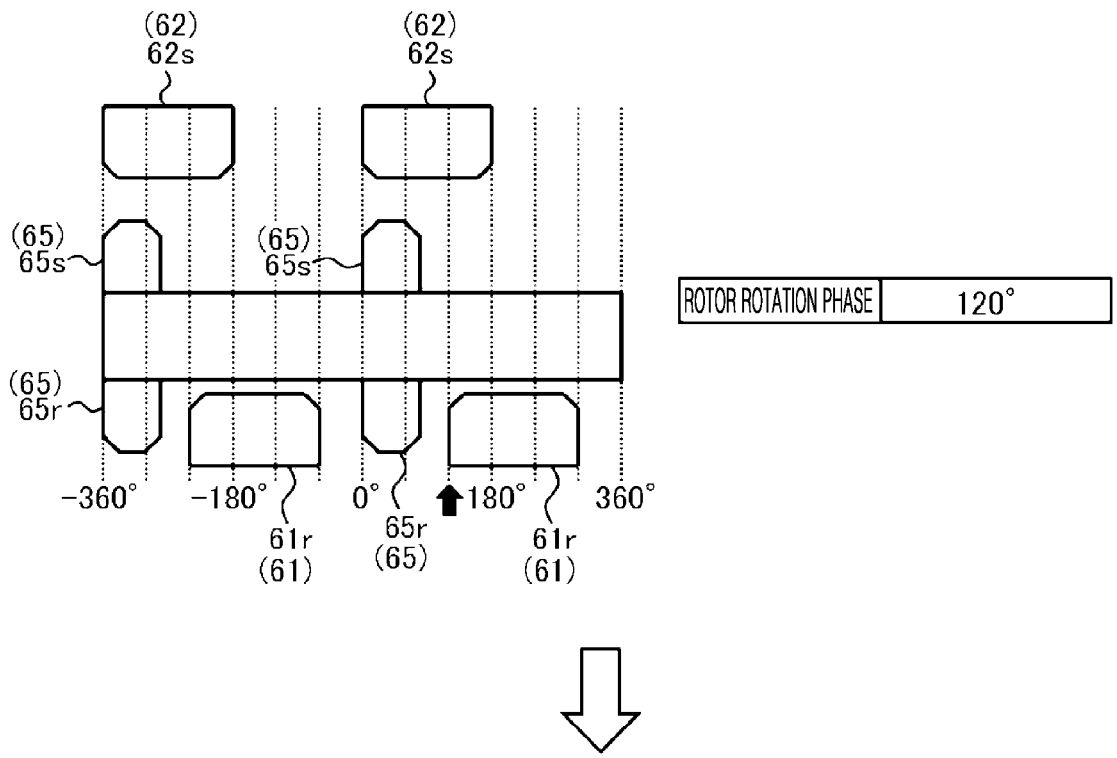
FIG. 16 is a schematic diagram for describing an embodiment of the second adjustment operation.
Figure 16:
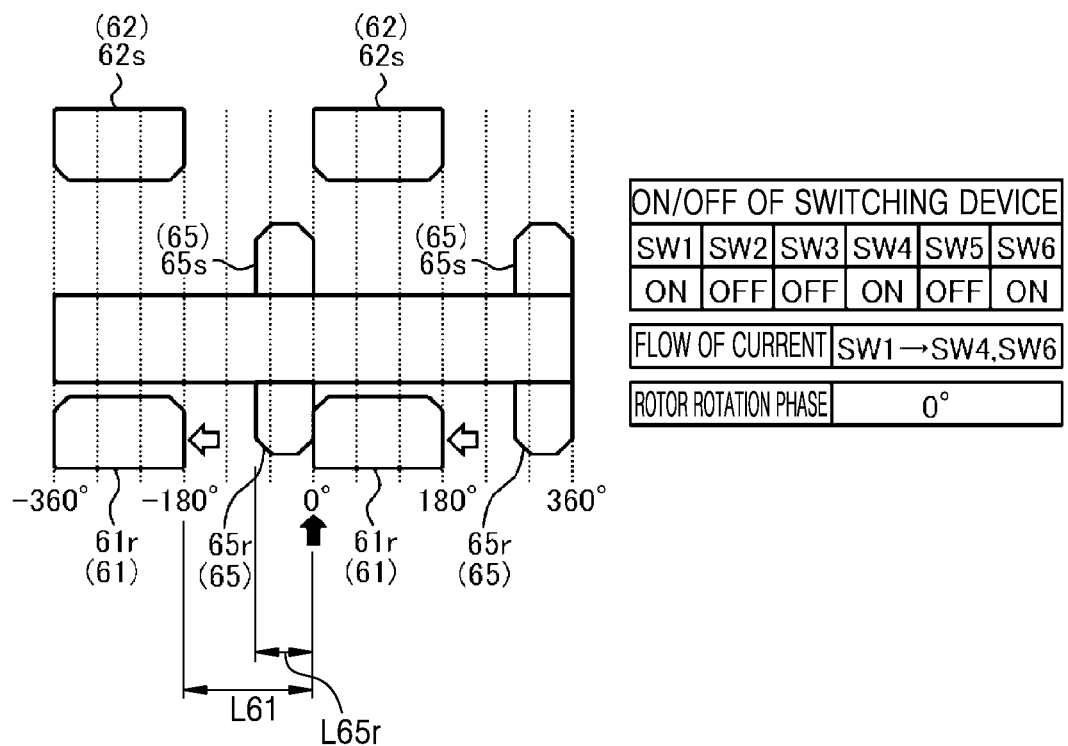

FIGS. 15 and 16 are schematic diagrams for describing an embodiment of the second adjustment operation. First, referring to FIG. 15, the second adjustment operation will now be described, which is an adjustment operation performed in switching processing for switching the moving part 65, by moving the moving part 65 in the axial direction, from a start state in which the rotor-side fixing part 61 engages with the moving part 65 to an end state in which the stator-side fixing part 62 engages with the moving part 65. Also, an angle used hereinafter is an electric angle. FIG. 15 illustrates an embodiment of a case in which a rotation phase of the rotor 45 is changed from "−120°" to "0°" that is a target phase. In the illustrated embodiment, the target phase in the second adjustment operation is equal to a target phase in the first adjustment operation.

When the rotor-side fixing part 61 engages with the moving part 65, and the rotor rotates, the moving part 65 engaging with the rotor-side fixing part 61 rotates. In detail, when the rotor-side fixing part 61 rotates with the rotor 45, the rotor-end fixed claw 61r of the rotor-side fixing part 61 contacts the rotor-end moving claw 65r of the moving part 65, and a rotatory power of the rotor-side fixing part 61 is transmitted to the moving part 65. Accordingly, the rotor-side fixing part 61 and the moving part 65 rotate together. As a result, a relation of a rotation phase between the stator-side fixing part 62 and the moving part 65 that engages with the rotor-side fixing part 61 is changed, and a relation (engagement position) of a rotation phase of the moving part 65 with respect to the stator-side fixing part 62 is changed.

As illustrated in FIG. 15, the controller 15 turns the first, fourth, and sixth switching devices SW1, SW4, and SW6 to an ON state and turns the second, third, and fifth switching devices SW2, SW3, and SW5 to an OFF state in the motor driving circuit 70. Accordingly, a motor current output from the first switching device SW1 is input to the neutral point 43c via the U-phase motor coil 43u. The motor current input to the neutral point 43c is divided into the V-phase motor coil 43v and the W-phase motor coil 43w and input to the fourth switching device SW4 and the sixth switching device SW6.

As the motor current flows to the motor coil 43 in the aforementioned manner, the rotor 45 rotates such that a rotation phase of the rotor 45 becomes "0°". Accordingly, rotation phases of the rotor 45 and the rotor-side fixing part 61 become a target phase (0° in the illustrated embodiment). Also, a rotation phase of the moving part 65 becomes a phase according to a target phase. An engagement position of the moving part 65 with respect to the stator-side fixing part 62 becomes a target engagement position.

Also, due to a position of the rotor 45 before the motor current is applied (a rotation phase of the rotor 45 before rotation), the rotor 45 rotates in a forward direction (a right direction in the embodiment of FIG. 15) or a reverse direction (a left direction in the embodiment of FIG. 15), so that the rotation phase of the rotor 45 becomes a target phase. Also, as the rotor 45 rotates, the moving part 65 rotates in the forward direction or the reverse direction.

In an embodiment, as illustrated in FIG. 15, when the rotation phase of the rotor before rotation is "−120°", the rotor 45 rotates in the forward direction (the right direction in the embodiment of FIG. 15) so that the rotation phase of the rotor 45 becomes from "−120°" to "0°", for example. As illustrated in FIG. 16, when the rotation phase of the rotor before rotation is "120°", the rotor 45 rotates in the reverse direction (a left direction in the embodiment of FIG. 16) so that the rotation phase of the rotor 45 becomes from "120°" to "0°".

In this manner, due to the rotation phase of the rotor 45 before rotation, a rotation direction of the rotor 45 is changed in the second adjustment operation. Also, in the illustrated embodiment, when a rotation phase of the rotor 45 is a target phase, a rotation phase of the rotor-side fixing part 61 and a rotation phase of the stator-side fixing part 62 synchronize with each other. Also, the number of the plurality of rotor-end fixed claws 61r and the number of the plurality of stator-end fixed claws 62s are the same. With this configuration, even when the rotor 45 rotates in any one of the forward direction and the reverse direction in the second adjustment operation, a rotation phase of the rotor 45 is set as a target phase, so that an engagement position of the moving part 65 with respect to the rotor-side fixing part 61 may set as a target engagement position.

As described above, in switching processing, the controller 15 performs, after the adjustment operation, a movement operation of moving the moving part 65 in the axial direction. In the illustrated embodiment, in the movement operation, the controller 15 supplies power to the clutch coil 68a so that an absolute value of a clutch current flowing to the clutch coil 68a is equal to or greater than a threshold value, and a direction of the clutch current flowing to the clutch coil 68a becomes a target direction (a direction of a current which corresponds to a direction in which the moving part 65 is attempted to move). Accordingly, the moving part 65 moves in the axial direction and switches from a start state in which one of the rotor-side fixing part 61 and the stator-side fixing part 62 engages with the moving part 65 to an end state in which the other one of the rotor-side fixing part 61 and the stator-side fixing part 62 engages with the moving part 65.

Also, in the movement operation, the controller 15 maintains (fixes) a rotation phase of the rotor 45 so as to allow an engagement position to be maintained at a target engagement position. In detail, power is supplied to the motor coil 43 so that a motor current state flowing to the motor coil 43 is maintained at a target state (a state according to a target phase of the rotor 45).

Also, in the illustrated embodiment, a perimeter direction length L61 (refer to FIG. and FIG. 16) between the plurality of rotor-end fixed claws 61r in the rotor-side fixing part 61 is greater than "perimeter direction length L65r (refer to FIG. 15 and FIG. 16) of the rotor-end moving claw 65r of the moving part 65". With this configuration, when an engagement position of the moving part 65 with respect to the rotor-side fixing part 61 is a target engagement position, gaps between the plurality of rotor-end fixed claws 61r and the plurality of rotor-end moving claws 65r may face in the axial direction. Accordingly, an engagement error between the rotor-side fixing part 61 and the moving part 65 may be avoided.

Also, in the illustrated embodiment, a perimeter direction length L62 (refer to FIG. and FIG. 14) between the plurality of stator-end fixed claws 62s in the stator-side fixing part 62 is greater than "perimeter direction length L65s of the stator-end moving claw 65s (refer to FIG. 13 and FIG. 14) of the moving part 65". With this configuration, when an engagement position of the moving part 65 with respect to the stator-side fixing part 62 is a target engagement position, gaps between the plurality of stator-end fixed claws 62s and the plurality of stator-end moving claws 65s may face in the axial direction. Accordingly, an engagement error between the stator-side fixing part 62 and the moving part 65 may be avoided.

Figure 17:
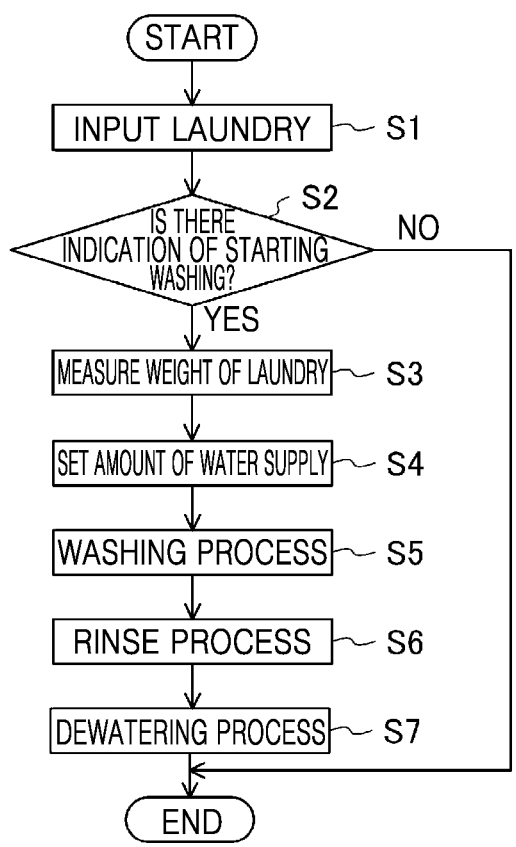
FIG. 17 is a flowchart illustrating an embodiment of an operation of a washing machine.
Figure 18:
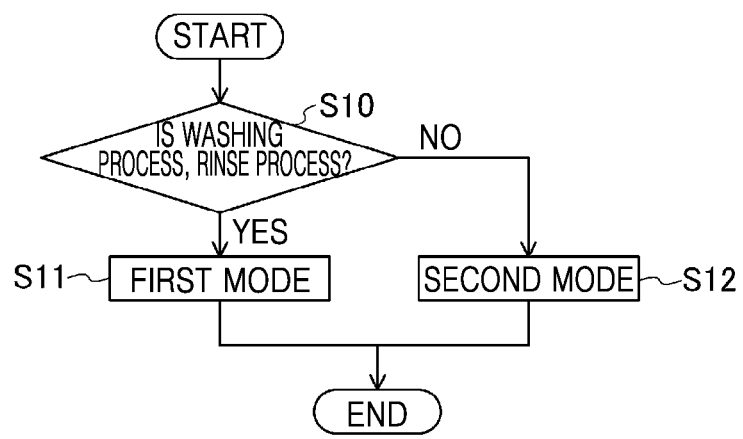
FIG. 18 is a flowchart of an embodiment of processing in which clutch switching is performed.

FIG. 17 is a flowchart of an embodiment of an operation of a washing machine. FIG. 18 is a flowchart of an embodiment of processing in which clutch switching is performed. First, referring to FIG. 17, an embodiment of an operation of the washing machine 1 will now be described.

When the operation of the washing machine 1 is performed, first, laundry is input to the rotatable tub 4 (operation S1). In the illustrated embodiment, when the laundry is input, a detergent is also input to the chemical feeder 5c. Then, due to manipulation of the manipulation part 2c, an indication of starting washing is input to the controller 15 (particularly, the processor 16) (YES in operation S2). Accordingly, the controller 15 automatically starts a series of washing processes including washing, rinse, dewatering, or the like.

Before the washing processes, the controller 15 measures a weight of the laundry so as to set an amount of water supply (operation S3). The controller 15 sets an appropriate amount of water supply based on the measured weight of the laundry (operation S4).

When setting of the amount of water supply is ended, the controller 15 starts the washing processes operation S5). When the washing processes start, the controller 15 controls the water supply valve 5b, and supplies a set amount of water into the fixed tub 3. At that time, the detergent contained in the chemical feeder 5c and water are inserted into the fixed tub 3.

Afterward, the controller 15 drives the driving unit 10, and starts rotation of the rotatable tub 4. Before rotation of the rotatable tub 4 is started, the controller 15 may determine whether it is a washing process or a rinse process, as illustrated in FIG. 18 (operation S10). When it is the washing process or the rinse process, the controller 15 sets the clutch 60 as the first mode (operation S11). However, when it is not the washing process or the rinse process (that is, when it is a dewatering process), the controller 15 sets the clutch 60 as the second mode (operation S12).

When it is the washing process (operation S5), the controller 15 sets the clutch as the first mode. Accordingly, the driving unit 10 outputs high-torque rotatory power at a relatively low speed. Therefore, the rotatable tub 4 that is relatively heavy may efficiently rotate at a relatively low speed.

When the washing process is ended, the controller 15 starts the rinse process (operation S6). In the rinse process, washing water gathered in the fixed tub 3 is drained, due to driving of the drain pump 6. Afterward, the controller 15 performs processing of water supply or stirring, as in the washing process. In the rinse process, the driving unit is driven while the clutch 60 is maintained in the first mode.

When the rinse process is ended, the processor 16 starts the dewatering process (operation S7). In the dewatering process, the rotatable tub 4 is rotation-driven at a relatively high speed for a preset time. In detail, before the dewatering process is started, the controller 15 switches the clutch 60 into the second mode. As the clutch 60 is set to the second mode, the driving unit 10 outputs low-torque rotatory power with high-speed rotations. Therefore, the rotatable tub 4 that is relatively light may efficiently rotate at a relatively high speed.

The laundry is stuck onto an inner surface of the rotatable tub 4, due to a centrifugal force. Water in the laundry is drained out of the rotatable tub 4. Accordingly, the laundry is dewatered. Due to dewatering, water gathered in the fixed tub 3 is drained, due to driving of the drain pump 6. When the dewatering is ended, the controller 15 notifies an end of washing by buzzing a preset buzzer (not shown) or the like. Then, the operation of the washing machine 1 is finished.

Figure 19:
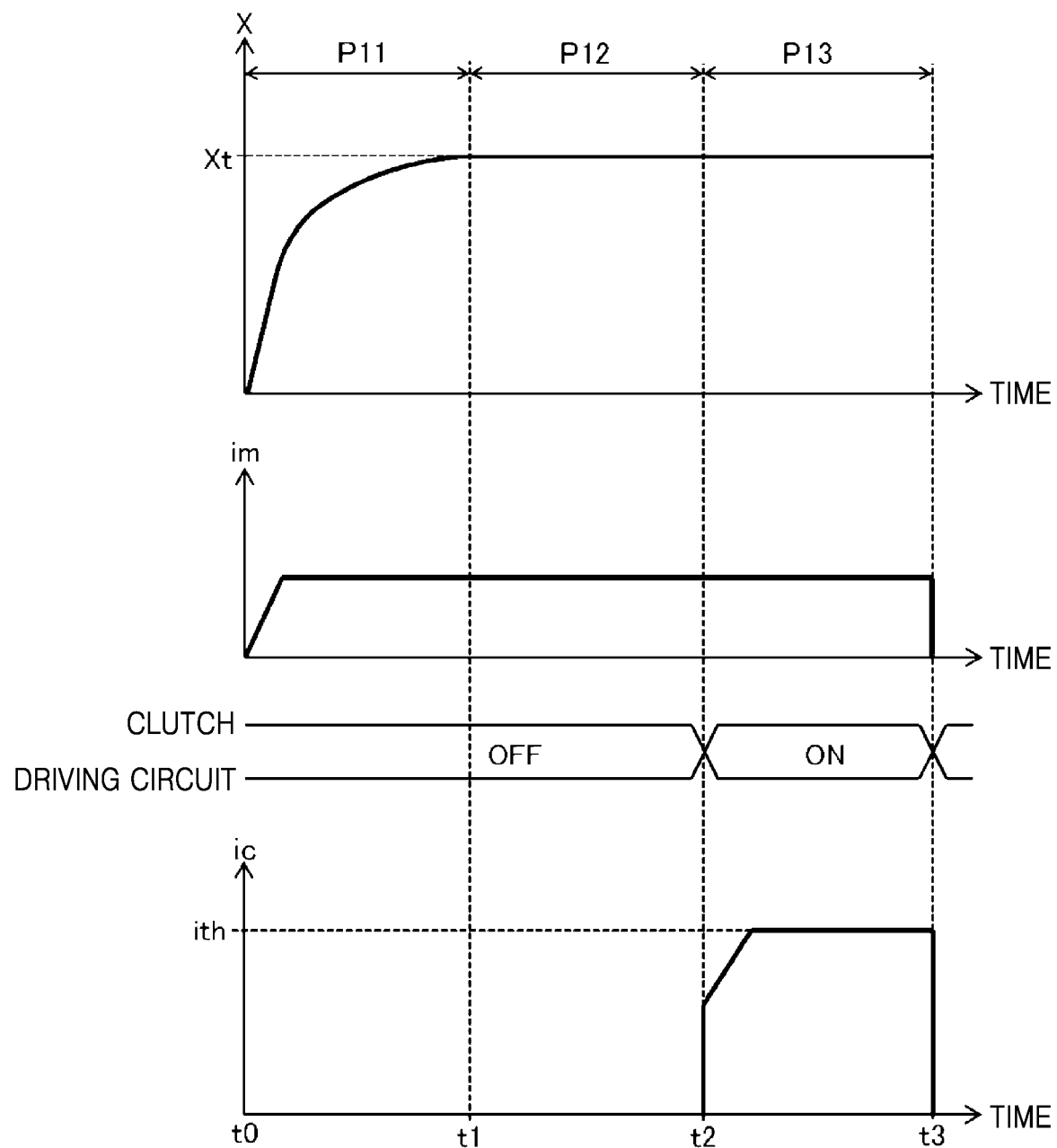
FIG. 19 is a timing chart for describing an embodiment of switching processing performed before a dewatering process.

FIG. 19 is a timing chart for describing an embodiment of switching processing performed before the dewatering process. With reference to FIG. 19, switching processing performed before the dewatering process will now be described. In switching processing performed before the dewatering process, switching processing is performed, by moving the moving part 65 in the axial direction, from a start state in which the stator-side fixing part 62 engages with the moving part 65 to an end state in which the rotor-side fixing part 61 engages with the moving part 65.

In an embodiment of switching processing performed before the dewatering process of the washing machine 1 of Embodiment 1, the controller 15 may perform an adjustment operation, a maintaining operation, and a movement operation.

In the maintaining operation, the controller 15 maintains a rotation phase of the rotor 45 which is adjusted by the adjustment operation. In detail, in the maintaining operation, the controller 15 supplies power to the motor coil 43 so as to maintain a motor current state flowing to the motor coil 43 as a target state (a state according to a target phase of the rotor 45). Accordingly, the rotation phase of the rotor 45 is maintained as the target phase, and a state in which the rotatable tub 4 does not rotate is maintained. As a result, laundry in the rotatable tub 4 is moved downward due to its weight.

Also, in the illustrated embodiment, a period from time t0 to time t1 is an adjustment period P11 in which the adjustment operation is performed. A period from time t1 to time t2 is an unbalance correction period P12 in which the maintaining operation is performed. A period from time t2 to time t3 is a movement period P13 in which the movement operation is performed.

When it is time t0, the controller 15 starts the adjustment operation. Accordingly, power supply to the motor coil 43 is started, and a motor current (im) flowing to the motor coil 43 is gradually increased. In the adjustment period P11, a rotation phase of the rotor is adjusted, and an engagement position (X) becomes closer to a target engagement position (Xt).

When it is time t1, the engagement position (X) becomes the target engagement position (Xt), and the adjustment operation is ended. Then, the controller 15 starts the maintaining operation. Accordingly, in the unbalance correction period P12, a state in which the rotatable tub 4 does not rotate is maintained. In the rotatable tub 4, laundry stuck on a perimeter wall of the rotatable tub 4 is moved downward due to its weight. As the laundry is gathered on the bottom of the rotatable tub 4, the state in which the rotatable tub 4 does not rotate is easily maintained.

When it is time t2, the maintaining operation is ended. The controller 15 starts the movement operation. Accordingly, power supply to the clutch coil 68a is started, and a clutch current (ic) flowing to the clutch coil 68a is gradually increased. When the clutch current (ic) reaches a threshold value (ith), the moving part 65 moves in the axial direction from the stator-side fixing part 62 toward the rotor-side fixing part 61.

Also, in the movement period P13, the controller 15 fixes the rotation phase of the rotor 45 so as to allow an engagement position to become a target engagement position. In detail, the motor current state flowing to the motor coil 43 is maintained as the target state (the state according to the target phase of the rotor 45). Accordingly, the rotation phase of the rotor 45 is maintained as the target phase, and the engagement position is maintained as the target engagement position.

When it is time t3, the movement operation is ended, power supply to the motor coil 43 is stopped, and power supply to the clutch coil 68a is stopped.

In switching processing, when the engagement position deviates from the target engagement position, an engagement error may occur between the rotor-side fixing part (or the stator-side fixing part 62) and the moving part 65. In an embodiment, in switching processing for switching the moving part 65, by moving the moving part 65 in the axial direction, from a start state in which the stator-side fixing part 62 engages with the moving part 65 to an end state in which the rotor-side fixing part 61 engages with the moving part 65, in a case where gaps between the plurality of rotor-end fixed claws 61r of the rotor-side fixing part 61 and the plurality of rotor-end moving claws 65r of the moving part 65 do not face in the axial direction, when the moving part 65 moves toward the rotor-side fixing part 61 in the axial direction, the plurality of rotor-end moving claws 65r of the moving part 65 contact the plurality of rotor-end fixed claws 61r of the rotor-side fixing part 61, for example. As such, when the engagement error occurs with respect to the clutch 60, a crashing sound occurring in switching of the clutch 60 is increased.

As described above, in an embodiment of the disclosure, the controller 15 performs the adjustment operation before an end state. In the adjustment operation, the controller 15 adjusts the engagement position by changing the rotation phase of the rotor 45, so as to allow the engagement position to become the target engagement position. With this configuration, it is possible to prevent the engagement error from occurring with respect to the clutch 60. Accordingly, the crashing sound occurring in switching of the clutch 60 may be decreased. Also, reliability of an engagement with respect to the clutch may be improved. In an embodiment, even when an engagement position deviates due to backlashes of various gears configuring the decelerator 50, the engagement position may be adjusted by the adjustment operation, so that it is possible to prevent the engagement error due to the backlashes of the various gears of the decelerator 50 from occurring with respect to the clutch 60, for example.

Also, in an embodiment of the disclosure, in switching processing, the controller performs the movement operation of moving the moving part 65, after the adjustment operation. With this configuration, after the engagement position becomes the target engagement position, the controller 15 may start an end state by moving the moving part in the axial direction. Accordingly, it is possible to clearly prevent the engagement error from occurring with respect to the clutch 60.

Also, in an embodiment of the disclosure, in switching processing performed before the dewatering process of the washing machine 1, the controller 15 performs the maintaining operation of maintaining the rotation phase of the rotor 45 which is adjusted by the adjustment operation. Due to the maintaining operation, the state in which the rotatable tub 4 does not rotate may be maintained. Accordingly, the laundry may be collected onto the bottom of the rotatable tub 4 by moving the laundry in the rotatable tub downward due to its weight, so that the state in which the rotatable tub 4 does not rotate may be easily maintained. Therefore, the engagement position may be stabilized.

Also, the adjustment operation may be efficient for not only switching from the washing process to the dewatering process of the washing machine 1 but also switching from the dewatering process to the washing process of the washing machine 1. In an embodiment, when switching from the dewatering process of the washing machine 1 to the washing process is performed, the laundry may not be taken out of the rotatable tub 4, for example. In this case, as the engagement position may easily deviate from the target engagement position, it is effective to perform the adjustment operation in the switching process.

According to Japanese Patent Application Publication No. 2020-124381, a gap (gap between magnetic poles) with a preset size is formed between magnetic members installed to a mover of a clutch. A plurality of slits is installed at the mover of the clutch so as to respectively face gaps between magnetic poles in a diameter direction. When the gaps between the magnetic poles respectively face the slits in the diameter direction, uneven magnetic action occurs between the mover and a stator along a perimeter direction. By detecting the uneven magnetic action, a position of the mover may be determined. As described above, according to Japanese Patent Application Publication No. 2020-124381, there is a need to arrange a means for detecting the uneven magnetic action so as to determine a position of the mover. In an embodiment of the disclosure, even when the means for detecting the uneven magnetic action is not arranged, an engagement position may set as a target engagement position. Accordingly, a risk of a target-position difference due to a detection error may be removed.

In an embodiment, a rotation phase of the rotor 45 in the target engagement position may be a rotation phase when cogging torque of the motor 40 reaches a stabilization point. A stabilization point of cogging torque indicates a state in which the cogging torque remains below a preset stabilization value (a value of cogging torque which is considered to be substantially zero). As described above, by allowing the rotation phase of the rotor 45 in the target engagement position to be the rotation phase when the cogging torque of the motor 40 reaches the stabilization point, a rotation of the rotor 45 due to the cogging torque may be suppressed.

Accordingly, an engagement-position difference due to the cogging torque may be suppressed.

Configurations of the controller 15 and the driving circuit 17 in the washing machine 1 in an embodiment (Embodiment 2) of the disclosure are different from the washing machine 1 of Embodiment 1. Other configurations of Embodiment 2 are equal to those of the washing machine 1 of Embodiment 1. In the driving circuit 17 in an embodiment, the clutch driving circuit 80 electrically connects the motor coil 43 with the clutch coil 68*a*, thereby providing power supplied from the motor driving circuit 70 to the clutch coil 68*a*. The clutch driving circuit 80 operates in response to control by the processor 16. In the illustrated embodiment, impedance of the clutch coil 68*a* is lower than impedance of the motor coil 43.

Figure 20:
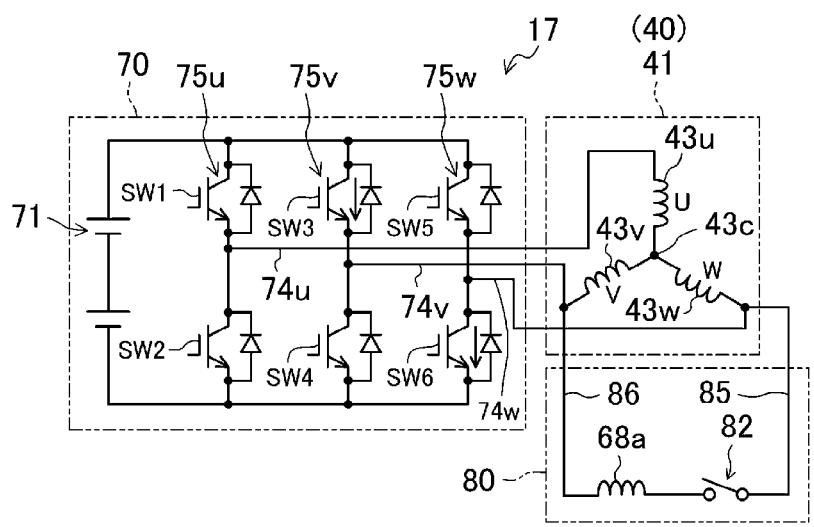
FIG. 20 is a circuit diagram illustrating an embodiment of a driving circuit.

FIG. 20 is a circuit diagram illustrating an embodiment of a driving circuit. As illustrated in FIG. 20, the clutch driving circuit 80 of the illustrated embodiment includes the first wiring 85, the second wiring 86, and a relay 82. The first wiring 85 connects to the W-phase motor coil 43*w* and one end of the clutch coil 68*a*. The second wiring 86 connects to the V-phase motor coil 43*v* and the other end of the clutch coil 68*a*. The relay is provided on one of the first wiring 85 and the second wiring 86 (the first wiring 85 in the embodiment of FIG. 20). When the relay 82 enters an ON state, the clutch coil 68*a* is electrically connected to the V-phase motor coil 43*v* and the W-phase motor coil 43*w*.

When the motor driving circuit 70 performs a switching operation (an operation for rotating the rotor 45 at a preset speed), the clutch driving circuit 80 of the illustrated embodiment electrically disconnects the motor coil 43 and the clutch coil 68*a*. In detail, the processor 16 turns the relay 82 of the clutch driving circuit 80 into an OFF state.

Also, in case of supplying power to the clutch coil 68*a* while not performing a switching operation of the motor driving circuit 70, the clutch driving circuit 80 of the illustrated embodiment electrically connects the motor coil 43 with the clutch coil 68*a*. In detail, the processor 16 turns the relay 82 of the clutch driving circuit 80 into an ON state.

Also, when the motor coil 43 is electrically connected with the clutch coil 68*a*, the processor 16 changes an absolute value of a motor current flowing to the motor coil 43, thereby changing an absolute value of a clutch current flowing to the clutch coil 68*a*. In an embodiment, the absolute value of the motor current flowing to the motor coil 43 may be changed by changing a rate of ON time periods of the switching devices SW1 to SW6 of the motor driving circuit 70 (a rate of a time in which a switching device is in an ON state, in a preset period), and thus, may change the absolute value of the clutch current flowing to the clutch coil 68*a*, for example. Also, when the motor coil 43 is electrically connected with the clutch coil 68*a*, a direction of the clutch current flowing to the clutch coil 68*a* may be changed by changing a direction of the motor current flowing to the motor coil 43.

When the motor coil 43 and the clutch coil 68*a* are electrically connected with each other by the clutch driving circuit 80, the motor driving circuit 70 of the illustrated embodiment performs a first current control operation. In the first current control operation, the motor driving circuit 70 supplies power to the motor coil 43 and the clutch coil 68*a*, so that a motor current state flowing to the motor coil 43 becomes a target state, and the absolute value of the clutch current flowing to the clutch coil 68*a* remains below a threshold value. By performing the first current control operation, a rotation phase of the rotor 45 may become a target phase, without moving the moving part 65 in the axial direction.

Also, when the motor coil 43 and the clutch coil 68*a* are electrically connected with each other by the clutch driving circuit 80, the motor driving circuit 70 of the illustrated embodiment performs a second current control operation. In the second current control operation, the motor driving circuit 70 supplies power to the motor coil 43 and the clutch coil 68*a*, so that a motor current state flowing to the motor coil 43 becomes a target state, the absolute value of the clutch current flowing to the clutch coil 68*a* remains above a threshold value, and a direction of the clutch current flowing to the clutch coil 68*a* becomes a target direction (a direction of a target). By performing the second current control operation, the rotation phase of the rotor 45 may be maintained as the target phase, and the moving part 65 may be moved to a target engagement position.

The first current control operation and the second current control operation of the motor driving circuit 70 are controlled by the processor 16. The first current control operation of the motor driving circuit 70 is performed in an adjustment operation during switching processing. The second current control operation of the motor driving circuit 70 is performed in a movement operation during switching processing.

As in the aforementioned embodiment, the controller 15 of the illustrated embodiment provides power to the motor coil 43 so as to allow a rotation phase of the rotor 45 to become a target phase. The target phase of the rotor 45 is set as a rotation phase of the rotor 45 when an engagement position becomes a target engagement position. Therefore, by allowing the rotation phase of the rotor 45 to be the target phase, the engagement position may become the target engagement position.

In the illustrated embodiment, as in Embodiment 1, the first adjustment operation (which is an adjustment operation performed in switching processing for switching the moving part 65, by moving the moving part 65 in the axial direction, from a start state in which the stator-side fixing part 62 engages with the moving part 65 to an end state in which the rotor-side fixing part 61 engages with the moving part 65) and the second adjustment operation (which is an adjustment operation performed in switching processing for switching the moving part 65, by moving the moving part 65 in the axial direction, from a start state in which the rotor-side fixing part 61 engages with the moving part 65 to an end state in which the stator-side fixing part 62 engages with the moving part 65) are performed.

Also, in the illustrated embodiment, "a target phase in the first adjustment operation" is different from "a target phase in the second adjustment operation". In an embodiment, "the target phase in the first adjustment operation" deviates from "the target phase in the second adjustment operation" by an electric angle of 180°, for example. With this configuration, it is easy to allow "a direction of a clutch current flowing to the clutch coil 68*a* in a movement operation performed after the first adjustment operation" to be opposite to "a direction of a clutch current flowing to the clutch coil 68*a* in a movement operation performed after the second adjustment operation".

Also, in the illustrated embodiment, the rotor-side fixing part 61, the stator-side fixing part 62, and the moving part 65 are designed, so that, when the rotation phase of the rotor 45 becomes the target phase, the engagement position may become the target engagement position while a rotation phase of the rotor-side fixing part 61 and a rotation phase of the stator-side fixing part 62 are not synchronized. In detail, in the illustrated embodiment, each of the plurality of rotor-end fixed claws 61r of the rotor-side fixing part 61, each of the plurality of stator-end fixed claws 62s of the stator-side fixing part 62, each of the plurality of rotor-end moving claws 65r of the moving part 65, and each of the plurality of stator-end moving claws 65s of the moving part 65 are equiangularly provided at integer-multiple intervals of 180° of an electric angle. In an embodiment, when the number of poles of the motor 40 is "P", and an angle (angle represented as a mechanical angle) of a gap between the rotor-end fixed claws 61r is "θm", Equation below is achieved, for example. A gap between the stator-end fixed claws 62s, a gap between the rotor-end moving claws 65r, and a gap between the stator-end moving claws 65s are each equal to the gap between the rotor-end fixed claws 61r.

$$θm=k×360/P$$

Here, "k" is an integer equal to or greater than 1.

Also, the plurality of rotor-end fixed claws 61r may include a plurality of first rotor-end fixed claws equiangularly provided by a gap θm, and a plurality of second rotor-end fixed claws equiangularly provided between the plurality of first rotor-end fixed claws. The aforementioned feature of the rotor-end fixed claws 61r is applied to the stator-end fixed claws 62s, the rotor-end moving claws 65r, and the stator-end moving claws 65s.

Also, as in Embodiment 1, in the illustrated embodiment, the number of the rotor-end moving claws 65r of the moving part 65 is equal to the number of the rotor-end fixed claws 61r of the rotor-side fixing part 61. The number of the stator-end moving claws 65s of the moving part 65 is equal to the number of the stator-end fixed claws 62s of the stator-side fixing part 62. The number of the stator-end fixed claws 62s of the stator-side fixing part 62 is equal to the number of the rotor-end fixed claws 61r of the rotor-side fixing part 61. That is, the number of each of the rotor-end fixed claws 61r, the stator-end fixed claws 62s, the rotor-end moving claws 65r, and the stator-end moving claws 65s is the same.

In detail, in the illustrated embodiment, k is "2", the number of poles (P) of the motor 40 is "48", the number of each of the rotor-end fixed claws 61r, the stator-end fixed claws 62s, the rotor-end moving claws 65r, and the stator-end moving claws 65s is "24", and each gap (θm) between the rotor-end fixed claws 61r, between the stator-end fixed claws 62s, between the rotor-end moving claws 65r, and between the stator-end moving claws 65s is "15°". Also, when k is "1", an adjustment operation equal to an adjustment operation of Embodiment 1 (refer to FIGS. 13 to 16) may be performed.

Figure 21:
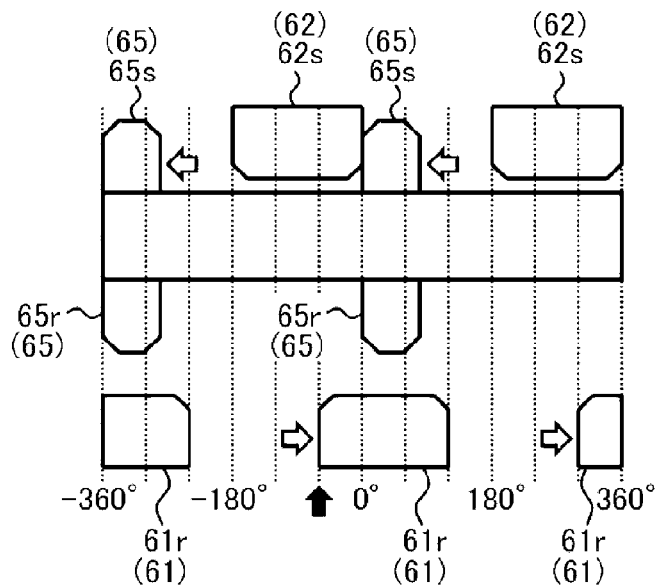
FIG. 21 is a schematic diagram for describing an embodiment of a first adjustment operation.
Figure 21:
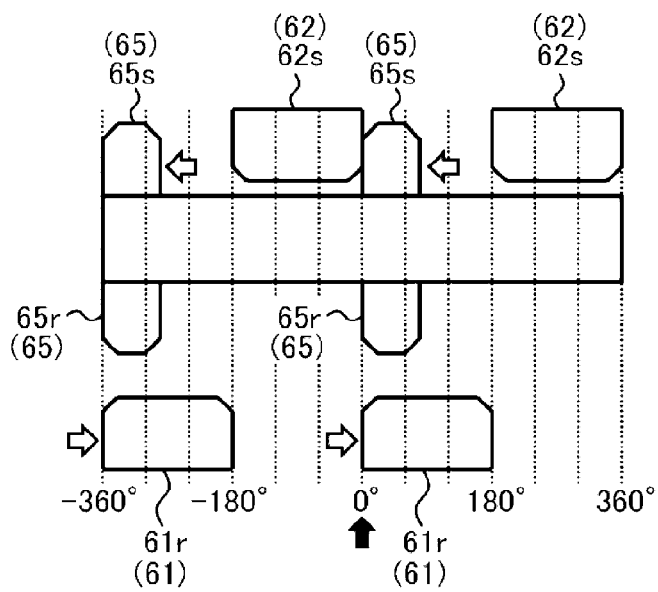
Figure 22:
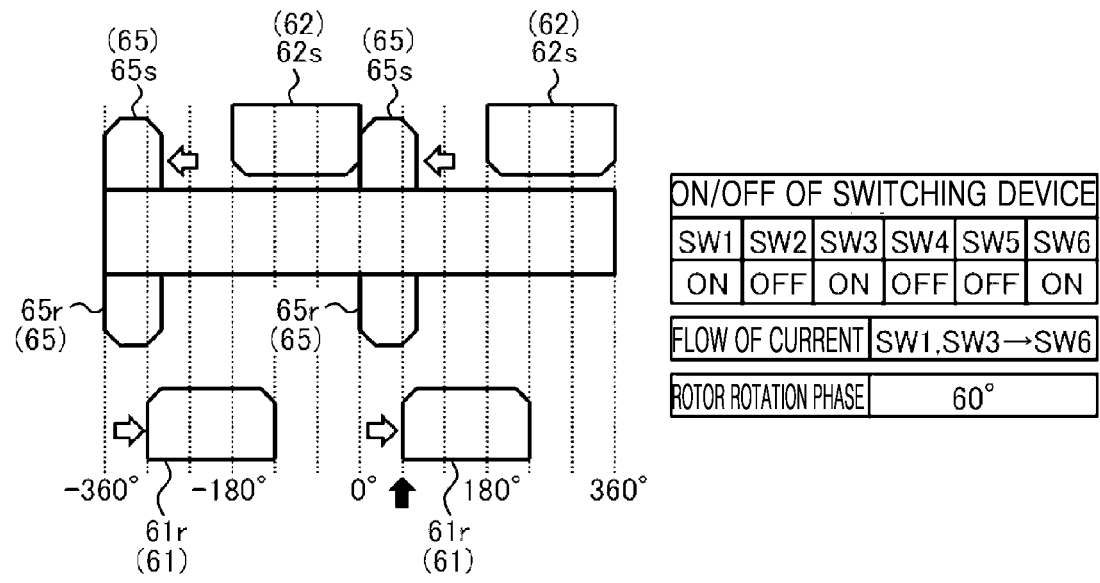
FIG. 22 is a schematic diagram for describing an embodiment of a first adjustment operation.
Figure 22:
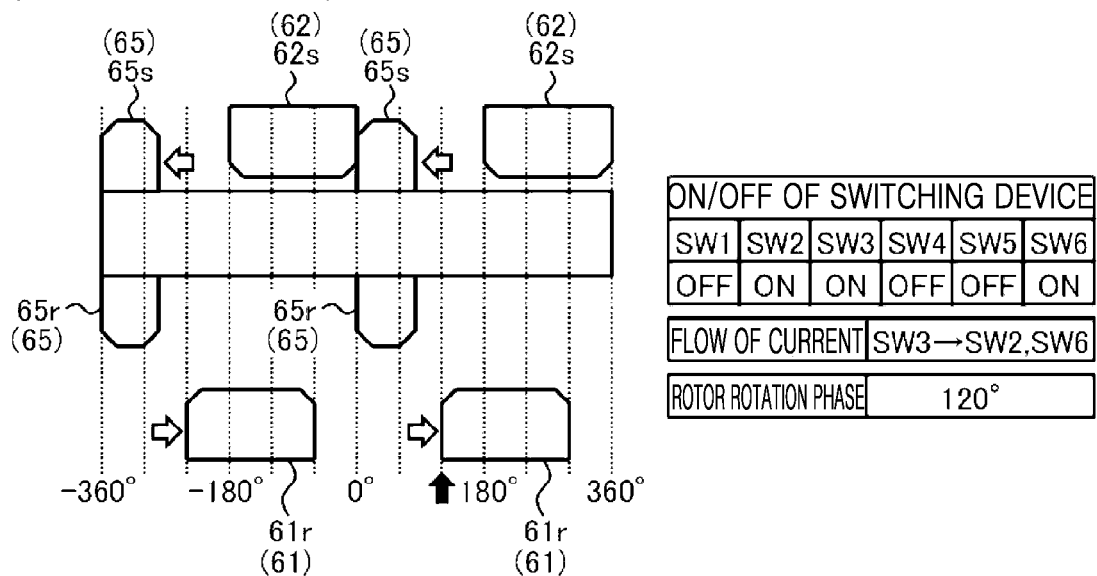

FIGS. 21 and 22 are schematic diagrams illustrating an embodiment of the first adjustment operation. An embodiment of the first adjustment operation will now be described with reference to FIGS. 21 and 22. In the first adjustment operation of the illustrated embodiment, four processes below are sequentially performed. Also, an angle used hereinafter is an electric angle. FIGS. 21 and 22 illustrate embodiments of a case in which a rotation phase of the rotor 45 is gradually changed from "−60°" to "120°" that is a target phase.

First, as illustrated in FIG. 21, in a first process, the controller 15 turns the first, fourth, and fifth switching devices SW1, SW4, and SW5 to an ON state and turns the second, third, and sixth switching devices SW2, SW3, and SW6 to an OFF state in the motor driving circuit 70. Accordingly, a motor current output from the first switching device SW1 is input to the neutral point 43c via the U-phase motor coil 43u. A motor current output from the fifth switching device SW5 is input to the neutral point 43c via the W-phase motor coil 43w. The motor current input to the neutral point 43c flows in the V-phase motor coil 43v and then is input to the fourth switching device SW4.

As the motor current flows to the motor coil 43 in the aforementioned manner, the rotor 45 rotates such that a rotation phase of the rotor 45 becomes "−60°". Accordingly, rotation phases of the rotor 45 and the rotor-side fixing part 61 become an initial phase (−60° in the illustrated embodiment).

Also, in the first process, due to a position (a rotation phase) of the rotor 45 before the motor current is applied, the rotor 45 rotates in a forward direction (a right direction in the embodiment of FIG. 21) or a reverse direction (a left direction in the embodiment of FIG. 21), so that the rotation phase of the rotor 45 becomes an initial phase. Also, as the rotor 45 rotates, the moving part 65 rotates in the reverse direction or the forward direction. Due to the rotation of the moving part 65, the stator-end moving claw 65s of the moving part 65 contacts the stator-end fixed claw 62s in the reverse direction (the left in the embodiment of FIG. 21) or the forward direction (the right in the embodiment of FIG. 21) of the stator-side fixing part 62. In the embodiment of FIG. 21, the rotor 45 rotates in the forward direction and thus the moving part 65 rotates in the reverse direction, such that the stator-end moving claw 65s of the moving part 65 contacts the stator-end fixed claw 62s in the reverse direction of the stator-side fixing part 62.

Afterward, as illustrated in FIG. 21, in a second process, the controller 15 turns the first, fourth, and sixth switching devices SW1, SW4, and SW6 to an ON state and turns the second, third, and fifth switching devices SW2, SW3, and SW5 to an OFF state in the motor driving circuit 70. Accordingly, a motor current output from the first switching device SW1 is input to the neutral point 43c via the U-phase motor coil 43u. The motor current input to the neutral point 43c is divided into the V-phase motor coil 43v and the W-phase motor coil 43w and input to the fourth switching device SW4 and the sixth switching device SW6.

As the motor current flows to the motor coil 43 in the aforementioned manner, the rotor 45 rotates such that a rotation phase of the rotor 45 becomes "0°". Accordingly, rotation phases of the rotor 45 and the rotor-side fixing part 61 are changed from "−60°" to "0°".

Also, in the second process, as the rotor 45 rotates in the forward direction (the right direction in the embodiment of FIG. 21), a force (a reaction of the internal gear 53) that is applied in a direction (the left direction in the embodiment of FIG. 21) opposite to the rotation direction of the rotor 45 is applied to the moving part 65. Accordingly, the stator-end moving claw 65s of the moving part 65 always contacts the stator-end fixed claw 62s in the reverse direction (the left in the embodiment of FIG. 21) of the stator-side fixing part 62. The same is applied to a third process and a fourth process to be described below.

Afterward, as illustrated in FIG. 22, in a third process, the controller 15 turns the first, third, and sixth switching devices SW1, SW3, and SW6 to an ON state and turns the second, fourth, and fifth switching devices SW2, SW4, and SW5 to an OFF state in the motor driving circuit 70. Accordingly, a motor current output from the first switching device SW1 is input to the neutral point 43c via the U-phase motor coil 43u. A motor current output from the third switching device SW3 is input to the neutral point 43c via the V-phase motor coil 43v. The motor current input to the neutral point 43c is input to the sixth switching device SW6 via the W-phase motor coil 43w.

As the motor current flows to the motor coil 43 in the aforementioned manner, the rotor 45 rotates such that a rotation phase of the rotor 45 becomes "60°". Accordingly, rotation phases of the rotor 45 and the rotor-side fixing part 61 are changed from "0°" to "60°".

Afterward, as illustrated in FIG. 22, in a fourth process, the controller 15 turns the second, third, and sixth switching devices SW2, SW3, and SW6 to an ON state and turns the first, fourth, and fifth switching devices SW1, SW4, and SW5 to an OFF state in the motor driving circuit 70. Accordingly, a motor current output from the third switching device SW3 is input to the neutral point 43c via the V-phase motor coil 43v. The motor current input to the neutral point 43c is divided into the U-phase motor coil 43u and the W-phase motor coil 43w and input to the second switching device SW2 and the sixth switching device SW6.

As the motor current flows to the motor coil 43 in the aforementioned manner, the rotor 45 rotates such that a rotation phase of the rotor 45 becomes "120°". Accordingly, rotation phases of the rotor 45 and the rotor-side fixing part 61 become a target phase (120° in the illustrated embodiment). An engagement position of the moving part 65 with respect to the rotor-side fixing part 61 becomes a target engagement position.

Figure 23:
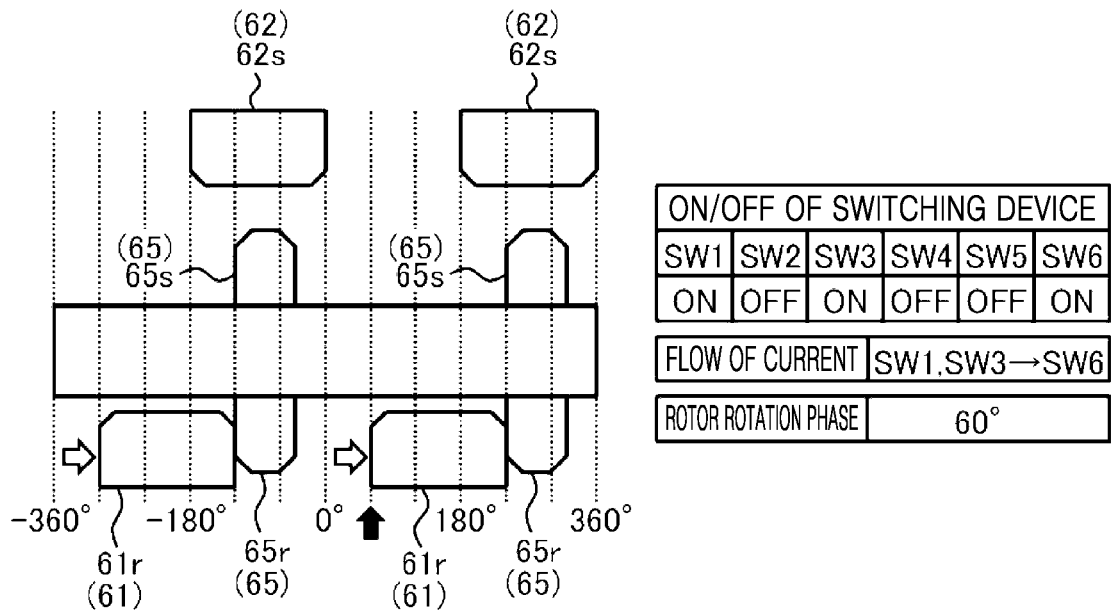
FIG. 23 is a schematic diagram for describing an embodiment of a second adjustment operation.
Figure 23:
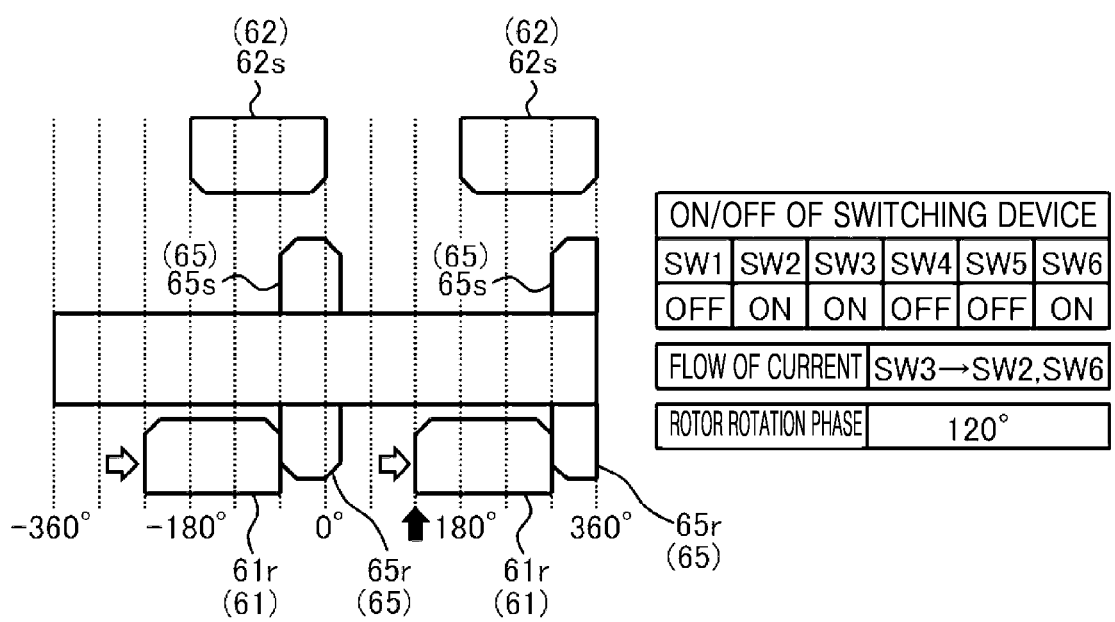
Figure 24:
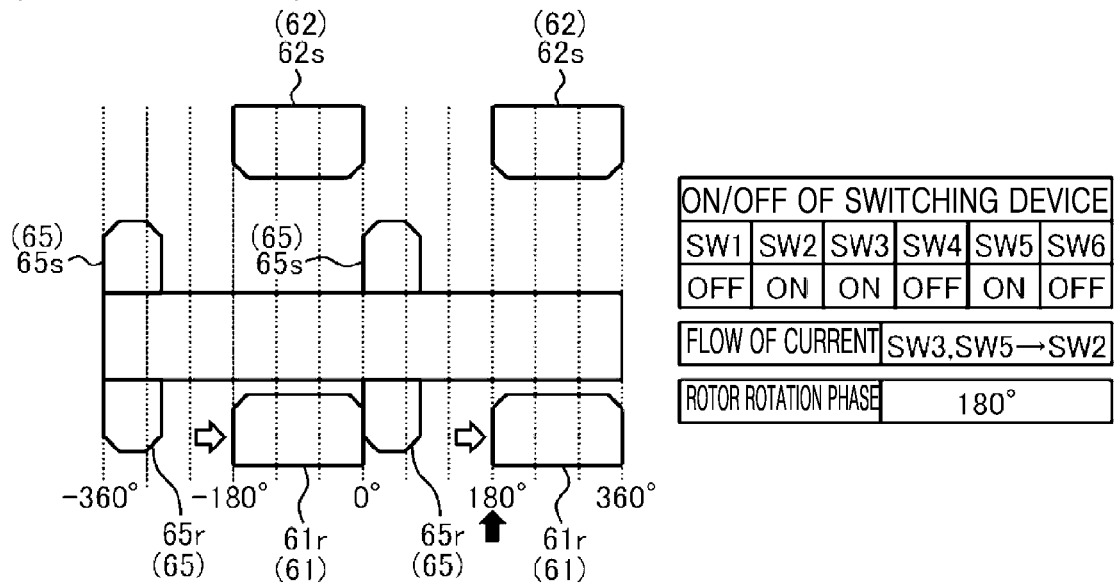
FIG. 24 is a schematic diagram for describing an embodiment of the second adjustment operation.
Figure 24:
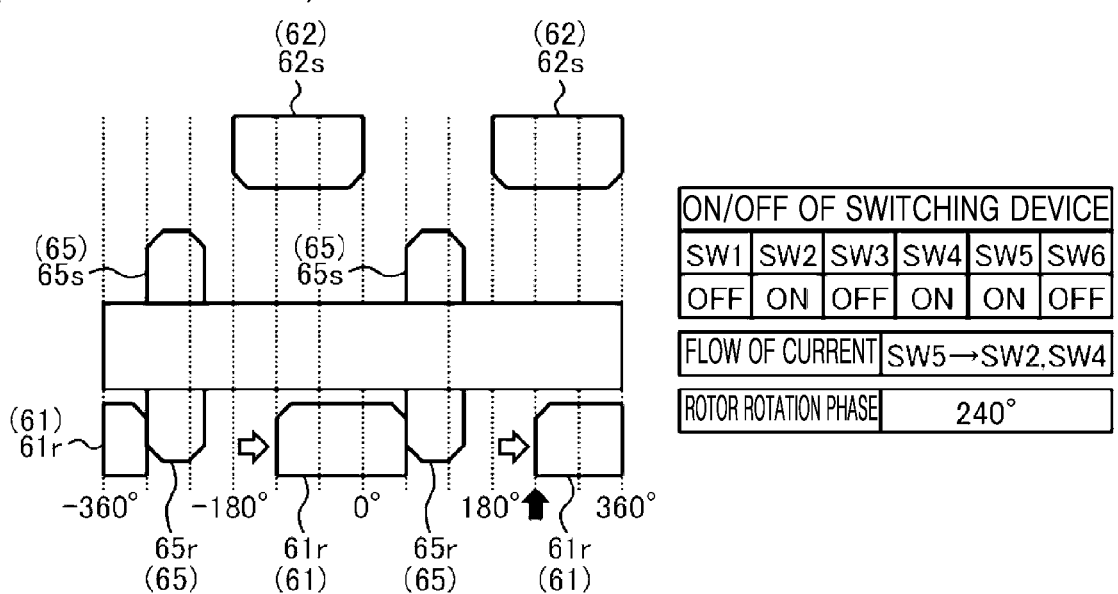

FIGS. 23 and 24 are schematic diagrams for describing an embodiment of the second adjustment operation. With reference to FIGS. 23 and 24, an embodiment of the second adjustment operation will now be described. In the second adjustment operation of the illustrated embodiment, four processes below are sequentially performed. Also, an angle used hereinafter is an electric angle. FIGS. 23 and 24 illustrate embodiments of a case in which a rotation phase of the rotor 45 is gradually changed from "60°" to "240°" that is a target phase.

First, as illustrated in FIG. 23, in a first process, the controller 15 turns the first, third, and sixth switching devices SW1, SW3, and SW6 to an ON state and turns the second, fourth, and fifth switching devices SW2, SW4, and SW5 to an OFF state in the motor driving circuit 70. Accordingly, a motor current output from the first switching device SW1 is input to the neutral point 43c via the U-phase motor coil 43u. A motor current output from the third switching device SW3 is input to the neutral point 43c via the V-phase motor coil 43v. The motor current input to the neutral point 43c is input to the sixth switching device SW6 via the W-phase motor coil 43w.

As the motor current flows to the motor coil 43 in the aforementioned manner, the rotor 45 rotates such that a rotation phase of the rotor 45 becomes "60°". Accordingly, the rotor 45 and the rotor-side fixing part 61 have an initial phase (60° in the illustrated embodiment). Also, a rotation phase of the moving part 65 is a phase according to the initial phase of the rotor-side fixing part 61.

Also, in the first process, due to a position (a rotation phase) of the rotor 45 before the motor current is applied, the rotor 45 rotates in a forward direction (a right direction in the embodiment of FIG. 23) or a reverse direction (a left direction in the embodiment of FIG. 23), so that the rotation phase of the rotor 45 becomes an initial phase. Also, as the rotor 45 rotates, the rotor-side fixing part 61 rotates in the forward direction or the reverse direction. Due to the rotation of the rotor-side fixing part 61, the rotor-end moving claw 65r of the moving part 65 contacts the rotor-end fixed claw 61r in the reverse direction (the left in the embodiment of FIG. 23) or the forward direction (the right in the embodiment of FIG. 23) of the rotor-side fixing part 61. In the embodiment of FIG. 23, the rotor 45 rotates in the forward direction and thus the rotor-side fixing part 61 rotates in the forward direction, such that the rotor-end moving claw 65r of the moving part 65 contacts the rotor-end fixed claw 61r in the reverse direction of the rotor-side fixing part 61.

Afterward, as illustrated in FIG. 23, in a second process, the controller 15 turns the second, third, and sixth switching devices SW2, SW3, and SW6 to an ON state and turns the first, fourth, and fifth switching devices SW1, SW4, and SW5 to an OFF state in the motor driving circuit 70. Accordingly, a motor current output from the third switching device SW3 is input to the neutral point 43c via the V-phase motor coil 43v. The motor current input to the neutral point 43c is divided into the U-phase motor coil 43u and the W-phase motor coil 43w and input to the second switching device SW2 and the sixth switching device SW6.

As the motor current flows to the motor coil 43 in the aforementioned manner, the rotor 45 rotates such that a rotation phase of the rotor 45 becomes "120°". Accordingly, rotation phases of the rotor 45 and the rotor-side fixing part 61 are changed from "60°" to "120°". Also, a rotation phase of the moving part 65 is a phase according to "120°".

Also, in the second process, as the rotor 45 rotates in the forward direction (the right direction in the embodiment of FIG. 23), the rotor-side fixing part 61 rotates in the forward direction. Accordingly, the rotor-end moving claw 65r of the moving part 65 always contacts the rotor-end fixed claw 61r in the reverse direction (the left in the embodiment of FIG. 23) of the rotor-side fixing part 61. The same is applied to a third process and a fourth process to be described below.

Afterward, as illustrated in FIG. 24, in a third process, the controller 15 turns the second, third, and fifth switching devices SW2, SW3, and SW5 to an ON state and turns the first, fourth, and sixth switching devices SW1, SW4, and SW6 to an OFF state in the motor driving circuit 70. Accordingly, a motor current output from the third switching device SW3 is input to the neutral point 43c via the V-phase motor coil 43v. A motor current output from the fifth switching device SW5 is input to the neutral point 43c via the W-phase motor coil 43w. The motor current input to the neutral point 43c is input to the second switching device SW2 via the U-phase motor coil 43u.

As the motor current flows to the motor coil 43 in the aforementioned manner, the rotor 45 rotates such that a rotation phase of the rotor 45 becomes "180°". Accordingly, rotation phases of the rotor 45 and the rotor-side fixing part 61 are changed from "120°" to "180°". Also, a rotation phase of the moving part 65 is a phase according to "180°".

Afterward, as illustrated in FIG. 24, in a fourth process, the controller 15 turns the second, fourth, and fifth switching devices SW2, SW4, and SW5 to an ON state and turns the first, third, and sixth switching devices SW1, SW3, and SW6 to an OFF state in the motor driving circuit 70. Accordingly, a motor current output from the fifth switching device SW5 is input to the neutral point 43c via the W-phase motor coil 43w. The motor current input to the neutral point 43c is divided into the U-phase motor coil 43u and the V-phase motor coil 43v and input to the second switching device SW2 and the fourth switching device SW4.

As the motor current flows to the motor coil 43 in the aforementioned manner, the rotor 45 rotates such that a rotation phase of the rotor 45 becomes "240°". Accordingly, rotation phases of the rotor 45 and the rotor-side fixing part 61 become a target phase (240° in the illustrated embodiment). Also, a rotation phase of the moving part 65 becomes a phase according to a target phase. An engagement position of the moving part 65 with respect to the stator-side fixing part 62 becomes a target engagement position.

A movement operation of the illustrated embodiment is equal to a movement operation of Embodiment 1.

Figure 25:
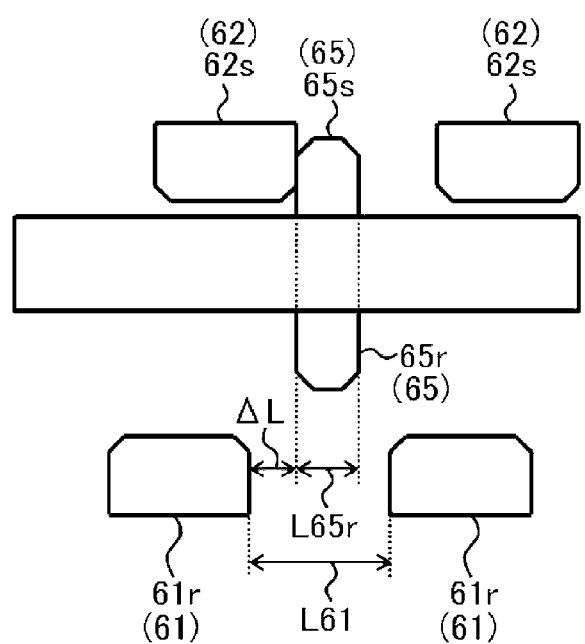
FIG. 25 is a schematic diagram for describing a gap of rotor-end fixed claws.

FIG. 25 is a schematic diagram for describing a gap of rotor-end fixed claws. As illustrated in FIG. 25, in the illustrated embodiment, the perimeter direction length L61 between the plurality of rotor-end fixed claws 61r in the rotor-side fixing part 61 is greater than a sum of "ΔL" that is a perimeter direction length according to a rotation phase difference between the rotor-side fixing part 61 and the stator-side fixing part 62 at a target engagement position and the perimeter direction length L65r of the rotor-end moving claw 65r of the moving part 65".

With this configuration, when an engagement position of the moving part 65 with respect to the rotor-side fixing part 61 is a target engagement position, gaps between the plurality of rotor-end fixed claws 61r and the plurality of rotor-end moving claws 65r may face in the axial direction. Accordingly, an engagement error between the rotor-side fixing part 61 and the moving part 65 may be avoided.

Figure 26:
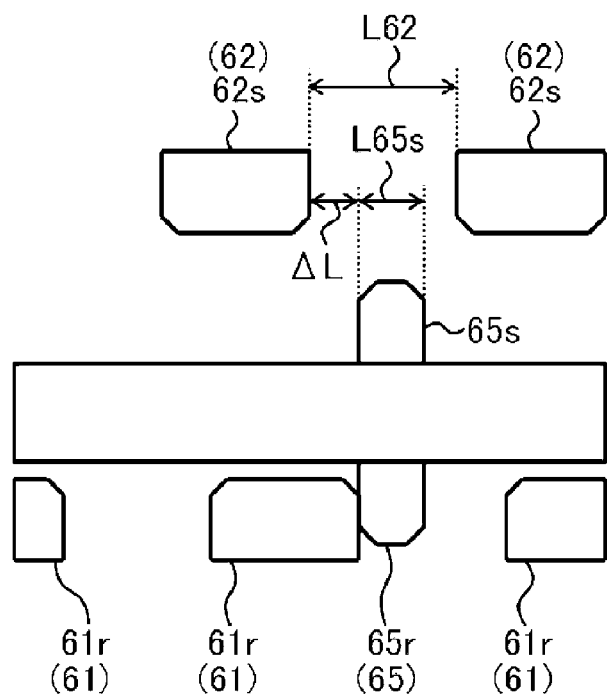
FIG. 26 is a schematic diagram for describing a gap of stator-end fixed claws.

FIG. 26 is a schematic diagram for describing a gap of stator-end fixed claws. As illustrated in FIG. 26, in the illustrated embodiment, the perimeter direction length L62 between the plurality of stator-end fixed claws 62s in the stator-side fixing part 62 is greater than a sum of "ΔL" that is a perimeter direction length according to a rotation phase difference between the rotor-side fixing part 61 and the stator-side fixing part 62 at a target engagement position and the perimeter direction length L65s of the stator-end moving claw 65s of the moving part 65".

With this configuration, when an engagement position of the moving part 65 with respect to the stator-side fixing part 62 is a target engagement position, gaps between the plurality of stator-end fixed claws 62s and the plurality of stator-end moving claws 65s may face in the axial direction. Accordingly, an engagement error between the stator-side fixing part 62 and the moving part 65 may be avoided.

Figure 27:
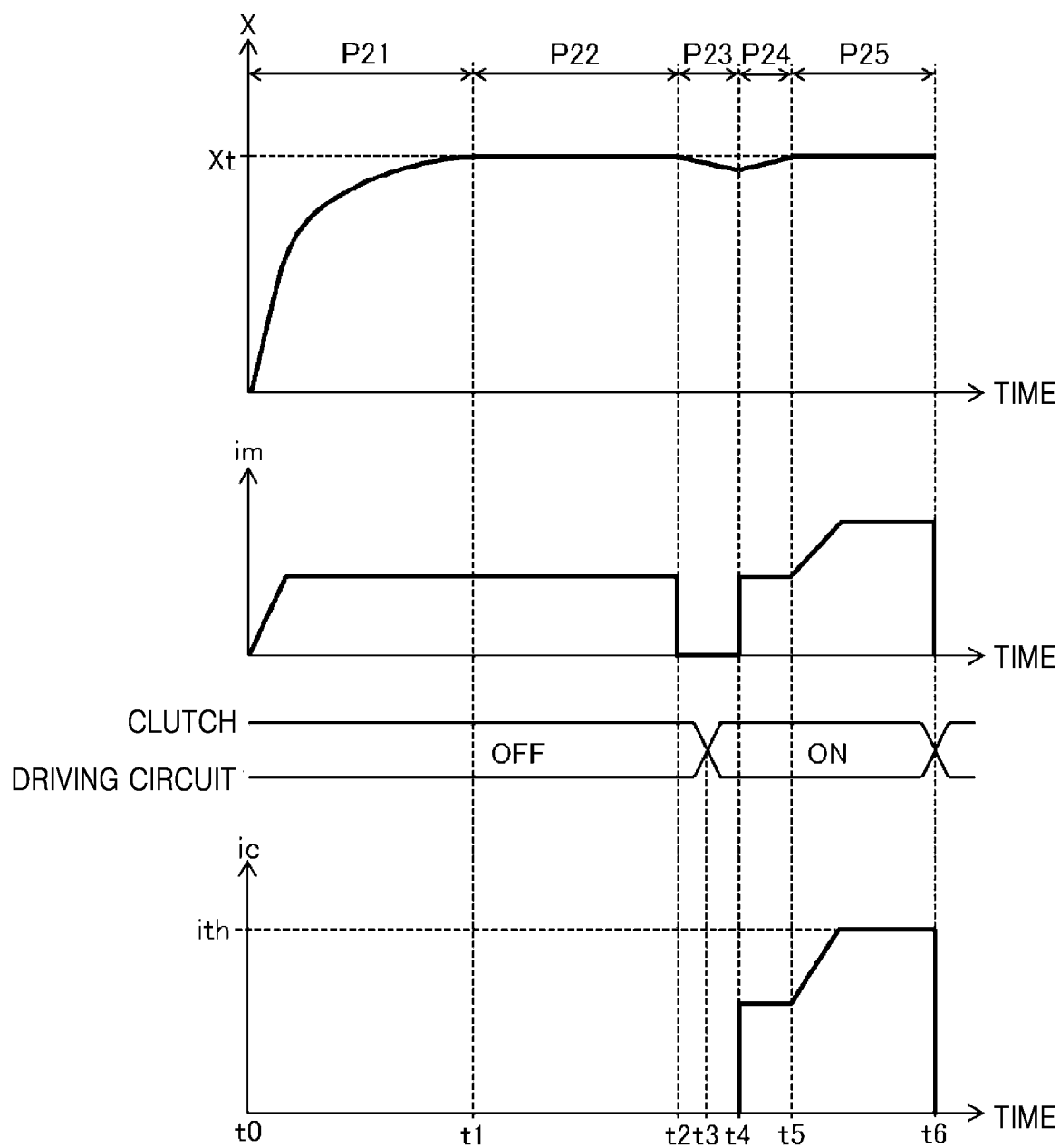
FIG. 27 is a timing chart for describing an embodiment of switching processing performed before a dewatering process.

FIG. 27 is a timing chart for describing an embodiment of switching processing performed before a dewatering process. With reference to FIG. 27, switching processing that is performed before a dewatering process of the washing machine 1 of the illustrated embodiment will now be described.

In switching processing performed before the dewatering process of the washing machine 1 of the illustrated embodiment, the controller 15 performs a pre-adjustment operation, a maintaining operation, a switching operation, and a movement operation. The pre-adjustment operation of the illustrated embodiment is equal to the adjustment operation of Embodiment 1. The maintaining operation of the illustrated embodiment is equal to the maintaining operation of Embodiment 1. The switching operation is performed to switch the relay 82 of the clutch driving circuit 80 from an OFF state to an ON state.

Also, in the illustrated embodiment, a period from time t0 to time t1 is a pre-adjustment period P21 in which the pre-adjustment operation is performed. A period from time t1 to time t2 is an unbalance correction period P22 in which the maintaining operation is performed. A period from time t2 to time t4 is a switching period P23 in which the switching operation is performed. A period from time t4 to time t5 is an adjustment period P24 in which the adjustment period is performed. A period from time t5 to time t6 is a movement period P25 in which the movement operation is performed.

When it is time t0, the controller 15 starts the pre-adjustment operation. The pre-adjustment period P21 is equal to the adjustment period P11 of Embodiment 1.

When it is time t1, an engagement position (X) becomes a target engagement position (Xt), and the adjustment operation is ended. The controller 15 starts the maintaining operation. The unbalance correction period P22 is equal to the unbalance correction period P12 of Embodiment 1.

When it is time t2, the maintaining operation is ended. The controller 15 starts the switching operation. In the switching operation, the controller 15 stops power supply to the motor coil 43. Accordingly, in the switching period P23, a motor current (im) flowing to the motor coil 43 becomes zero. When it is time t3, the controller 15 electrically connects the motor coil 43 with the clutch coil 68a. In detail, the relay 82 of the clutch driving circuit 80 is switched from an OFF state to an ON state.

Also, as the motor current (im) becomes zero in the switching period P23, a state in which the rotatable tub 4 does not rotate is not maintained. Therefore, the rotatable tub and the rotor 45 rotate together, and as a result, as illustrated in FIG. 27, there is a possibility that the engagement position (X) deviates from the target engagement position (Xt).

When it is time t4, the switching operation is ended. The controller 15 starts the adjustment operation. In the adjustment operation of the illustrated embodiment, the first current control operation is performed by the motor driving circuit 70. Accordingly, in the adjustment period P24, a rotation phase of the rotor 45 is adjusted, and the engagement position (X) becomes closer to the target engagement position (Xt). Also, in the adjustment period P24, due to the first current control operation, an absolute value of the clutch current (ic) flowing to the clutch coil 68a remains below the threshold value (ith). Therefore, the moving part 65 does not move in the axial direction.

When it is time t5, the adjustment operation is ended. The controller 15 starts the movement operation. In the movement operation of the illustrated embodiment, the second current control operation is performed by the motor driving circuit 70. Accordingly, in the movement period P25, the clutch current (ic) flowing to the clutch coil 68a reaches the threshold value (ith), and the moving part 65 moves in the axial direction from the stator-side fixing part 62 toward the rotor-side fixing part 61. Also, in the movement period P25, due to the second current control operation, the rotation phase of the rotor 45 is maintained as a target state, and an engagement position is maintained as a target engagement position.

With the illustrated embodiment, it is possible to obtain the same effect as an effect of Embodiment 1. Also, in the illustrated embodiment, in the adjustment operation, the controller 15 gradually adjusts the engagement position by gradually changing the rotation phase of the rotor 45 toward the target state. With this control, it is possible to prevent the rotor 45 from rotating in an unintended direction, in the adjustment operation. Also, in the illustrated embodiment, impedance of the clutch coil 68a is lower than impedance of the motor coil 43. With this configuration, it is easy to ensure the clutch coil 68a desired to move the moving part 65 in the axial direction.

Figure 28:
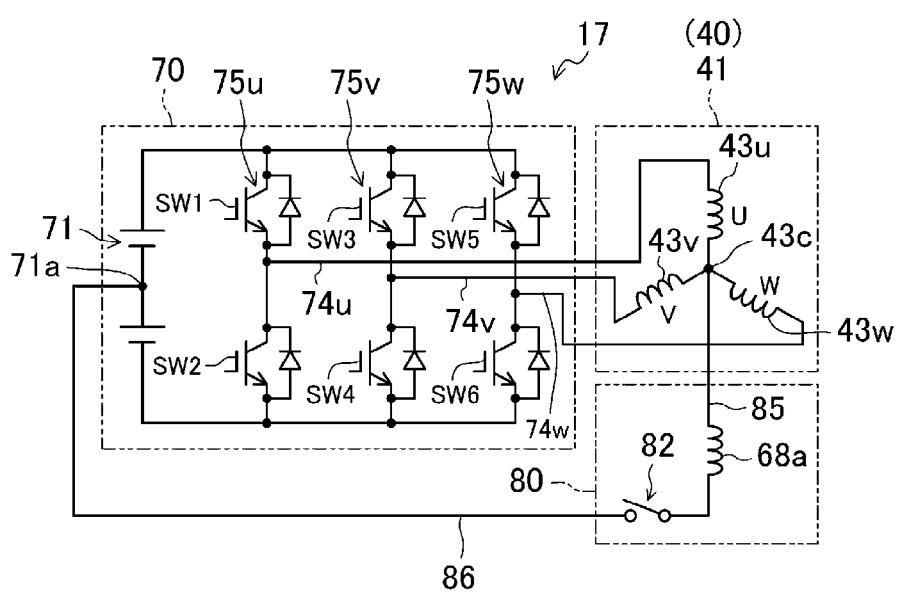
FIG. 28 is a circuit diagram illustrating an embodiment of a driving circuit.

FIG. 28 is a circuit diagram illustrating an embodiment of the driving circuit 17. A configuration of the clutch driving circuit 80 in the embodiment of the driving circuit 17 is different from the driving circuit 17 of Embodiment 2. Other configurations of the driving circuit 17 of the illustrated embodiment are equal to those of the driving circuit 17 of Embodiment 2. In the clutch driving circuit 80 of the illustrated embodiment, the first wiring connects to the neutral point 43*c* (access point of the motor coils 43*u*, 43*v*, and 43*w*) and one end of the clutch coil 68*a*. The second wiring 86 connects to a potential point 71*a* of the direct-current power source 71 and the other end of the clutch coil 68*a*. The potential point 71*a* of the direct-current power source 71 is a point at which electric potentials of the direct-current power source 71 are split in half. In an embodiment, the same effect as an effect of Embodiment 2 may be obtained. Also, in the clutch driving circuit 80 of the illustrated embodiment, the relay 82 may be omitted.

An operation of the controller 15 in the washing machine 1 of the illustrated embodiment (Embodiment 3) is different from the washing machine 1 of Embodiment 1. Other configurations of the washing machine 1 of the illustrated embodiment are equal to those of the washing machine 1 of Embodiment 1. In the illustrated embodiment, the controller 15 is configured to supply, to the clutch coil 68*a*, power for generating a magnetic field for moving the clutch magnet 67*b* installed at the moving part 65 in the axial direction. In a movement operation for the moving part 65 in the axial direction, after the controller 15 starts supplying power (power for generating a magnetic field for moving the clutch magnet 67*b* in the axial direction) to the clutch coil 68*a*, the controller 15 determines whether the moving part 65 is moved, based on whether the power is distorted.

Figure 29:
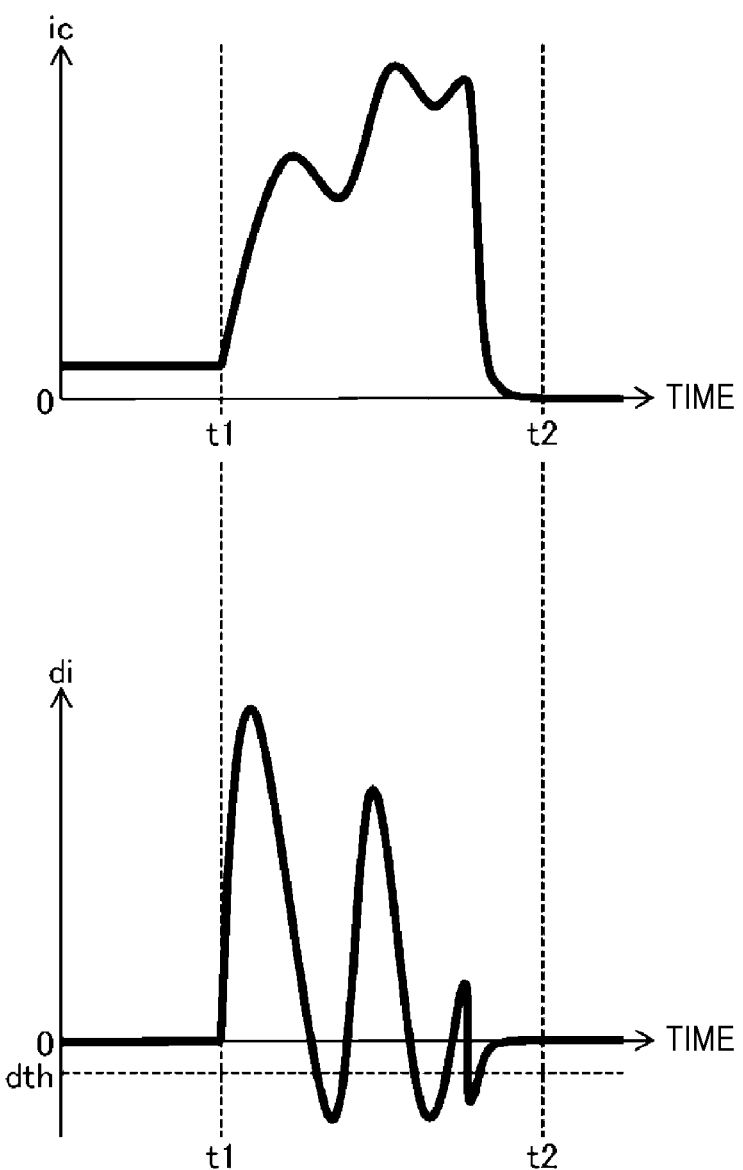
FIG. 29 is a graph illustrating an embodiment of a change in a clutch current of a case where a moving part moves in an axial direction as power is supplied to a clutch coil.
Figure 30:
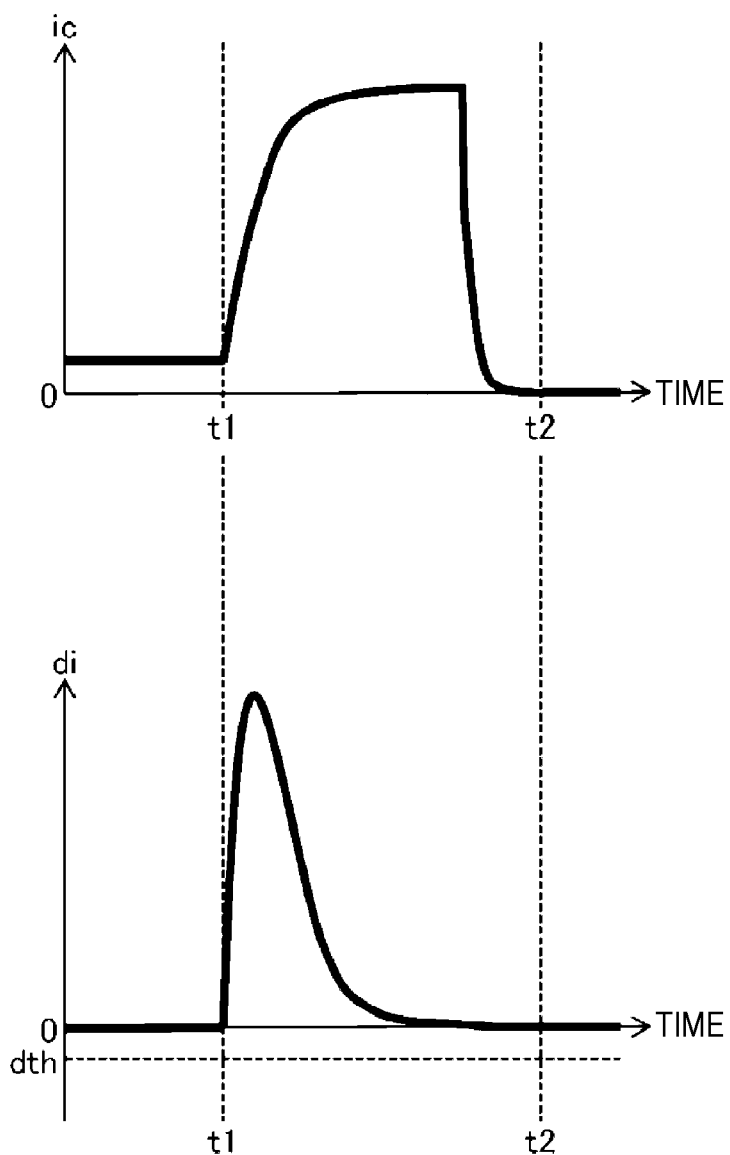
FIG. 30 is a graph illustrating an embodiment of a change in a clutch current of a case where a moving part does not move in the axial direction even when power is supplied to a clutch coil.

FIG. 29 is a graph illustrating an embodiment of a change in a clutch current of a case where a moving part moves in the axial direction as power is supplied to a clutch coil. FIG. 30 is a graph illustrating an embodiment of a change in a clutch current of a case where a moving part does not move in the axial direction even when power is supplied to a clutch coil. With reference to FIGS. 29 and 30, a relation between distortion of power supplied to the clutch coil 68*a* and a movement of the moving part 65 will now be described. In the embodiments of FIGS. 29 and 30, in a period from time t1 to time t2, power supply to the clutch coil 68*a* is continued, and a clutch current (ic) continuously flows to the clutch coil 68*a*.

As illustrated in FIG. 29, in a case where power is supplied to the clutch coil 68*a* and thus the moving part 65 moves in the axial direction, an induced electromotive force is generated at the clutch coil 68*a* by a movement of the clutch magnet 67*b* installed at the moving part 65, and due to the induced electromotive force, distortion occurs in power (the clutch current (ic) in the embodiment of FIG. 29) supplied to the clutch coil 68*a*. When distortion occurs in the clutch current (ic), the clutch current (ic) alternately repeats an increase (a change in a positive direction) and a decrease (a change in a negative direction). Therefore, as illustrated in FIG. 29, a differential value (di) of the clutch current (ic) may be not only a positive value but also a negative value.

As illustrated in FIG. 30, in a case where power is supplied to the clutch coil 68*a* but the moving part 65 does not move in the axial direction, an induced electromotive force is not generated at the clutch coil 68*a*, such that distortion does not occur in power (the clutch current (ic) in the embodiment of FIG. 30) supplied to the clutch coil 68*a*. When the distortion does not occur in the clutch current (ic), the clutch current (ic) is steadily increased according to time. Therefore, as illustrated in FIG. 30, a differential value (di) of the clutch current (ic) is only a positive value.

Figure 31:
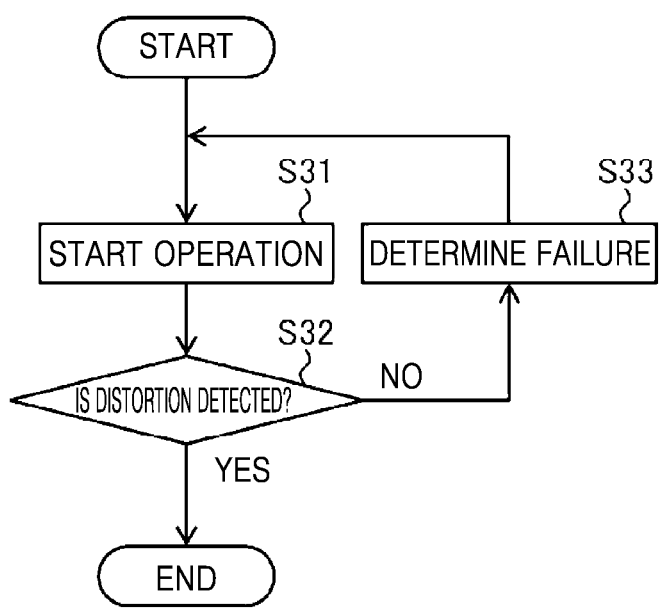
FIG. 31 is a flowchart illustrating an embodiment of an operation of a controller in a movement operation.

FIG. 31 is a flowchart illustrating an embodiment of an operation of a controller in a movement operation. With reference to FIG. 31, an operation of the controller 15 in the movement operation will now be described. In the movement operation, the controller 15 performs processes below.

The controller 15 starts supplying, to the clutch coil 68*a*, power for generating a magnetic field for moving the clutch magnet 67*b* in the axial direction. In the illustrated embodiment, the controller 15 supplies power to the clutch coil 68*a*, so that an absolute value of a clutch current flowing to the clutch coil 68*a* becomes a threshold value or more, and a direction of the clutch current flowing to the clutch coil 68*a* becomes a target direction (a direction of a current which corresponds to a direction in which the moving part 65 is attempted to move).

Afterward, the controller 15 determines whether distortion has occurred in power supplied to the clutch coil 68*a*, in a period from a start of power supply to the clutch coil 68*a* to an end of the power supply (operation S32). In the illustrated embodiment, the controller 15 receives an output of a current sensor (not shown) to detect the clutch current (ic), and determines occurrence or non-occurrence of distortion in the clutch current (ic) flowing to the clutch coil 68*a*. In detail, when the differential value (di) of the clutch current (ic) remains below a threshold value (dth) being smaller than zero (refer to FIGS. 29 and 30), the controller 15 determines that the distortion has occurred in the clutch current (ic).

When the distortion has occurred in power supplied to the clutch coil 68*a* (YES in operation S32), the controller 15 determines that movement of the moving part 65 is successful in the movement operation, and ends the movement operation.

When the distortion has not occurred in power supplied to the clutch coil 68*a* (NO in operation S32), the controller 15 determines that movement of the moving part 65 fails in the movement operation (operation S33). Then, the controller 15 re-starts power supply to the clutch coil 68*a* (operation S31).

As described above, in the illustrated embodiment, in the movement operation, the controller 15 starts supplying of power to the clutch coil 68*a*, and then determines existence or non-existence of movement of the moving part 65, based on occurrence or non-occurrence of distortion in the power. Accordingly, the controller 15 may identify that movement of the moving part 65 is successful in the movement operation.

An operation of the controller 15 before switching processing in the washing machine 1 of the illustrated embodiment (Embodiment 4) is different from the washing machine 1 of Embodiment 1. Other configurations of the illustrated embodiment are equal to those of Embodiment 1.

In the illustrated embodiment, before the switching processing is performed, the controller 15 performs an unbalance correction operation. Also, the switching processing refers to processing of moving the moving part 65 in the axial direction so as to switch the moving part 65 from a start state in which one of the rotor-side fixing part 61 and the stator-side fixing part 62 engages with the moving part 65 to an end state in which the other one of the rotor-side fixing part 61 and the stator-side fixing part 62 engages with the moving part 65.

In the unbalance correction operation, in order to allow a position of an unbalance concentrated mass (or unbalance material point) of laundry in the rotatable tub 4 to approach a target material point position, the controller 15 rotates the rotatable tub 4 by controlling the motor 40, thereby correcting the position of the unbalanced material point of laundry in the rotatable tub 4. Also, a rotation speed of the rotatable tub 4 in the unbalance correction operation is set as a rotation speed with which laundry in the rotatable tub 4 is movable without sticking onto an inner wall of the rotatable tub 4. Hereinafter, the unbalanced material point of laundry in the rotatable tub 4 is simply referred to as "unbalanced material point".

A target material point position is a position of the unbalanced material point which is a lowermost position in the rotatable tub 4 when an engagement position becomes a target engagement position. Also, the engagement position is an engagement position of the moving part 65 with respect to the rotor-side fixing part 61 (or the stator-side fixing part 62) with which the moving part 65 is to be engaged.

In the illustrated embodiment, the controller 15 measures (assumes) the position of the unbalanced material point, based on the rotation speed of the rotating rotatable tub 4. The measurement of the position of the unbalanced material point will be described in detail at a later time.

Figure 32:
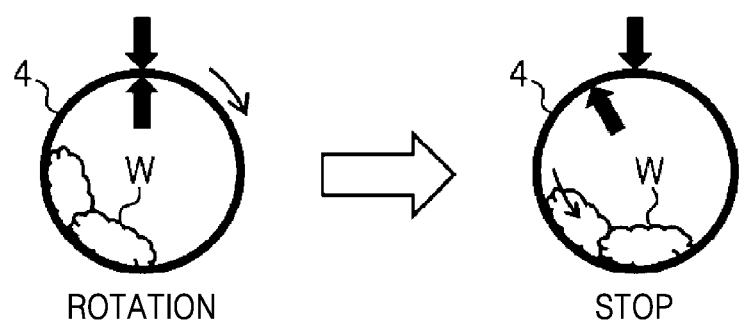
FIG. 32 is a schematic diagram illustrating an embodiment of a movement of a rotatable tub when electrification of a motor is stopped while a position of an unbalanced material point of laundry in the rotatable tub is not a target material point position.
Figure 33:
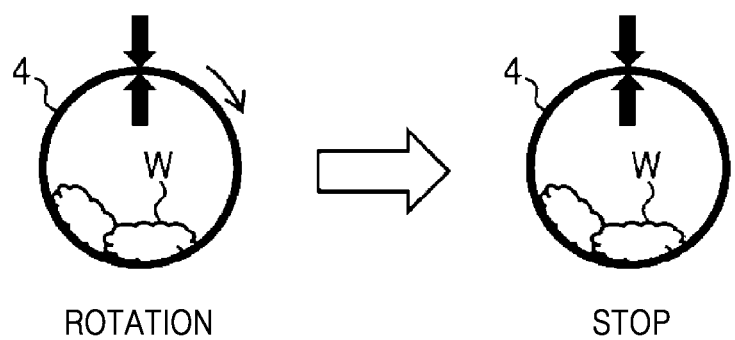
FIG. 33 is a schematic diagram illustrating an embodiment of a movement of a rotatable tub when electrification of a motor is stopped while a position of an unbalanced material point of laundry in the rotatable tub is a target material point position.

FIG. 32 is a schematic diagram illustrating an embodiment of a movement of a rotatable tub when electrification of a motor is stopped while a position of an unbalanced material point of laundry in the rotatable tub is not a target material point position. FIG. 33 is a schematic diagram illustrating an embodiment of a movement of a rotatable tub when electrification of a motor is stopped while a position of an unbalanced material point of laundry in the rotatable tub is a target material point position. With reference to FIGS. 32 and 33, a movement of the rotatable tub 4 after electrification of the motor 40 is stopped will now be described. With reference to FIGS. 32 and 33, a state in which a black arrow inside the rotatable tub 4 is aligned with a black arrow outside thereof indicates a state in which an engagement position is a target engagement position, and a state in which the black arrow inside the rotatable tub 4 is not aligned with the black arrow outside thereof indicates a state in which an engagement position is not a target engagement position.

As illustrated in FIG. 32, in a case where a position of an unbalanced material point (an unbalanced material point of laundry W in the rotatable tub 4) is not a target material point position, when electrification of the motor 40 is stopped, a rotation of the rotatable tub 4 is stopped while the engagement position is not the target engagement position. Due to that, it is difficult to allow the engagement position to approach the target engagement position.

As illustrated in FIG. 33, in a case where a position of an unbalanced material point (an unbalanced material point of laundry W in the rotatable tub 4) is a target material point position, when electrification of the motor 40 is stopped, a rotation of the rotatable tub 4 is stopped while the engagement position is the target engagement position. Due to that, it is easy to allow the engagement position to approach the target engagement position.

Figure 34:
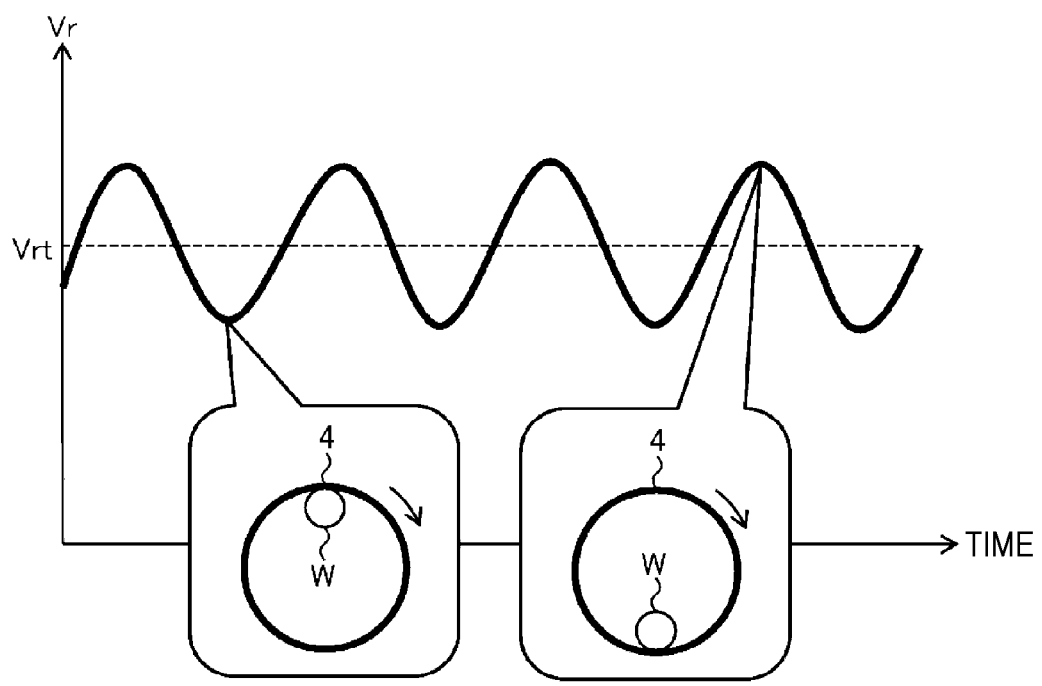
FIG. 34 is a schematic diagram illustrating an embodiment of a relation between a rotation speed of a rotatable tub and a position of an unbalanced material point of laundry in the rotatable tub.

FIG. 34 is a schematic diagram illustrating an embodiment of a relation between a rotation speed of a rotatable tub and a position of an unbalanced material point of laundry in the rotatable tub. With reference to FIG. 34, measurement of a position of an unbalanced material point, based on a rotation speed of the rotatable tub 4, will now be described.

As illustrated in FIG. 34, in a case where the motor 40 is controlled to allow a rotation speed Vr of the rotatable tub 4 to become a target rotation speed Vrt, when a position of an unbalanced material point (an unbalanced material point of laundry W in the rotatable tub 4) is an uppermost position in the rotating rotatable tub 4, the rotation speed Vr of the rotatable tub 4 may become minimum, and when the position of the unbalanced material point is a lowermost position in the rotating rotatable tub 4, the rotation speed Vr of the rotatable tub 4 may become maximum. Also, a relation between "rotation phase of the rotatable tub 4" and "rotation phase of the rotor 45" is uniquely determined, and a relation between "rotation phase of the rotor 45" and "engagement position" is uniquely determined. Therefore, the position (the rotation phase) of the unbalanced material point may be specified by specifying the rotation phase of the rotor when the rotation speed Vr of the rotatable tub 4 is minimum. Therefore, whether the position of the unbalanced material point is a target material point position (the position of the unbalanced material point which is a lowermost position in the rotatable tub 4 when an engagement position becomes a target engagement position) may be determined.

In the illustrated embodiment, the controller 15 specifies the position (the rotation phase) of the unbalanced material point, based on the rotation phase of the rotor 45 when the rotation speed Vr of the rotatable tub 4 is minimum. Then, the controller 15 continuously performs an unbalance correction operation (an operation of correcting the position of the unbalanced material point of laundry in the rotatable tub 4, by rotating the rotatable tub 4) until a difference between the position of the unbalanced material point and the target material point position remains below a threshold value, and when the difference between the position of the unbalanced material point and the target material point position remains below the threshold value, the controller 15 stops the unbalance correction operation.

As described above, in the illustrated embodiment, the controller 15 performs the unbalance correction operation before switching processing is performed. In the unbalance correction operation, the controller 15 corrects the position of the unbalanced material point of laundry in the rotatable tub 4 by rotating the rotatable tub 4 by controlling the motor 40 so to allow the position of the unbalanced material point of laundry in the rotatable tub 4 to approach the target material point position (the position of the unbalanced material point which is a lowermost position in the rotatable tub 4 when the engagement position becomes the target engagement position). With this control, the engagement position may easily approach the target engagement position.

Other Embodiment

In descriptions above, a case in which the movement operation is performed after the adjustment operation is performed is described in an embodiment, but the disclosure is not limited thereto. In an embodiment, the controller 15 may start the movement operation before an end of the adjustment operation, in consideration of a movement time of the moving part 65 from the start state to the end state in the movement operation, for example. In detail, the controller 15 may start the movement operation during a period of time between an end point that is an estimated end time in which the engagement position becomes the target engagement position and the adjustment operation is expected to end, and a start time that is earlier than the estimated end time by "movement time of the moving part 65".

Figure 35:
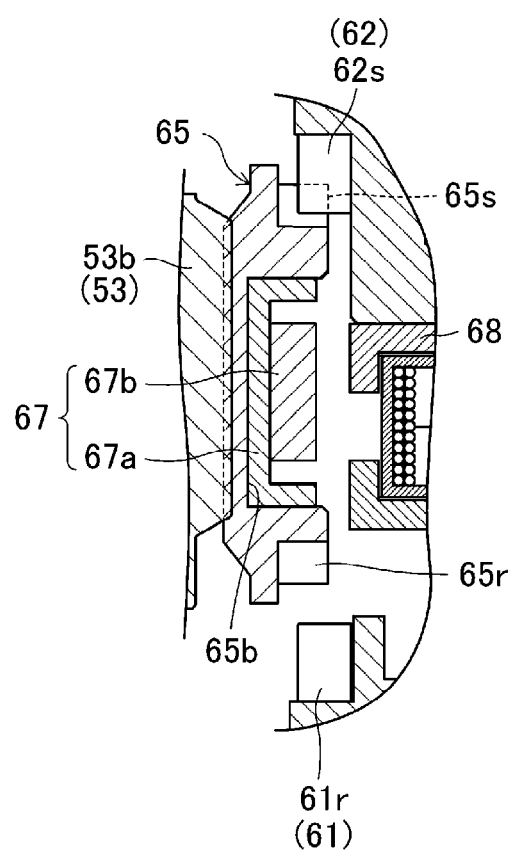
FIG. 35 is a schematic diagram illustrating an embodiment of a mover of a driving part.

FIG. 35 is a schematic diagram of an embodiment of a mover of a moving part. In an embodiment described above, the mover 67 of the driving part 66 may have a configuration shown in FIG. 35. In the embodiment of FIG. 35, the slider core 67a of the mover 67 is a cylindrical-shape metal member of which cross-section being open to the outside in the diameter direction has a C-shape. The clutch magnet 67b of the mover 67 is a permanent magnet formed with a cylindrical shape, and is installed on an inner side of the slider core 67a. A gap is formed between opposite ends of the slider core 67a in the axial direction, and the clutch magnet 67b. In an embodiment, the clutch magnet 67b is magnetized, so that an outer side in the diameter direction becomes an S-pole, and an inner side in the diameter direction becomes an N-pole, for example. Accordingly, opposite ends of the slider core 67a in the axial direction become pseudo-N-poles. That is, the clutch magnet 67b may be configured as a consequent pole type.

Also, in descriptions above, a case in which the number of each of the rotor-end fixed claws 61r, the stator-end fixed claws 62s, the rotor-end moving claws 65r, and the stator-end moving claws 65s is the same is described in an embodiment, but the disclosure is not limited thereto. In an embodiment, the number of the rotor-end fixed claws 61r and the number of the stator-end fixed claws 62s may be different from each other, for example. The number of the rotor-end fixed claws 61r and the number of the rotor-end moving claws 65r may be different from each other. The number of the stator-end fixed claws 62s and the number of the stator-end moving claws 65s may be different from each other. The number of each of the rotor-end fixed claws 61r, the stator-end fixed claws 62s, the rotor-end moving claws 65r, and the stator-end moving claws 65s may be different.

Also, in descriptions above, a case in which the moving part 65 is moved in the axial direction due to the magnetic field generated by the clutch coil 68a is described in an embodiment, but the disclosure is not limited thereto. In an embodiment, driving equipment (the driving part 66) that operates the moving part 65 in the axial direction may be electronic driving equipment that uses a solenoid coil, a radial coil, or the like, or may be mechanical driving equipment that uses a spring, a motor, or the like, for example. Also, in the descriptions above, an embodiment in which a combination of ON and OFF of the switching devices SW1 to SW6 of the motor driving circuit 70 is set as a target combination (a combination according to a target phase of the rotor 45), so that a rotation phase of the rotor 45 is set as the target phase is described, but the disclosure is not limited thereto. In an embodiment, ON and OFF of the switching devices SW1 to SW6 of the motor driving circuit 70 may be controlled due to PWM control, so as to allow the rotation phase of the rotor 45 to become the target phase, for example.

Also, in the descriptions above, an embodiment in which the adjustment operation is achieved without detection of the rotation phase of the rotor 45 is described, but the disclosure is not limited thereto. The controller 15 may detect the rotation phase of the rotor 45, and may adjust the rotation phase of the rotor 45 so as to allow the detected rotation phase of the rotor 45 to become the target phase. Also, detection of the rotation phase of the rotor 45 may be performed based on outputs of various sensors (not shown) installed in, e.g., the driving unit 10.

Also, in the descriptions above, an increase from an initial value to a target value of the motor current flowing to the motor coil 43 may be an increase represented as a function such as a linear function, a quadratic function, a sigmoid function, or the like. The same is applied to the clutch current flowing to the clutch coil 68a.

Also, in the descriptions above, the rotatable tub 4 may be designed such that, when the engagement position is the target engagement position, a center part between two lifters 4c (two adjacent lifters 4c in the perimeter direction) installed in the rotatable tub 4 is the lowermost part. With this configuration, the part between lifters 4c on which laundry may be collected in the rotatable tub 4 may be the lowermost part, and thus, the state in which the rotatable tub 4 does not rotate is easily maintained. Accordingly, as a state in which the rotor 45 does not rotate is easily maintained, the engagement position may be stabilized.

Also, in the descriptions above, the dewatering process may start while a preset amount of water is held in the fixed tub 3. With this configuration, in the maintaining operation, laundry in the rotatable tub 4 may be easily moved downward due to its weight, and thus, the laundry may be easily gathered onto the lowermost part of the rotatable tub 4.

Also, in the descriptions above, an embodiment in which the maintaining operation is performed in switching processing before the dewatering process is described, but the disclosure is not limited thereto. In an embodiment, the maintaining operation may be skipped due to an amount of load (the weight of the laundry in the rotatable tub 4), for example.

Also, in the descriptions above, an embodiment in which the motor 40 is a three-phase motor is described, but the disclosure is not limited thereto. In an embodiment, the motor 40 may be a single-phase motor or may be a multi-phase motor different from the three-phase motor, for example.

According to Japanese Patent Application Publication No. 2020-124381, in a driving unit, a moving part and a fixing part are engaged with each other so that the moving part and the fixing part are connected to each other. When the moving part and the fixing part are connected by sliding the moving part in an axial direction, in a case where an engagement position of the moving part with respect to the fixing part deviates from a target position, an engagement error may occur between the fixing part and the moving part. Therefore, the disclosure provides a driving device capable of suppressing occurrence of the engagement error in a clutch, and a washing machine employing the driving device.

In an embodiment, a washing machine includes: a rotatable tub; a driving unit configured to rotate the rotatable tub. In an embodiment, the driving unit may include: a shaft; a motor including a stator and a rotor; a decelerator provided between the shaft and the rotor; a clutch configured to be switchable between a first mode in which rotation of the rotor is transmitted to the shaft via the decelerator, and a second mode in which rotation of the rotor is transmitted to the shaft without passing through the decelerator; and a controller. In an embodiment, the clutch may include: a rotor-side fixing part configured to be rotatable by interoperating with rotation of the rotor; a stator-side fixing part being fixed to the stator, and configured to face the rotor-side fixing part with a gap therebetween in an axial direction of the shaft; and a moving part configured to be movable between the rotor-side fixing part and the stator-side fixing part in the axial direction. The clutch is further configured to switch to the first mode as the stator-side fixing part and the moving part engage with each other, and switch to the second mode as the rotor-side fixing part and the moving part engage with each other. When the controller performs switching processing, by moving the moving part in the axial direction, so as to switch the moving part from a start state in which one of the rotor-side fixing part and the stator-side fixing part engages with the moving part to an end state in which the other one of the rotor-side fixing part and the stator-side fixing part engages with the moving part, the controller may perform an adjustment operation, before the end state starts, of adjusting an engagement position by changing a rotation phase of the rotor so as to allow the engagement position of the moving part with respect to the other one of the rotor-side fixing part and the stator-side fixing part to become a target engagement position.

In an embodiment, in the switching processing, the controller may be further configured to perform, after the adjustment operation, a movement operation of moving the moving part in the axial direction.

In an embodiment, the clutch may include a driving part configured to drive the moving part. The driving part may include a clutch magnet installed at the moving part, and a clutch coil configured to generate a magnetic field for moving the clutch magnet in the axial direction. In the movement operation, after the controller starts supplying power for generating the magnetic field to the clutch coil, the controller may be further configured to determine whether the moving part is moved, based on whether the power is distorted.

In an embodiment, the decelerator may include: a carrier fixed to the shaft; a sun gear configured to be rotatable with the rotor; an internal gear configured to surround the sun gear; and a plurality of planetary gears supported to be rotatable on the carrier, and configured to engage with both the sun gear and the internal gear. The moving part may be installed on an outer side of the internal gear, and may be rotatable with the internal gear.

In an embodiment, the rotor-side fixing part may include a plurality of rotor-end fixed claws, the stator-side fixing part may include a plurality of stator-end fixed claws, and the moving part may include a plurality of rotor-end moving claws configured to engage with the plurality of rotor-end fixed claws, and a plurality of stator-end moving claws configured to engage with the plurality of stator-end fixed claws. A target engagement position of the moving part with respect to the rotor-side fixing part may be a position where gaps between the plurality of rotor-end fixed claws and the plurality of rotor-end moving claws face in the axial direction, and a target engagement position of the moving part with respect to the stator-side fixing part may be a position where gaps between the plurality of stator-end fixed claws and the plurality of stator-end moving claws face in the axial direction.

In an embodiment, a perimeter direction length between the plurality of rotor-end fixed claws may be greater than a sum of a perimeter direction length according to a rotation phase difference between the rotor-side fixing part and the stator-side fixing part at the target engagement position and a perimeter direction length of the rotor-end moving claw. A perimeter direction length between the plurality of stator-end fixed claws may be greater than a sum of a perimeter direction length according to a rotation phase difference between the rotor-side fixing part and the stator-side fixing part at the target engagement position and the perimeter direction length of the stator-end moving claw.

In an embodiment, a rotation phase of the rotor in the target engagement position may be a rotation phase when cogging torque of the motor reaches a stabilization point.

In an embodiment, the stator may include a motor coil configured to generate a magnetic field for rotating the rotor. The clutch may include the driving part configured to drive the moving part. The driving part may include the clutch magnet installed at the moving part, and the clutch coil configured to generate a magnetic field for moving the clutch magnet in the axial direction. The controller may include a motor driving circuit configured to supply power to the motor coil, and a clutch driving circuit configured to supply power to the clutch coil. The clutch driving circuit may be further configured to supply, to the clutch coil, power supplied from the motor driving circuit, by electrically connecting the motor coil to the clutch coil, and impedance of the clutch coil may be lower than impedance of the motor coil.

In an embodiment, in the switching processing, the controller may be further configured to perform the adjustment operation, and a maintaining operation of maintaining the rotation phase of the rotor which is adjusted by the adjustment operation.

In an embodiment, the rotatable tub may be provided in such a manner that its axial line follows in a direction crossing a vertical direction. Before performing the switching processing, the controller may be further configured to perform an unbalance correction operation of correcting a position of an unbalanced material point of laundry in the rotatable tub by rotating the rotatable tub by controlling the motor so as to allow the position of the unbalanced material point of laundry in the rotatable tub to approach a target material point position. The target material point position may be a position of the unbalanced material point which is a lowermost position in the rotatable tub when the engagement position becomes the target engagement position.

By the embodiments described above, occurrence of the engagement error in the clutch may be suppressed.

Figure 36:
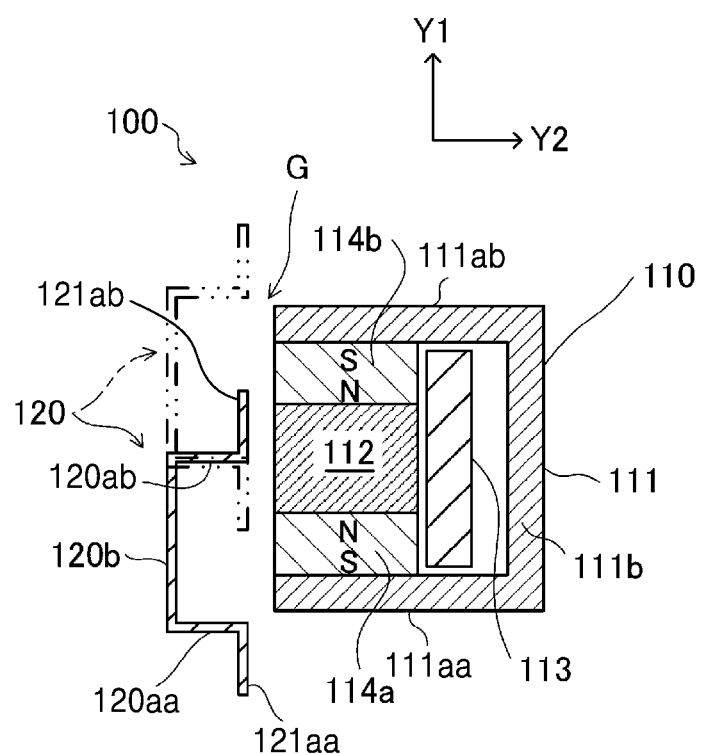
FIG. 36 is a schematic cross-sectional view of an embodiment of an actuator.

FIG. 36 is a schematic cross-sectional view of an embodiment of an actuator 100. Referring to FIG. 36, the actuator 100 includes a fixed member 110, and a moving member 120 performing a reciprocating movement along the fixed member 110. The moving member 120 performs a linear reciprocating movement in a preset range in a direction (a first direction, the axial direction) indicated as an arrow (Y1) in FIG. 36. That is, the actuator 100 is a linear type. The fixed member 110 and the moving member 120 are provided to face each other with a slight gap G therebetween in a direction (a second direction, the diameter direction) crossing (roughly being perpendicular) the first direction.

The fixed member 110 may include an outer core 111, an inner core 112, a wiring 113, and two magnets 114a and 114b. The outer core 111 and the inner core 112 may be formed of a soft magnetic material such as a steel plate. The outer core 111 may include a pair of support wall parts 111aa and 111ab facing each other and being separate in the first direction, and a connection wall part 111b connecting to ends of the support wall parts 111aa and 111ab, the ends being apart from the moving member 120, and may be unitary to have a U-shape (arch-shape) cross section.

An opening of the outer core 111 which is opposite to the connection wall part 111b is toward the gap G. The two magnets 114a and 114b are each a magnet with a quadrangular (e.g., square) cross section, and respectively contact two facing surfaces of the pair of support wall parts 111aa and 111ab, along the opening of the outer core 111. The two magnets 114a and 114b are parallel in the first direction.

The pair of magnets 114a and 114b is magnetized to align in the first direction, and is provided in such a manner that respective N-poles face each other in the first direction. That is, the magnets 114a and 114b are provided in such a manner that S-poles thereof face the respective support wall parts 111aa and 111ab, and N-poles thereof face each other.

The inner core 112 has a quadrangular (e.g., square) cross section, and is provided between the magnets 114a and 114b while the inner core 112 contacts the two magnets 114a and 114b. The two magnets 114a and 114b and the inner core 112 are integrated as one body, and the opening of the outer core 111 is blocked due the one body.

Due to that, the two magnets 114a and 114b and the inner core 112 are exposed with the ends of the support wall parts 111aa and 111ab of the outer core 111 and are toward the gap G. An exposed surface which is formed by the two magnets 114a and 114b, the inner core 112, and the ends of the two support wall parts 111aa and 111ab of the outer core 111 is a flat surface being parallel to the first direction.

At least one wiring 113 is included in a space between the two magnets 114a and 114b and the inner core 112 and the connection wall part 111b. As a greater number of the wiring 113 is desired and the wiring 113 is generally provided in plural, the wiring 113 is also referred to as a wiring group. The wiring group extends in a direction crossing (roughly being perpendicular) both the first direction and the second direction, that is, a direction being roughly vertical to a plan of the drawing in FIG. 36.

The moving member 120 includes two salient-pole cores 120aa and 120ab, a connection core 120b, or the like, and may be unitarily (or integrally) formed of a soft magnetic material with a plate shape. The moving member 120 may be formed of a bent steel plate.

The two salient-pole cores 120aa and 120ab extend in parallel in the second direction, and are provided in parallel with a preset gap therebetween in the first direction. It is set in such a manner that end parts of the salient-pole cores 120aa and 120ab respectively face the two magnets 114a and 114b when the moving member 120 frontally faces the fixed member 110. In the moving member 120, flange parts 121aa and 121ab protrude in opposite directions of the first direction at the respective end parts of the salient-pole cores 120aa and 120ab.

Base ends of the two salient-pole cores 120aa and 120ab, which are apart from the two magnets 114a and 114b, are connected by the connection core 120b. Due to that, a cross-section of the moving member 120 has a hat-shape. Also, the connection core 120b is apart from the two magnets 114a and 114b, and its cross-section may have a V or U shape.

When the actuator 100 is not electrified, the moving member 120 remains in a first position or a second position due to a magnetic field formed between the moving member and the fixed member 110. Then, by allowing a current to flow in the wiring group and switching the flow (an electrification direction), the moving member 120 performs a reciprocating movement between the first position indicated by a solid line and the second position indicated by a second broken line. That is, when the electrification direction is switched, the magnetic field between the moving member 120 and the fixed member 110 is changed. Accordingly, a driving force is generated in the moving member 120 and is changed according to displacement of the moving member 120.

Figure 37:
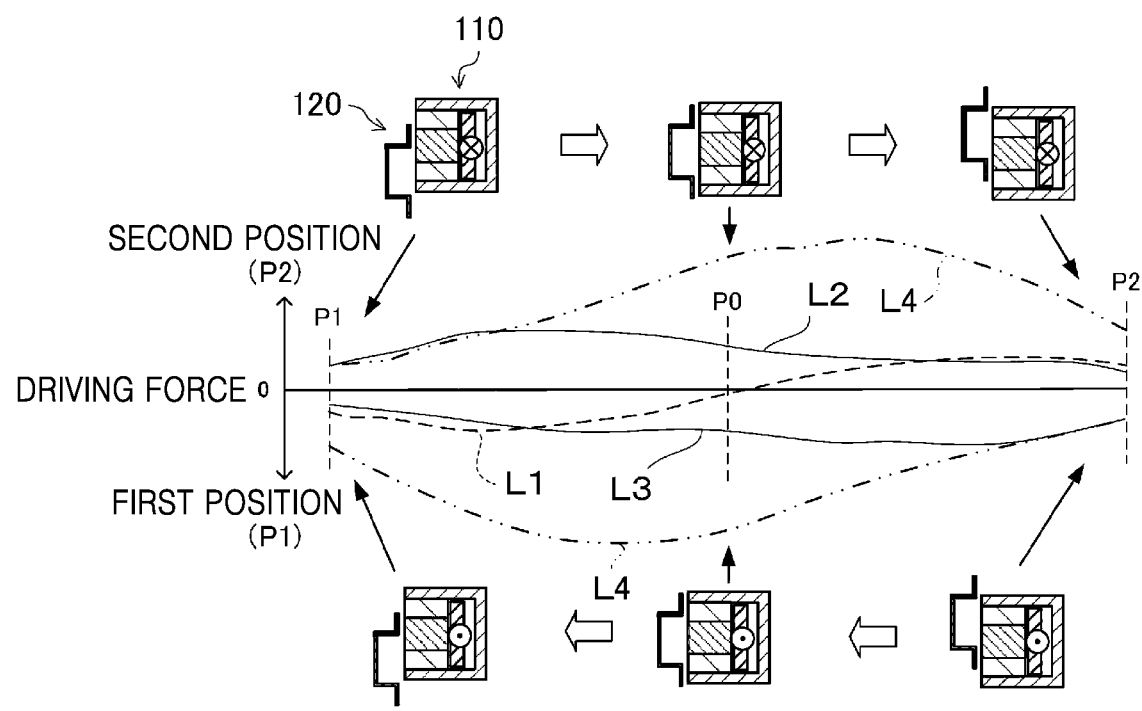
FIG. 37 illustrates a relation between a state of an actuator and a driving force.

FIG. 37 illustrates a relation between a state of the actuator 100 and a driving force. A horizontal axis indicates a position of the moving member 120 with respect to the fixed member 110. A vertical axis indicates strength of the driving force toward a first position P1 or a second position P2. A line L1 indicates a change of the driving force in each position during non-electrification. A line L2 indicates a change of the driving force when the wiring group is electrified in an electrification direction (a second electrification direction) from the front toward a plan of FIG. 37. A line L3 indicates a change of the driving force when the wiring group is electrified in an electrification direction (a first electrification direction) from a plane of FIG. 37 to the front. A second broken line L4 will be described below.

During non-electrification, when the moving member 120 is in the first position P1, a driving force toward the first position P1 is generated, and when the moving member is in the second position P2, a driving force toward the second position P2 is generated. Therefore, when the moving member 120 is in the first position or the second position, even when electrification is not performed, the moving member 120 may stably remain in that position. Also, by performing electrification in the first electrification direction, a driving force toward the first position as indicated by the line L3 is generated. By performing electrification in the second electrification direction, a driving force toward the second position as indicated by the line L2 is generated. Therefore, due to switching between electrification directions, the moving member 120 may perform the reciprocating movement between the first position and the second position. With respect to a driving force generated due to electrification, a driving force after the moving member 120 reaches a position P0 (middle point) frontally facing the fixed member 110 may be smaller than a driving force before passing through the middle point P0. As the driving force changes smoothly in a latter half of the displacement of the moving member 120, a crashing sound is suppressed.

Figure 38:
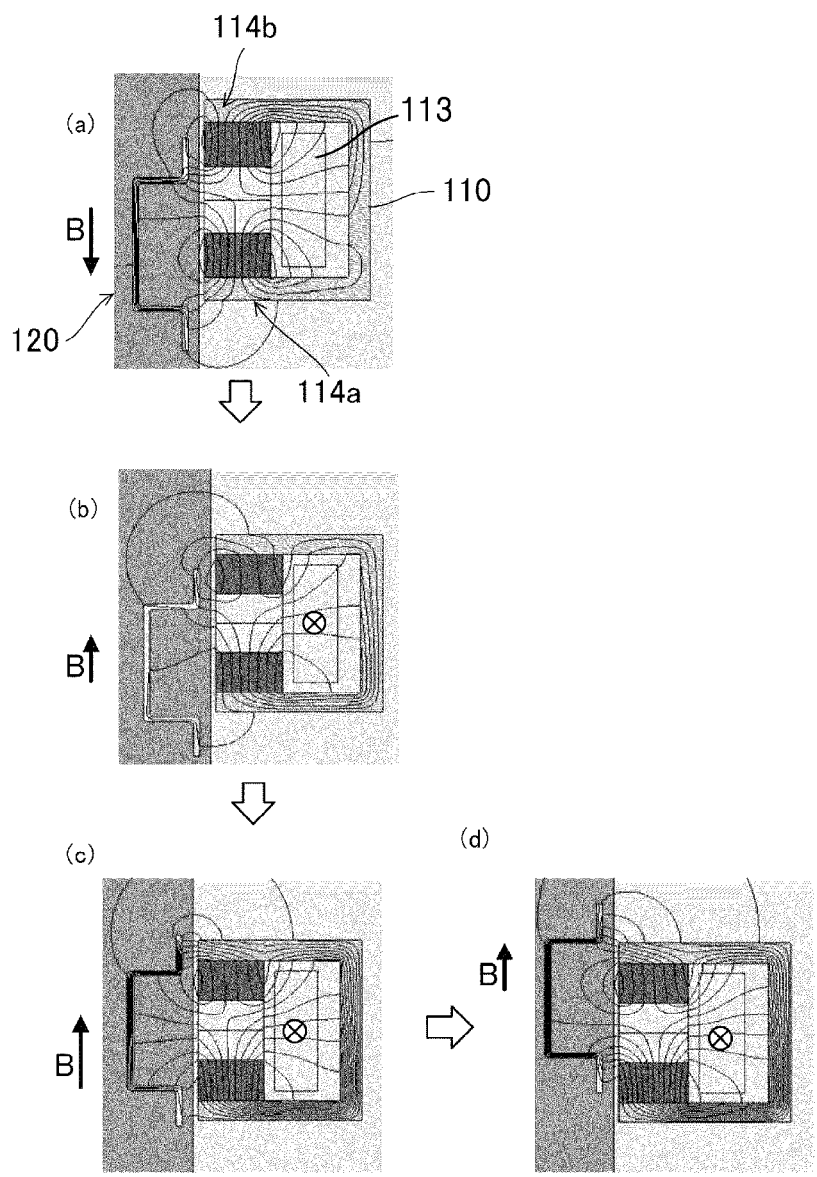
FIG. 38 illustrates an embodiment of magnetic flux line diagrams obtained via a magnetic field analysis when a moving member is displaced from a first position to a second position.

FIG. 38 illustrates an embodiment of magnetic flux line diagrams obtained via a magnetic field analysis when the moving member 120 is displaced from the first position to the second position. Lines of each diagram indicate a magnetic flux. Equally, an arrow B indicates a driving force being applied to the moving member 120.

(a) of FIG. 38 indicates a state in which the moving member 120 is in the first position. A current does not flow in the wiring 113 (a non-electrification state). As a magnetic flux of the magnet 114a (the first magnet 114a) disposed in the first position from among the two magnets 114a and 114b further flows in the moving member 120, a driving force toward the first position is generated, and the moving member 120 remains in the first position.

(b) of FIG. 38 indicates a state in which the moving member 120 is in the first position. The wiring 113 is electrified in the second-electrification direction. Due to the electrification, the magnetic flux of the magnet 114a which flows in the moving member is reduced. Then, due to a magnetic force of the magnet 114b (the second magnet 114b) disposed in the second position side, a driving force toward the second position is generated, and the moving member 120 is displaced from the first position to the second position.

(c) of FIG. 38 indicates a switching state in which the moving member 120 is being displaced. A magnetic flux due to the electrification and the magnetic flux of the first magnet 114a flow in the moving member 120 through the core 112 of the fixed member 110, and a magnetic flux density of the moving member 120 is increased. Due to that, an increase of a gap magnetic flux to apply a driving force to the moving member 120 is suppressed, such that the driving force is gradually decreased. Due to that, the moving member 120 is gradually displaced from the first position to the second position while decreasing its acceleration.

(d) of FIG. 38 indicates a state in which the moving member 120 reaches the second position. As the magnetic flux density of the moving member 120 is further increased, a driving force of the moving member 120 is decreased and thus, the moving member 120 remains in the second position.

Also, a case in which the moving member 120 is displaced from the second position to the first position is the same as a case of displacement from the first position to the second position, except that a displacement direction is opposite. Therefore, descriptions thereof are skipped.

The second broken line L4 shown in FIG. 37 indicates a driving force of a case in which a moving member as a comparative object includes a magnet (magnet at mover side). In this case, the driving force is maximized near a displacement position, and its strength is high. Therefore, a force or speed with which the moving member is displaced is substantially strong such that a substantially big crashing sound occurs.

On the contrary thereto, in the actuator 100 of the illustrated embodiment, as indicated by the line L2 or the line L3, the driving force is decreased in the latter half of the displacement, and thus, as a target position is close, the driving force becomes small, so that a force or speed with which the moving member 120 is displaced may be appropriate. In a case of comparison between the actuator 100 of the illustrated embodiment and the comparative object, under the same condition, a maximum decrease of 50% of the driving force has been approved. Therefore, a crashing sound may be effectively suppressed with the actuator 100 of the illustrated embodiment.

Also, as the comparative object, when the moving member 120 includes a magnet at mover side, the magnet at mover side may be separated from the moving member 120 when the moving member 120 rotates at a relatively high speed. On the contrary thereto, as the actuator 100 of the illustrated embodiment does not have the magnet at mover side, there is no such risk. Therefore, the moving member 120 may rotate at a relatively high speed, which is better in dewatering or the like.

Also, when compared with the comparative object, the actuator 100 of the illustrated embodiment is better in terms of easy manufacturing. That is, in general, rather than a magnet itself is not assembled to an object, a hard magnetic material is assembled to the object and then the hard magnetic material is magnetized to form a magnet. When the magnet itself is assembled to the object, foreign substances such as iron components or the like are adhered to the magnet or its neighboring parts in a manufacturing process thereafter, such that the manufacturing may be difficult due to a magnetic affect.

In case of the comparative mover side magnet, it is difficult to form the mover side magnet by magnetizing a hard magnetic material after assembling the hard magnetic material to the moving member, but in the actuator 100 of the illustrated embodiment, it is relatively easy to form the magnets 114a and 114b by performing magnetization after the hard magnetic material is assembled to the fixed member 110. Therefore, the actuator of the illustrated embodiment is easily manufactured. In the actuator 100 of the illustrated embodiment, a core (an iron core) with relatively high processing accuracy is a primary magnetic path with respect to an air gap, i.e., the gap G, such that unevenness of a magnetic flux due to unevenness of magnetization in the core may be decreased, and an iron loss due to the unevenness of magnetization may be suppressed.

Furthermore, in the actuator 100 of the illustrated embodiment, it is difficult for a magnetic flux to flow in a direction where magnetization of the magnets 114a and 114b is decreased (refer to distribution of magnetic fluxes of FIG. 3). Therefore, as it is acceptable that demagnetization strength is low, an inexpensive magnet may be used as the magnets 114a and 114b. Also, as the moving member 120 may only consist of an iron thin plate, the moving member 120 may be light-weighted. Energy desired to displace the moving member 120 is decreased, and noise may also be decreased.

Next, a case in which the actuator 100 is applied (a driving unit for a washing machine) will now be described. An embodiment of the actuator 100 may be applied to the driving unit 10 of the washing machine 1 described above. In detail, the actuator 100 may be used in the clutch 60 of the driving unit 10. The stator 68 (the fixed member 110) and the mover 67 (the moving member 120) of the clutch 60 (the actuator 100) have round shapes whose centers are aligned and may be annularly formed. The wiring group forms the clutch coil 68a. A structure of the washing machine 1 is the same as those described with reference to FIGS. 1 to 8. Hereinafter, an embodiment in which the actuator 100 is applied to the clutch 60 of the driving unit 10 will now be described.

Figure 39:
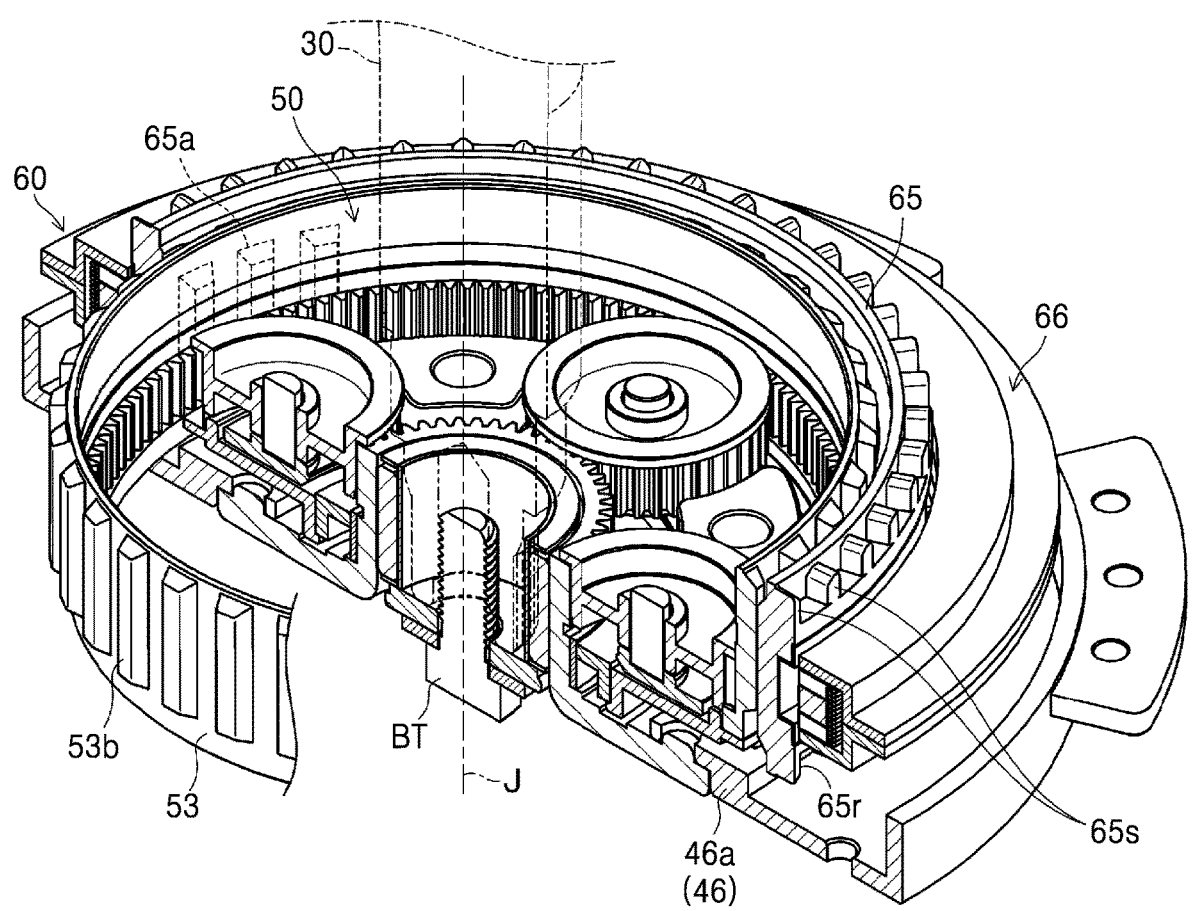
FIGS. 39, 40, and 41 are partial cutaway perspective views of an embodiment of a decelerator and a clutch.
Figure 40:
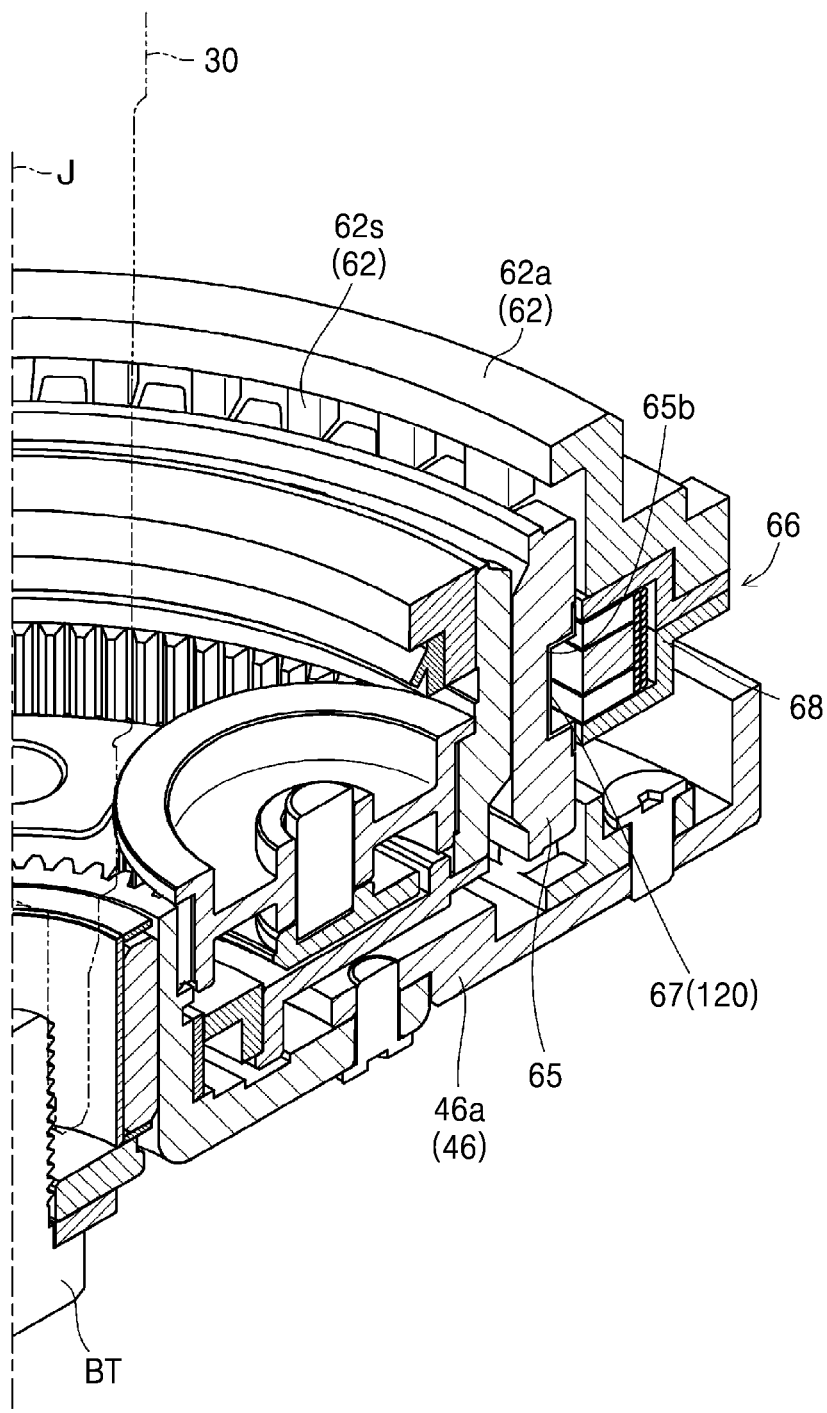
Figure 41:
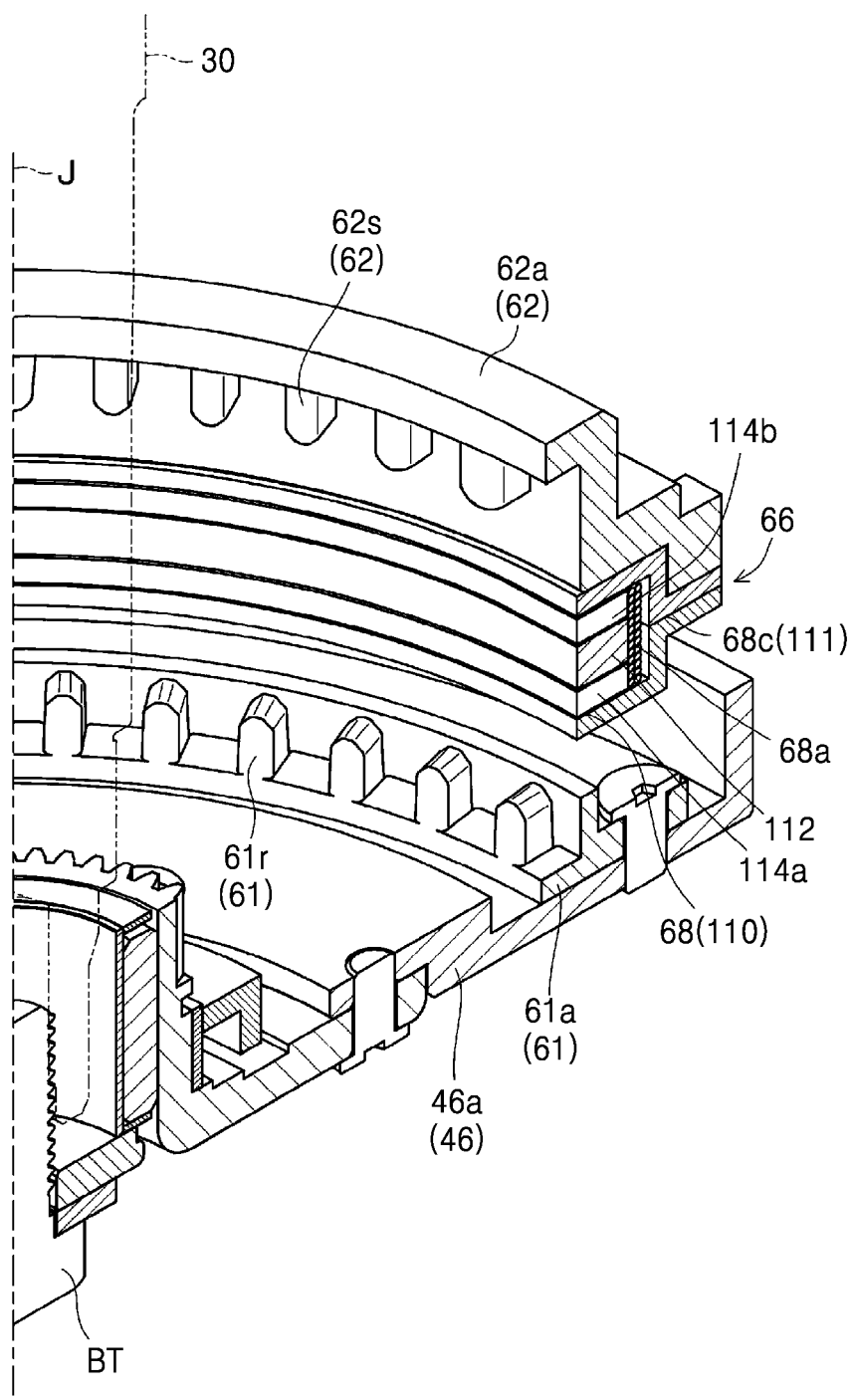

The clutch 60 is provided around the decelerator 50. The clutch 60 is contained in the rotor case 46. FIGS. 39, 40, and 41 are partial cutaway perspective views of an embodiment of the decelerator 50 and the clutch 60. The clutch 60 may include the moving part 65, the fixed claws 61r and 62s of the rotor end and stator end, and the driving part (clutch driver) 66. The driving part 66 may include the mover 67 and the stator 68. The mover 67 and the stator 68 are configured by the actuator 100 described above.

The moving part 65 is a cylindrical-shape member of which diameter is greater than that of the internal gear 53. As partially shown in FIG. 39, the plurality of outer slide guides 65a which include linear protrusions extending in a rotation-axis direction is equiangularly formed in an entirety of the perimeter of an inner circumferential surface of the moving part 65. The outer slide guides 65a engage with the plurality of inner slide guides 53b formed in the outer circumferential surface of the internal gear 53. The moving part 65 are provided around the internal gear 53 while the outer slide guides 65a respectively engage with the inner slide guides 53b of the internal gear 53. Accordingly, the moving part 65 is slidable in the rotation-axis direction.

The rotor-end and stator-end moving claws (hereinafter, also referred to as rotor-end and stator-end moving claws) 65r and 65s are formed on an outer circumferential surface of the moving part 65. The rotor-end and stator-end moving claws 65r and 65s include a plurality of protrusions (moving-side protrusions) protruding in the rotation-axis direction, and are equiangularly formed in an entirety of the perimeter of the outer circumferential surface of the moving part 65. The rotor-end moving claws 65r are provided on a lower part of the moving part 65, and each protrusion downwardly protrudes. The stator-end moving claws 65s are provided on an upper part of the moving part 65, and each protrusion upwardly protrudes. The mover containing part 65b for containing the mover 67 is formed between the rotor-end and stator-end moving claws 65r and 65s on the outer circumferential surface of the moving part 65.

As illustrated in FIG. 41, the rotor-end fixed claws 61r are formed on the annular rotor-end base part 61a disposed (e.g., mounted) to the rotor case 46. The rotor-end fixed claws 61r include a plurality of protrusions (fixture-side protrusions) equiangularly protruding in the rotation-axis direction in an entirety of the perimeter of the annular rotor-end base part 61a. The protrusions upwardly protrude. Also, although not illustrated, when the rotor 45 is unitary (or integrally formed), the protrusions may be unitary (or integrally formed) with other components that configure the rotor 45, or may be unitary (or integrally formed) with the rotor case 46.

The stator-end fixed claws 62s are formed at the annular stator-end base part 62a disposed (e.g., mounted) at the stator 41. The stator-end fixed claws 62s may include a plurality of protrusions (fixture-side protrusions) equiangularly protruding in the rotation-axis direction in an entirety of the perimeter of the annular stator-end base part 62a. The protrusions downwardly protrude. Also, the protrusions may be unitary (or integrally formed) with an insulator.

The rotor-end fixed claw 61r and the stator-end fixed claw 62s are provided to face each other in remote positions in the rotation-axis direction. The rotor-end fixed claw 61r is configured to be engaged with the rotor-end moving claw 65r. The stator-end fixed claw 62s is configured to be engaged with the stator-end moving claw 65s.

A gap between the rotor-end fixed claw 61r and the stator-end fixed claw 62s is set to be greater than a gap between the rotor-end moving claw 65r and the stator-end moving claw 65s. Therefore, when the rotor-end fixed claw 61r and the rotor-end moving claw 65r are connected by being engaged with each other, the stator-end fixed claw 62s and the stator-end moving claw 65s are not engaged with each other. When the stator-end fixed claw 62s and the stator-end moving claw 65s are connected by being engaged with each other, the rotor-end fixed claw 61r and the rotor-end moving claw 65r are not engaged with each other.

As illustrated in FIG. 40, the mover 67 of the driving part 66 includes the moving member 120. The moving member 120 is formed at the mover containing part 65b. As illustrated in FIG. 41, the stator 68 of the driving part 66 includes the fixed member 110. That is, the stator 68 includes the clutch coil 68a, the inner core 112, the outer core 111, and the two magnets 114a and 114b. The outer core 111 is formed by the pair of upper and lower annular holder supports 68c. The holder supports 68c are fixed to the stator 41. The inner core 112 and the two magnets 114a and 114b are annular. The moving member 120 disposed inside the fixed member 110 faces the fixed member 110 by defining the slight gap G (refer to FIG. 36) therebetween in the diameter direction.

Figure 42:
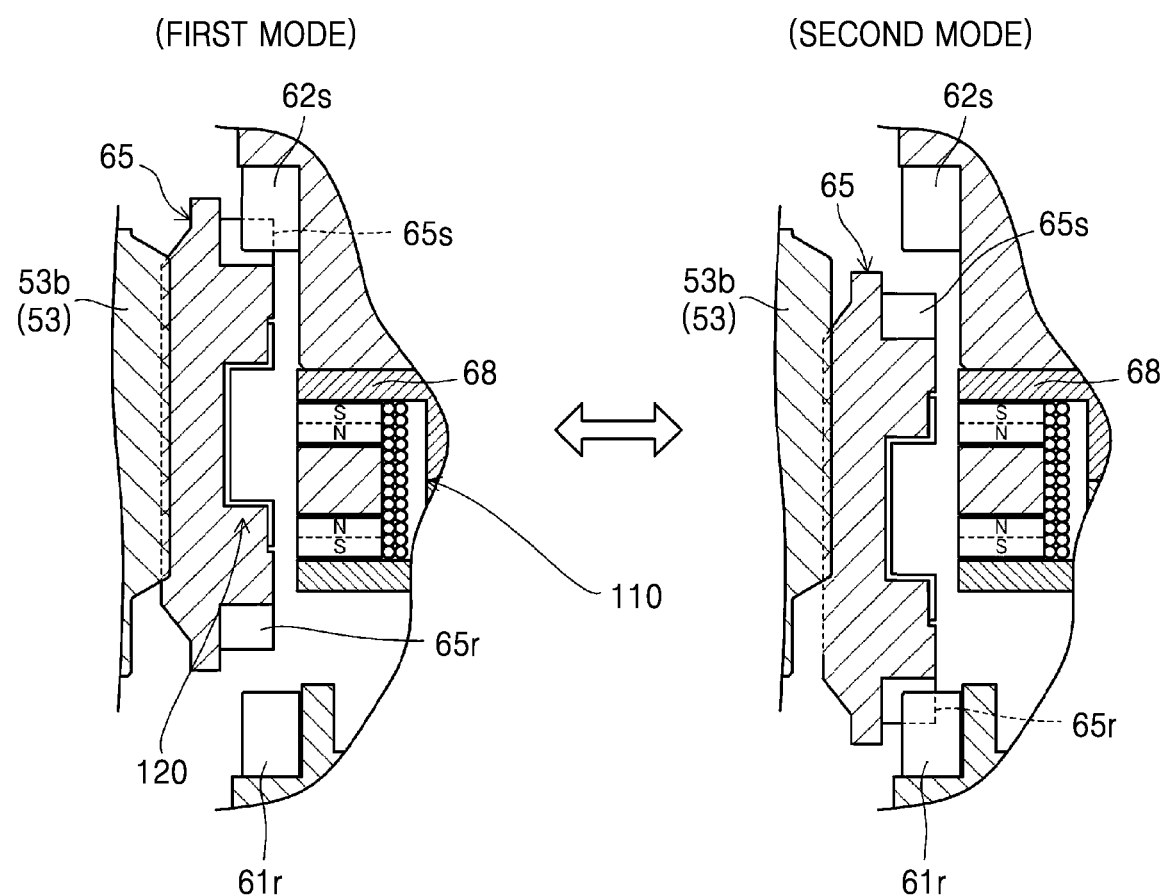
FIG. 42 is a diagram for describing an embodiment of switching of a clutch.

FIG. 42 is a diagram for describing an embodiment of switching of a clutch. Electrification to the clutch coil 68a is controlled by the controller 15. As the controller 15 supplies, to the clutch coil 68a, a switching current of which electrification direction is opposite, the moving member 120 is linearly displaced with respect to the fixed member 110. Due to that, the controller 15 performs processing (switching processing) for sliding the moving part 65 in one direction of rotation-axis directions. Due to that, as illustrated in FIG. 42, switching is performed between the first mode in which the stator-end fixed claw 62s and the stator-end moving claw 65s are engaged with each other and the second mode in which the rotor-end fixed claw 61r and the rotor-end moving claw 65r are engaged with each other.

In the first mode, the internal gear 53 is supported to the stator 41 via the moving part 65. Accordingly, rotations of the rotor 45 and the sun gear 52 are transmitted to the shaft 30 and the carrier 51 via the decelerator 50. Accordingly, the driving unit 10 outputs high-torque rotatory power with low-speed rotations. In the second mode, the internal gear 53 is supported to the rotor 45 via the moving part 65. Accordingly, rotations of the rotor 45 and the sun gear 52 are transmitted to the shaft 30 and the carrier 51 without passing through the decelerator 50. That is, as the rotor 45, the sun gear 52, and the internal gear 53 rotate as one body, the plurality of planetary gears 54 does not revolve. Thus, the shaft 30 and the carrier 51 also rotate as one body with them. Accordingly, the driving unit 10 outputs low-torque rotatory power with high-speed rotations.

With the driving unit 10 described above, the motor 40, the decelerator 50, and the clutch 60 are efficiently included and unitarily (or integrally) configured such that the motor 40, the decelerator 50, and the clutch 60 are aligned in row in a direction being roughly vertical to a rotation-axis line J.

Due to switching of the clutch 60, high-torque rotatory power may be output with low-speed rotations and low-torque rotatory power may be output with high-speed rotations via one shaft 30. Also, as the number of rotations and a value of torque of the motor 40 may be set to be relatively close values in two different output modes of the first mode and the second mode, motor efficiency may be optimized. Therefore, the driving unit 10 having a compact size may output a rotatory power being appropriate for a washing machine. The driving unit 10 is appropriate for the washing machine.

Hereinafter, with reference to FIGS. 17 and 18, an embodiment of an operation of the washing machine 1 will now be described.

When the operation of the washing machine 1 is performed, first, laundry is input to the rotatable tub 4 (operation S1). A detergent or the like is also input to the chemical feeder 5c. Then, due to manipulation of the manipulation part 2c, an indication of starting washing is input to the controller 15 (YES in operation S2). Accordingly, the controller 15 automatically starts a series of washing processes including washing, rinse, dewatering, or the like.

Before the washing processes, the controller 15 measures a weight of the laundry so as to set an amount of water supply (operation S3). The controller 15 sets an appropriate amount of water supply based on the measured weight of the laundry (operation S4). When setting of the amount of water supply is ended, the controller 15 starts the washing processes operation S5). When the washing processes start, the controller 15 supplies a set amount of water into the fixed tub 3 by controlling the water supply valve 5b. At that time, the detergent contained in the chemical feeder 5c and water are inserted into the fixed tub 3.

Afterward, the controller 15 starts rotation of the rotatable tub 4 by driving the driving unit 10. Here, before rotation of the rotatable tub 4 is started, the controller 15 determines whether it is a washing process or a rinse process, as illustrated in FIG. 18 (operation S10). As a result thereof, when it is the washing process or the rinse process, the controller 15 performs switching to the first mode by controlling the clutch 60 (operation S11). However, when it is not the washing process or the rinse process but is a dewatering process, the controller 15 performs switching to the second mode by controlling the clutch 60 (operation S12).

Here, as it is the washing process, the controller 15 switches the clutch 60 into the first mode. Accordingly, the driving unit 10 outputs high-torque rotatory power at a relatively low speed. Therefore, the rotatable tub 4 that is relatively heavy may efficiently rotate at a relatively low speed.

When the washing process is ended, the controller 15 starts the rinse process (operation S6). In the rinse process, washing water gathered in the fixed tub 3 is drained, due to driving of the drain pump 6. Afterward, the controller 15 performs processing of water supply or stirring, as in the washing process. In the rinse process, the driving unit is driven while the clutch 60 is maintained in the first mode.

When the rinse process is ended, the controller 15 starts the dewatering process (operation S7). In the dewatering process, the rotatable tub 4 is rotation-driven at a relatively high speed for a preset time. Accordingly, before the dewatering process is started, the controller 15 switches the clutch 60 into the second mode. When it is the second mode, low-torque rotatory power may be output with relatively high rotations. Therefore, the rotatable tub 4 that is relatively light may efficiently rotate at a relatively high speed.

The laundry is stuck onto an inner surface of the rotatable tub 4, due to a centrifugal force. Water in the laundry is drained out of the rotatable tub 4. Accordingly, the laundry is dewatered. Due to dewatering, water gathered in the fixed tub 3 is drained, due to driving of the drain pump 6. When the dewatering is ended, a preset buzzer is buzzed to notify an end of washing, and the operation of the washing machine 1 is finished.

(Control of Suppression of Crashing Sound Due to Driving Unit)

In the washing machine 1, a crashing sound may be suppressed by a structure of the driving part (clutch driver) 66, particularly, the actuator 100. In detail, immediately before the moving part 65 is connected to the fixed claws 61r and 62s as the controller performs switching processing, the controller 15 performs processing (braking processing) of stopping supplying of a switching current to the clutch 60.

Figure 43:
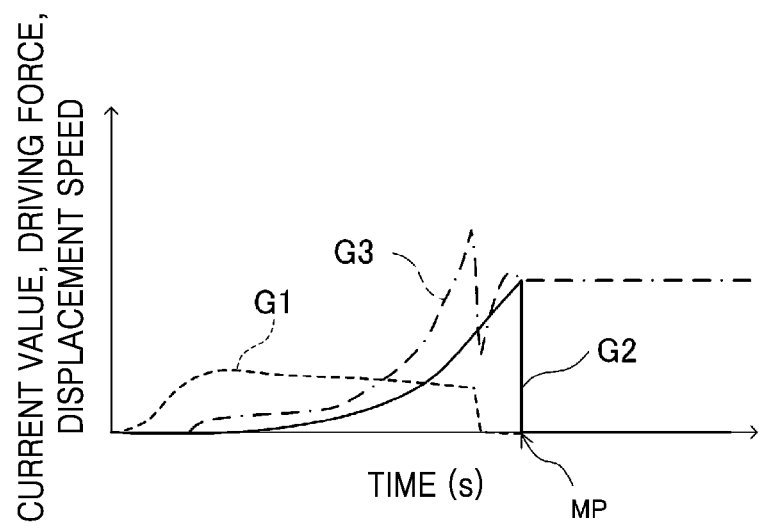
FIG. 43 is a time chart of an embodiment of braking processing.

FIG. 43 is a time chart of an embodiment of braking processing. Referring to FIG. 43, the graph G1 shows a change in a current that flows in the clutch 60. The graph G2 shows a speed of the moving part 65. The graph G3 shows a driving force of the moving part 65. MP indicates a target position (corresponding to the first position and the second position) where the fixed claws 61r and 62s and the moving claws 65r and 65s are engaged.

In preset timing before the moving part 65 reaches the target position MP, the controller 15 turns off electrification to the clutch coil 68a. Even when electrification to the clutch coil 68a is turned off, the moving part 65 is displaced due to inertia and a magnetic force of a magnet. As electrification to the clutch coil 68a is turned off, a speed of the moving part 65 is suppressed due to a sharp decrease of the driving force and braking due to a regenerative power. Due to that, a crashing sound may be suppressed. As only supplying of the switching current to the clutch 60 is stopped, it may be easily controlled. The crashing sound may be effectively suppressed by adjusting only stop timing.

(Control of Determination of Switching of Clutch Due to Driving Unit)

In a case where the clutch 60 is not switched, or switching fails as the clutch 60 is not in an appropriate position even when the clutch 60 is switched, when the motor 40 is driven in that state, occurrence of abnormal sound or a trouble such as damage to the clutch 60 may occur. In consideration of this point, every switching processing may be determined with respect to its success or failure.

Whether switching of the clutch 60 is successful may be determined by a structure of the driving part 66, particularly, the actuator 100. In particular, the controller 15 compares a preset determination value with a current flowing in the clutch coil 68a immediately after switching processing is performed. By doing so, the controller 15 may perform processing (switching determination processing) of determining whether switching of the clutch 60 is successful.

When a current flows in the same direction before and after switching processing, a magnetic flux density between the moving member 120 and the fixed member 110 is different. Due to that, a difference between inductances occurs, such that a transient response of the current is changed. Based on the change, whether switching processing is successful may be determined. In detail, as illustrated in (b) of FIG. 38, in electrification before switching processing, a magnetic flux generated by a current in the moving member 120 makes a magnetic flux of the magnets 114a and 114b weak. Therefore, a magnetic flux density is low. On the contrary thereto, as illustrated in (d) of FIG. 38, in electrification after switching processing, a direction of a magnetic flux of a current and a direction of a magnetic flux of the magnets 114a and 114b are the same. Therefore, a magnetic flux density is high. Due to that, a difference between inductances occurs before and after switching processing, such that a transient response of the current is changed. Based on the change, the controller 15 may determine whether switching processing is successful.

Also, a determination value may be set to be a preset value, or immediately before switching processing is performed, the clutch coil 68a is electrified based on a preset voltage command value for determination, and a current flowing the clutch coil 68a as a result thereof may be set as the determination value. The determination value may be affected due to external factors such as an environment temperature, a usage state of the clutch 60, or the like. In this regard, when such determination value is set in this manner for every switching determination processing, the aforementioned affect may be excluded. Therefore, switching determination processing may be performed with relatively high precision. Switching determination processing may be performed, by comparing the determination value with a current flowing the clutch coil 68a based on a voltage command value for determination immediately after switching processing is performed.

Figure 44:
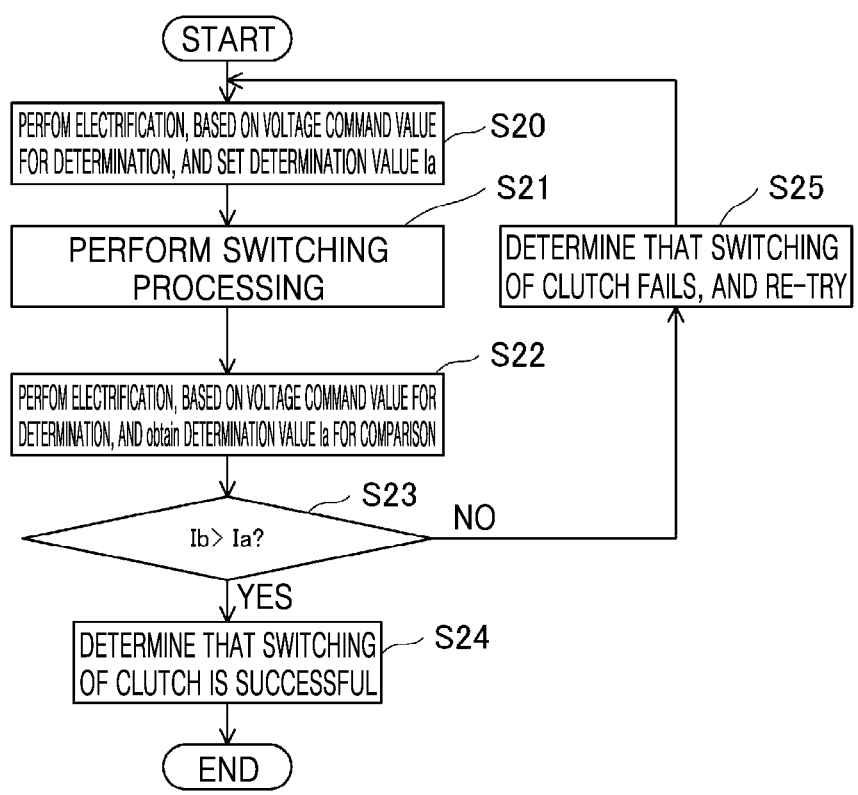
FIG. 44 is a flowchart of an embodiment of switching determination processing.

FIG. 44 is a flowchart of an embodiment of switching determination processing. When the controller 15 starts switching processing, the controller 15 performs electrification on the clutch coil 68a immediately before the switching processing, based on a preset voltage command value for determination (a voltage command value for flowing a current with amplitude that does not affect a state of the clutch 60). By doing so, a current value (Ia) flowing in the clutch coil 68a is achieved, and the current value (Ia) is set as a determination value (operation S20). In detail, a preset voltage is applied for a short period of several milliseconds (msec) to which the clutch 60 cannot respond. In an embodiment, a PWM voltage modulated, by an inverter, to carrier frequency of several tens of kilohertz (kHz), may be applied or a voltage of 1 pulse may be applied, for example.

Afterward, the controller 15 performs switching processing (operation S21). Due to that, the moving part 65 is displaced, and the clutch 60 is switched to one of the first mode or the second mode.

In order to determine whether switching of the clutch 60 has been appropriately performed, the controller 15 performs electrification on the clutch coil 68a, based on the voltage command value for determination, and obtains a current value (Ib) for comparison (operation S22). Then, the controller 15 compares whether the current value (Ib) is greater than the determination value (Ia) (operation S23).

As indicated from an analysis result of FIG. 38, a magnetic field generated by a current flowing in the clutch coil 68a forms a magnetic path mainly via an iron core of a moving part and a fixing part, which have relatively low permeability and relatively low magnetic resistance. In the configuration of the disclosure, as described above, when a current flows in the same direction, a magnetic flux varies according to positions of a clutch mover. A soft magnetic material used for an iron core has a feature of which permeability is decreased and magnetic resistance is increased when a magnetic flux is increased. By using the feature, when a current is applied, a magnetic resistance is changed according to positions of the clutch 60, and thus, impedance of the clutch coil 68a is changed, and a transient response of the current is changed when a voltage is applied.

As a result thereof, when the current value (Ib) is greater than the determination value (Ia), it is determined that switching of the clutch 60 is successful (operation S24). When the current value (Ib) is equal to or smaller than the determination value (Ia), it is determined that switching of the clutch 60 fails, and switching of the clutch 60 is retried (operation S25). Here, when the current value (Ib) is greater than the determination value (Ia), it is determined as a success, but, when a direction in which a current flows is opposite in switching, a great or relatively small relation with respect to the current value (Ib) and the determination value (Ia) is reversed.

When absolute values (|Ia| and |Ib|) of the current values (Ia and Ib) are used in determination, determination may be available with only a great or relatively small relation with respect to absolute values (|Ia| and |Ib|), regardless of a direction in which a current flows. Also, in order to prevent misdetermination, a coefficient is multiplied by a first-obtained determination value (Ia), such as "|Ib|>|Ia|×coefficient", and when a determination value (Ib) obtained at a later time does not exceed the determination value (Ia), it may not be determined as a success.

With the driving unit 10, whether switching of the clutch 60 is successful may be appropriately determined for each time. Therefore, a trouble due to a switching error of the clutch 60 may be suppressed.

Also, the disclosed technology is not limited to the aforementioned embodiments, and may include other unstated configuration. In an embodiment, in the aforementioned embodiment, N-poles of respective magnets are provided to face each other, but S-poles of respective magnets may be provided to face each other, for example. An effect of an embodiment may be obtained by reversing a direction of electrification to a coil. Also, magnets of the fixed member 110 may be three or more. The moving member 120 may be provided inside the fixed member 110 or may be provided outside the fixed member 110.

In an embodiment of a washing machine of the disclosure, the clutch may include the driving part configured to drive the moving part. The driving part may include a fixed member. The fixed member may include: a clutch coil extending in a direction crossing the axial direction and a diameter direction; and two magnets whose respective same poles are provided to face each other in the axial direction. The moving part may include a moving member. The moving member may include: two salient-pole cores whose end parts respectively face the two magnets in a near distance; and a connection core being apart from the two magnets and connecting base ends of the two salient-pole cores. The moving part may perform a reciprocating movement in the axial direction, according to switching of an electrification direction with respect to the clutch coil.

In an embodiment, the moving member may be unitarily (or integrally) formed of a soft magnetic material with a plate shape, and flange parts may protrude in opposite directions of the axial direction at the respective end parts of the salient-pole cores.

In an embodiment, the controller may be further configured to perform braking processing of stopping supplying of a switching current to the clutch, immediately before the end state starts.

In an embodiment, the controller may be further configured to perform switching determination processing by comparing a preset determination value with a current flowing in the clutch coil, immediately after the switching processing is performed, wherein the switching determination processing involves determining whether the moving part is connected to one of the rotor-side fixing part and the stator-side fixing part.

In an embodiment, the controller may be further configured to perform the switching determination processing in a manner that, immediately before the controller performs switching processing, the controller sets a current value flowing the clutch coil after the clutch coil is electrified based on a preset voltage command value for determination as the determination value, and compares the determination value with a current flowing in the clutch coil based on the voltage command value for determination immediately after the switching processing is performed.

An embodiment of an actuator of the disclosure includes a fixed member fixed to be used, and a moving member performing a reciprocating movement in a preset first direction along the fixed member. The fixed member includes: a wiring being apart in a second direction crossing the first direction, and extending in a direction intersecting both the first direction and the second direction; and two magnets being in parallel to the first direction and provided between the wiring and the moving member so that same poles thereof are provided to face each other in the first direction. The moving member includes two salient-pole cores being in parallel to the first direction and end parts thereof respectively may face the two magnets in a near distance; and a connection core being apart from the two magnets and connecting base ends of the two salient-pole cores. The moving member performs a reciprocating movement, according to switching of an electrification direction with respect to the wiring. In an embodiment of the actuator, according to switching of the electrification direction, the moving member performs a linear reciprocating movement with respect to the fixed member. The moving member includes only a core, and does not include a magnet. Therefore, even when it rotates at a relatively high speed, there is no risk of losing the magnet. The moving member includes two salient-pole cores and a connection core configuring a path of a magnetic flux, and has a simple structure to be easily manufactured. Also, in the fixed member, a wiring electrified to generate a magnetic field with respect to the moving member, and a pair of magnets of which same poles face each other are installed. By installing such magnets in the fixed member, in non-electrification, the moving member may stably remain in two positions that are bases of a reciprocating movement. By electrifying the wiring, a smooth and appropriate driving force may be generated. By doing so, the moving member may efficiently and appropriately perform a reciprocating movement, so that a crashing sound may be effectively suppressed.

In an embodiment, the moving member may be unitarily (or integrally) formed of a soft magnetic material with a plate shape, and flange parts may protrude in opposite directions of the first direction at the respective end parts of the salient-pole cores. As the flange parts are provided, the moving member may be further stably operated.

In an embodiment, the fixed member and the moving member may have round shapes whose centers are aligned, and a coil wound around a perimeter of the center may be configured by the wiring. In an embodiment, the moving member may be provided inside the fixed member. In an embodiment, the moving member may be provided outside the fixed member.

In an embodiment, a driving unit for a washing machine includes: a driving shaft rotatably supported with respect to a rotation axis; a motor configured to rotate the driving shaft; and a clutch and a decelerator provided between the driving shaft and the motor. The clutch includes: a moving part configured to slide in a rotation-axis direction in which the rotation axis extends; a pair of fixed claws being apart in the rotation-axis direction; and a driving part configured to switch a connection state of the decelerator by connecting the moving part to one of the pair of fixed claws by sliding the moving part. The driving part is configured by the actuator described above. As the aforedescribed actuator is used as the driving part of the clutch configured to switch a connection state of the decelerator, performance of the washing machine may be improved.

In an embodiment, the driving unit for the washing machine may further include a controller configured to control an operation of the clutch. The controller may perform switching processing of connecting the moving part to one fixed claw from among the pair of fixed claws by supplying a preset switching current to the clutch, and may perform braking processing of stopping supplying of the switching current to the clutch immediately before the moving part is connected to one fixed claw. By doing so, stopping supplying of the switching current, i.e., a simple control of turning off electrification, may effectively suppress a crashing sound.

In an embodiment, the controller may perform switching processing of connecting the moving part to one fixed claw from among the pair of fixed claws by supplying a preset switching current to the clutch, and may perform, in performing of the switching processing, switching determination processing of determining whether the moving part is connected to the one fixed claw.

In an embodiment, the controller may perform the switching determination processing by comparing a preset determination value with a current flowing in the coil, immediately after the switching processing is performed.

In an embodiment, immediately before the controller performs switching processing, the controller sets a current value flowing the coil after the coil is electrified based on a preset voltage command value for determination as the determination value, and compares the determination value with a current flowing in the coil based on the voltage command value for determination immediately after the switching processing is performed, thereby performing the switching determination processing.

According to the aforementioned embodiments, whether switching of the clutch is successful may be determined with relatively high precision, so that occurrence of a trouble such as an abnormal sound or the like due to a switching error may be prevented.

According to the disclosed embodiments of the actuator, the driving unit of the washing machine, and the washing machine, a reciprocating movement of the moving part may be efficiently and appropriately performed, so that suppression of a crashing sound may be easily performed.

The embodiments described above may be appropriately combined to be executed. While the embodiments have been particularly described, the spirit and scope of the disclosure may also include various changes and improvements in form and details which are made by those of ordinary skill in the art, in view of a basic concept of the disclosure as defined by the appended claim.

The invention claimed is:

1. A washing machine comprising:
   a rotatable tub;
   a driving unit configured to rotate the rotatable tub, the driving unit comprising:
      a shaft;
      a motor including a stator and a rotor;
      a decelerator provided between the shaft and the rotor;
      a clutch configured to be switchable between a first mode in which rotation of the rotor is transmitted to the shaft via the decelerator, and a second mode in which rotation of the rotor is transmitted to the shaft without passing through the decelerator, the clutch comprising:
         a rotor-side fixing part configured to be rotatable by interoperating with rotation of the rotor;
         a stator-side fixing part being fixed to the stator, and configured to face the rotor-side fixing part with a gap therebetween in an axial direction of the shaft; and
         a moving part configured to be movable between the rotor-side fixing part and the stator-side fixing part in the axial direction; and
      a controller,
   wherein the clutch is further configured to switch to the first mode as the stator-side fixing part and the moving part engage with each other, and switch to the second mode as the rotor-side fixing part and the moving part engage with each other, and
   wherein, in a switching processing of moving the moving part in the axial direction so that the moving part is switched from a start state in which one of the rotor-side fixing part and the stator-side fixing part engages with the moving part to an end state in which a remaining one of the rotor-side fixing part and the stator-side fixing part engages with the moving part, the controller is configured to perform an adjustment operation, before the end state starts, of adjusting an engagement position by changing a rotation phase of the rotor so that the engagement position of the moving part with respect to the remaining one of the rotor-side fixing part and the stator-side fixing part becomes a target engagement position.

2. The washing machine of claim 1, wherein, in the switching processing, the controller is further configured to perform, after the adjustment operation, a movement operation of moving the moving part in the axial direction.

3. The washing machine of claim 2, wherein
   the clutch further comprises a driving part configured to drive the moving part,
   the driving part comprises a clutch magnet installed at the moving part, and a clutch coil configured to generate a magnetic field for moving the clutch magnet in the axial direction, and
   in the movement operation, after the controller starts supplying power for generating the magnetic field to the clutch coil, the controller is further configured to determine whether the moving part is moved, based on whether the power is distorted.

4. The washing machine of claim 1, wherein the decelerator comprises:
   a carrier fixed to the shaft;
   a sun gear configured to be rotatable with the rotor;
   an internal gear configured to surround the sun gear; and
   a plurality of planetary gears supported to be rotatable on the carrier, and configured to engage with both the sun gear and the internal gear, and
   wherein the moving part is installed on an outer side of the internal gear, and is configured to be rotatable with the internal gear.

5. The washing machine of claim 1, wherein
   the rotor-side fixing part comprises a plurality of rotor-end fixed claws,
   the stator-side fixing part comprises a plurality of stator-end fixed claws,
   the moving part comprises a plurality of rotor-end moving claws configured to engage with the plurality of rotor-end fixed claws, and a plurality of stator-end moving claws configured to engage with the plurality of stator-end fixed claws, a target engagement position of the moving part with respect to the rotor-side fixing part is a position where gaps between the plurality of rotor-end fixed claws and the plurality of rotor-end moving claws face in the axial direction, and a target engagement position of the moving part with respect to the stator-side fixing part is a position where gaps between the plurality of stator-end fixed claws and the plurality of stator-end moving claws face in the axial direction.

6. The washing machine of claim 5, wherein a perimeter direction length between the plurality of rotor-end fixed claws is greater than a sum of a perimeter direction length according to a rotation phase difference between the rotor-side fixing part and the stator-side fixing part at the target engagement position and a perimeter direction length of a rotor-end moving claw of the plurality of rotor-end moving claws, and a perimeter direction length between the plurality of stator-end fixed claws is greater than a sum of a perimeter direction length according to a rotation phase difference between the rotor-side fixing part and the stator-side fixing part at the target engagement position and the perimeter direction length of a stator-end moving claw of the plurality of stator-end moving claws.

7. The washing machine of claim 1, wherein a rotation phase of the rotor in the target engagement position is a rotation phase when cogging torque of the motor reaches a stabilization point.

8. The washing machine of claim 1, wherein the stator comprises a motor coil configured to generate a magnetic field for rotating the rotor, the clutch comprises a driving part configured to drive the moving part, the driving part comprises a clutch magnet installed at the moving part, and a clutch coil configured to generate a magnetic field for moving the clutch magnet in the axial direction, and the controller comprises a motor driving circuit configured to supply power to the motor coil, and a clutch driving circuit configured to supply power to the clutch coil, the clutch driving circuit is further configured to supply, to the clutch coil, power supplied from the motor driving circuit, by electrically connecting the motor coil to the clutch coil, and impedance of the clutch coil is lower than impedance of the motor coil.

9. The washing machine of claim 1, wherein, in the switching processing, the controller is further configured to perform the adjustment operation, and a maintaining operation of maintaining the rotation phase of the rotor which is adjusted by the adjustment operation.

10. The washing machine of claim 1, wherein the rotatable tub is provided in such a manner that its axial line follows in a direction crossing a vertical direction, before performing the switching processing, the controller is further configured to perform an unbalance correction operation of correcting a position of an unbalanced material point of laundry in the rotatable tub by rotating the rotatable tub by controlling the motor so that the position of the unbalanced material point of laundry in the rotatable tub approaches a target material point position, and the target material point position is a position of the unbalanced material point which is a lowermost position in the rotatable tub when the engagement position becomes the target engagement position.

11. The washing machine of claim 1, wherein the clutch includes the driving part configured to drive the moving part, and the driving part comprises a fixed member, wherein the fixed member comprises:
a clutch coil extending in a direction crossing the axial direction and a diameter direction; and
two magnets including respective same poles provided to face each other in the axial direction, wherein the moving part comprises a moving member, wherein the moving member comprises:
two salient-pole cores respectively including end parts respectively facing the two magnets in a near distance; and
a connection core being apart from the two magnets and connecting base ends of the two salient-pole cores, and wherein the moving part is configured to perform a reciprocating movement in the axial direction, according to switching of an electrification direction with respect to the clutch coil.

12. The washing machine of claim 11, wherein the moving member is integrally formed of a soft magnetic material with a plate shape, and flange parts protrude in opposite directions of the axial direction at the end parts of the two salient-pole cores.

13. The washing machine of claim 11, wherein the controller is further configured to perform braking processing of stopping supplying of a switching current to the clutch, immediately before the end state starts.

14. The washing machine of claim 11, wherein the controller is further configured to perform switching determination processing by comparing a preset determination value with a current flowing in the clutch coil, immediately after the switching processing is performed, wherein the switching determination processing involves determining whether the moving part is connected to one of the rotor-side fixing part and the stator-side fixing part.

15. The washing machine of claim 14, wherein the controller is further configured to perform the switching determination processing in such a manner that, immediately before the controller performs switching processing, the controller sets a current value flowing in the clutch coil after the clutch coil is electrified based on a preset voltage command value for determination as the preset determination value, and compares the preset determination value with a current flowing in the clutch coil based on the preset voltage command value for determination immediately after the switching processing is performed.

* * * * *